(12) United States Patent
Hayashi

(10) Patent No.: US 7,545,536 B2
(45) Date of Patent: Jun. 9, 2009

(54) IMAGE FORMING APPARATUS AND CALIBRATION REFERENCE CHART

(75) Inventor: Koji Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 713 days.

(21) Appl. No.: 11/319,679

(22) Filed: Dec. 29, 2005

(65) Prior Publication Data
US 2006/0164700 A1    Jul. 27, 2006

(30) Foreign Application Priority Data

| Jan. 19, 2005 | (JP) | ............................. 2005-012100 |
| Jan. 25, 2005 | (JP) | ............................. 2005-017524 |
| Jan. 25, 2005 | (JP) | ............................. 2005-017525 |
| Sep. 14, 2005 | (JP) | ............................. 2005-267320 |

(51) Int. Cl.
  *G06F 15/00*    (2006.01)
(52) U.S. Cl. .................... 358/1.9; 358/518; 358/520; 358/517; 345/589
(58) Field of Classification Search .............. 358/518, 358/1.9, 520, 517; 345/589
See application file for complete search history.

(56) References Cited

FOREIGN PATENT DOCUMENTS

| JP | 7-222003 | 8/1995 |
| JP | 7-222013 | 8/1995 |
| JP | 2643951 | 5/1997 |
| JP | 10-16304 | 1/1998 |
| JP | 2002-247396 | 8/2002 |
| JP | 2002-290761 | 10/2002 |
| JP | 2003-60928 | 2/2003 |
| JP | 2004-13361 | 1/2004 |

*Primary Examiner*—Twyler L. Haskins
*Assistant Examiner*—Michael Burleson
(74) *Attorney, Agent, or Firm*—Oblon, Spivak, McClelland, Maier & Neustadt, P.C.

(57) ABSTRACT

Based on a read value of a calibration reference chart including achromatic patches and chromatic patches having different concentrations and a reference value of the calibration reference chart, a masking coefficient according to each hue area is calculated. A gradation conversion is performed on an image signal output from an image reading unit. The image signal is corrected based on the masking coefficient. Consequently, it is possible to reduce a difference in performance of a scanner between units.

14 Claims, 54 Drawing Sheets

⟵--- OPTICAL PATH OF REFLECTED LIGHT ON ORIGINAL SURFACE

⟵--- OPTICAL PATH OF REFLECTED LIGHT ON BACK FACE OF ORIGINAL

FIG. 8

| 0 | −1 | 0 |
|---|---|---|
| −1 | 4 | −1 |
| 0 | −1 | 0 |

FIG. 9A

SUB-SCANNING DIRECTION
EDGE DETECTION FILTER

| 1 | 1 | 1 | 1 | 1 |
|---|---|---|---|---|
| 1 | 1 | 1 | 1 | 1 |
| 0 | 0 | 0 | 0 | 0 |
| −1 | −1 | −1 | −1 | −1 |
| −1 | −1 | −1 | −1 | −1 |

FIG. 9B

MAIN SCANNING DIRECTION
EDGE DETECTION FILTER

| 1 | 1 | 0 | −1 | −1 |
|---|---|---|---|---|
| 1 | 1 | 0 | −1 | −1 |
| 1 | 1 | 0 | −1 | −1 |
| 1 | 1 | 0 | −1 | −1 |
| 1 | 1 | 0 | −1 | −1 |

FIG. 9C

OBLIQUE DIRECTION DETECTION FILTER 1

| 0 | 1 | 1 | 1 | 1 |
|---|---|---|---|---|
| 1 | 0 | 1 | 1 | 1 |
| -1 | 0 | 0 | 1 | 1 |
| -1 | -1 | -1 | 0 | 1 |
| -1 | -1 | -1 | -1 | 0 |

FIG. 9D

OBLIQUE DIRECTION DETECTION FILTER 2

| 1 | 1 | 1 | 1 | 0 |
|---|---|---|---|---|
| 1 | 1 | 1 | 0 | -1 |
| 1 | 1 | 0 | 0 | -1 |
| 1 | 0 | -1 | -1 | -1 |
| 0 | -1 | -1 | -1 | -1 | a: PIXEL NUMBER

| 29 | 30 | 25 | 26 | 27 | 28 | 29 | 30 | 25 | 26 |
|----|----|----|----|----|----|----|----|----|----|
| 35 | 36 | 31 | 32 | 33 | 34 | 35 | 36 | 31 | 32 |
| 5  | 6  | 1  | 2  | 3  | 4  | 5  | 6  | 1  | 2  |
| 11 | 12 | 7  | 8  | 9  | 10 | 11 | 12 | 7  | 8  |
| 17 | 18 | 13 | 14 | 15 | 16 | 17 | 18 | 13 | 14 |
| 23 | 24 | 19 | 20 | 21 | 22 | 23 | 24 | 19 | 20 |
| 29 | 30 | 25 | 26 | 27 | 28 | 29 | 30 | 25 | 26 |
| 35 | 36 | 31 | 32 | 33 | 34 | 35 | 36 | 31 | 32 |
| 5  | 6  | 1  | 2  | 3  | 4  | 5  | 6  | 1  | 2  |
| 11 | 12 | 7  | 8  | 9  | 10 | 11 | 12 | 7  | 8  |

↑ SUB-SCANNING DIRECTION
→ MAIN SCANNING DIRECTION

FIG. 17B b: INDEX TABLE

| PIXEL NUMBER | GRADATION TABLE NUMBER |
|---|---|
| 1 | T1 |
| 2 | T2 |
| 3 | T1 |
| 4 | T2 |
| 5 | T1 |
| 6 | T2 |
| 7 | T3 |
| 8 | T3 |
| 9 | T3 |
| 10 | T3 |
| ... | ... |
| 34 | T3 |
| 35 | T3 |
| 36 | T3 |

| GRADATION TABLE NUMBER | 1 | 2 | 3 | 4 | 5 | 6 | 7 | 8 | 9 | 10 | ... | 34 | 35 | 36 |
|---|---|---|---|---|---|---|---|---|---|---|---|---|---|---|
| PIXEL NUMBER | T1 | T2 | T3 | T4 | T5 | T6 | T7 | T8 | T9 | T10 | ... | T34 | T35 | T36 |

FIG. 35

| | SCANNER CALIBRATION | SCREEN SWITCHING | INDEX |

[4] READ VALUE     PAGE 14

READ VALUE

| | RED | GREEN | BLUE |
|---|---|---|---|
| PATCH1 | 255 | 250 | 0 |
| PATCH2 | 128 | 255 | 10 |
| PATCH3 | 70 | 255 | 0 |
| PATCH4 | 0 | 255 | 5 |
| PATCH5 | 0 | 250 | 128 |
| PATCH6 | 0 | 255 | 255 |
| PATCH7 | 0 | 120 | 255 |
| PATCH8 | 0 | 0 | 245 |

[PREVIOUS] [NEXT]

FIG. 36

| SCANNER CALIBRATION | SCREEN SWITCHING | INDEX |

[4] CORRECTION COEFFICIENT                     PAGE 18

|         | CORRECTION COEFFICIENT [%] |          | CORRECTION COEFFICIENT [%] |
|---------|-----|---------|-----|
| PATCH1  | 75  | PATCH9  | 75  |
| PATCH2  | 75  | PATCH10 | 75  |
| PATCH3  | 75  | PATCH11 | 75  |
| PATCH4  | 75  | PATCH12 | 75  |
| PATCH5  | 75  | PATCH13 | 75  |
| PATCH6  | 75  | PATCH14 | 75  |
| PATCH7  | 75  | PATCH15 | 75  |
| PATCH8  | 75  | PATCH16 | 75  |

PREVIOUS   NEXT

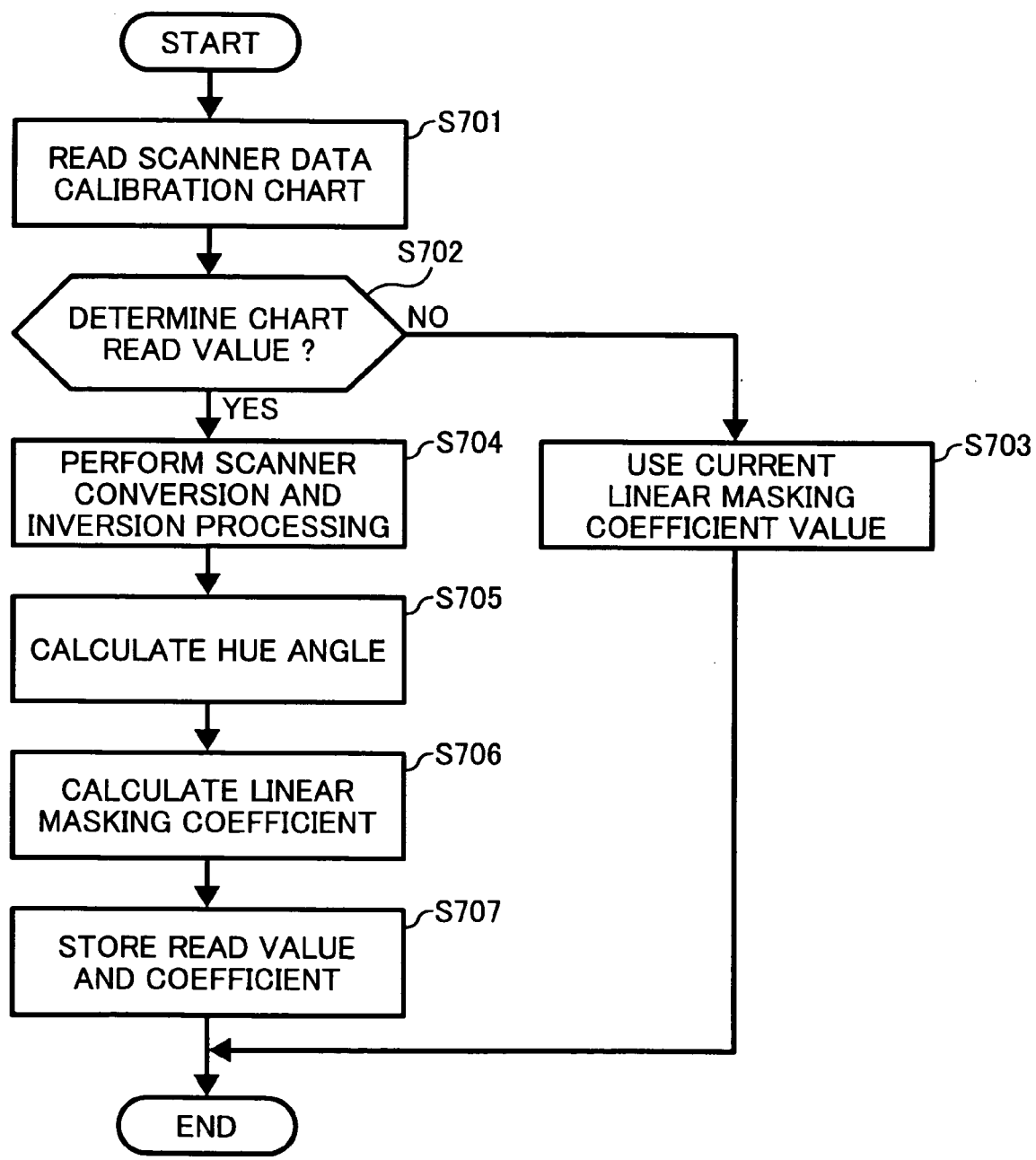

FIG. 39

| READ VALUE COLOR (MAX:255) | BLUE SIGNAL | GREEN SIGNAL | RED SIGNAL | ACC YELLOW CORRECTION COEFFICIENT | INPUT FOR YELLOW | REMARKS |
|---|---|---|---|---|---|---|
| 1. WHITE | 240 | 240 | 240 | 1.0 | 240 | |
| 2. YELLOW | 40 | 200 | 200 | 1.0 | 180 | |
| 3. RED | 10 | 10 | 160 | 0.8 | 128 | |
| 4. MAGENTA | 60 | 20 | 160 | 0.8 | 128 | |
| 5. BLUE | 60 | 20 | 30 | 0.9 | 27 | |
| 6. CYAN | 160 | 80 | 10 | 1.0 | 10 | |
| 9. GREEN | 30 | 60 | 10 | 1.0 | 10 | |
| 10. GRAY | 20 | 20 | 20 | 1.0 | 20 | |
| 11. BLACK | 0 | 0 | 0 | 1.0 | 0 | |

FIG. 43

| READ VALUE COLOR (MAX:255) | BLUE SIGNAL | GREEN SIGNAL | RED SIGNAL | ACC RED CORRECTION COEFFICIENT | INPUT FOR CYAN | REMARKS |
|---|---|---|---|---|---|---|
| 1. WHITE | 240 | 240 | 240 | 1.0 | 240 | |
| 2. YELLOW | 40 | 200 | 200 | 0.9 | 180 | |
| 3. RED | 10 | 10 | 160 | 0.8 | 128 | |
| 4. MAGENTA | 60 | 20 | 160 | 0.8 | 128 | |
| 5. COLOR 1 MAGENTA AND BLUE | 60 | 20 | 120 | 1.1 | 132 | |
| 6. COLOR 2 BETWEEN MAGENTA AND BLUE | 60 | 20 | 80 | 1.1 | 88 | |
| 7. BLUE | 60 | 20 | 30 | 0.9 | 27 | |
| 8. CYAN | 150 | 50 | 10 | 1.0 | 10 | |
| 9. GREEN | 30 | 60 | 10 | 1.1 | 11 | |
| 10. GRAY | 5 | 5 | 5 | 1.0 | 5 | |
| 11. BLACK | 0 | 0 | 0 | 1.0 | 0 | |

AUTOMATIC GRADATION CORRECTION

SET TEST PATTERN ON CONTACT GLASS IN PROPER DIRECTION AND PRESS READING START KEY

SET DIRECTION ON CONTACT GLASS

READING START     CANCEL

AUTOMATIC GRADATION CORRECTION

READING···

CANCEL

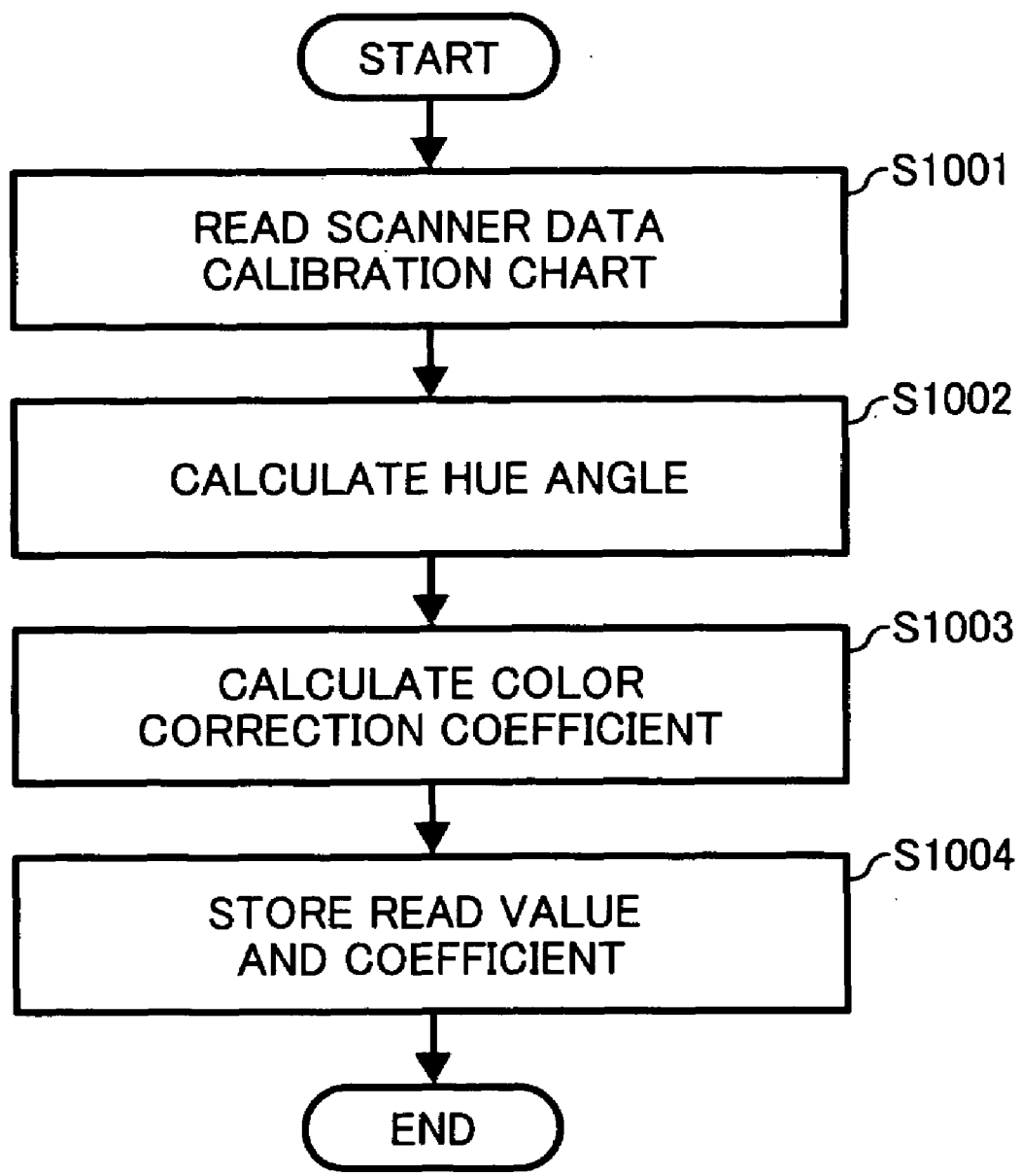

IMAGE FORMING APPARATUS AND CALIBRATION REFERENCE CHART

CROSS-REFERENCE TO RELATED APPLICATIONS

The present document incorporates by reference the entire contents of Japanese priority documents, 2005-017524 filed in Japan on Jan. 25, 2005, 2005-267320 filed in Japan on Sep. 14, 2005, 2005-012100 filed in Japan on Jan. 19, 2005 and 2005-017525 filed in Japan on Jan. 25, 2005.

BACKGROUND OF THE INVENTION

1. Field of the Invention

The present invention relates to an image forming apparatus that has a function of outputting data to an external device.

2. Description of the Related Art

Conventionally, due to fluctuation in spectral sensitivities of a charge coupled device (CCD) or an infrared-ray cut filter, and deterioration with time and use of an optical system, a read value of a scanner in reading image data varies depending on a unit. Even when the identical color document is read, each of the units outputs a different image signal. As a result, an image output to be displayed or printed by each of the units appears in different colors.

In a conventional technology for adjusting the difference in color, an image forming apparatus performs a hue-division-masking color-correction processing. The image forming apparatus includes a unit that calculates a masking coefficient based on a value of an input image signal obtained by reading an original document of which a spectral characteristic corresponding to a point where hue is divided is known, and C, M, Y, and K recording values of a developing unit optimal for the reproduction of the color of the original document. Moreover, an image forming apparatus may include a unit that calculates a masking coefficient by a difference value between an output image signal obtained by converting the input image signal obtained by reading an original document, a spectral characteristic of which is known by a predetermined masking coefficient, and an output value obtained by converting, with the predetermined masking coefficient, an input image signal obtained when the original is read by a reading apparatus having a standard spectral characteristic. Such technologies are disclosed in, for example, Japanese Patent Application Laid-Open No. 2002-290761.

In an image processing method according to another conventional technology, a reference chart having color images of different gradation levels is read by a reading unit to create the correction data of the reading unit based on the image data of the read reference chart and reference data stored in advance in association with the color images of the different gradation levels. The image output by the output unit based on the reference data for the correction of the output unit is read by the reading unit corrected by the created correction data. Based on the read image data, correction data of the output unit is created. Such a technology is disclosed in, for example, Japanese Patent No. 2643951.

In still another conventional technology, an image processing apparatus corrects a color represented by a color image signal to be a color suitable for an output apparatus from which the color image signal should be output. This image processing apparatus includes a hue-area judging unit that determines a hue area that includes, among plural hue areas formed to include a plane in a color space parallel to a brightness axis as a boundary, a signal color represented by the color image signal and a correction unit that corrects a signal color according to the hue area. Such a technology is disclosed in, for example, Japanese Patent Application Laid-Open No. 2004-13361.

With the recent development of communication technologies, a situation surrounding color copying apparatuses has significantly changed. A large-scale image formation system in which more than one color copying apparatus is connected via the Internet or the like to provide the transmission and reception of data among plural color copying apparatuses has been widely used.

In the large-scale image formation system, image data read by a scanner in a color copying apparatus is sent to another color copying apparatus and an image processing unit (IPU) or a printing unit in the color copying apparatus that has received the image data can perform image processing for printing.

For example, when an original document is desired to be copied in a large quantity in a short period of time, the original document is read by a scanner in one color copying apparatus, and the read image data is sent to plural other color copying apparatuses. Thus, the read image data can be printed out by plural units of color copying apparatuses simultaneously.

In another example, when original documents existing at more than one location are desired to be collectively copied at one location, the original documents are read by a scanner in a color copying apparatus in each location and the read image data are sent to one color copying apparatus. Thus, the original documents in different places can be printed by one color copying apparatus.

However, in the conventional technologies, when plural color copying apparatuses are connected to provide data transmission and reception and a color copying apparatus different from a color copying apparatus that has read the original document performs printing, a color reproducibility is low compared to when a single color copying apparatus performs printing because a read value of a scanner in reading image data varies depending on a unit even when the identical color document is read.

An image processing parameter used for image processing by a color copying apparatus is obtained by calibrating a scanner and a printing unit in the color copying apparatus in pairs. Thus, all color copying apparatuses do not always store therein the same image processing parameter. However, in the conventional technology, a color copying apparatus different from a color copying apparatus that has read the original document performs image processing to print an image. Thus, a combination of the scanner that has read the original document and the printing unit that has performed the printing is different from a combination that was calibrated. Consequently, when image processing parameter of the color copying apparatus that has read the original document and the image processing parameter of the color copying apparatus that has received the image data are different, the color reproducibility is low compared to when a single color copying apparatus performs printing.

The problems described above are more conspicuous, when one original document is read by one color copying apparatus, and read image data of the original document is printed by plural color copying apparatuses. Copies having unequal color reproducibility are printed in a large quantity.

SUMMARY OF THE INVENTION

Similarly, the problems are conspicuous when original documents located at more than one location are collectively printed at one location by one color copying apparatus.

It is an object of the present invention to at least solve the problems in the conventional technology.

An image forming apparatus according to one aspect of the present invention includes a color correcting unit that includes a scanning unit configured to optically scan an original document to read an image, and to output an image signal; a first converting unit configured to perform a gradation conversion on the image signal; a hue-area detecting unit configured to detect, among a plurality of hue areas having a plane provided in parallel with a brightness axis in a color space as a boundary, a hue area including a signal color represented by a color image signal; and a correction unit configured to correct the signal color according to the hue area; a reference-data storing unit configured to store reference data corresponding to a patch in a reference chart including a plurality of achromatic patches having different gradation levels and a plurality of different chromatic patches, the reference chart obtained by reading an image by the scanning unit; and a parameter generating unit configured to generate, based on the reference data, a hue division parameter to be set in the hue-area detecting unit and a color correction parameter to be set in the correction unit.

An image forming apparatus according to another aspect of the present invention includes means for optically scanning an original document to read an image, and to output an image signal; means for performing a gradation conversion on the image signal; means for detecting, among a plurality of hue areas having a plane provided in parallel with a brightness axis in a color space as a boundary, a hue area including a signal color represented by a color image signal; means for correcting the signal color according to the hue area; means for storing reference data corresponding to a patch in a reference chart including a plurality of achromatic patches having different gradation levels and a plurality of different chromatic patches, the reference chart obtained by reading an image by means for scanning; and means for generating, based on the reference data, a hue division parameter to be set in means for detecting the hue-area and a color correction parameter to be set in means for correcting the signal color.

An image forming apparatus according to still another aspect of the present invention has a function of outputting an image read by the image forming apparatus from another image forming apparatus. The image forming apparatus includes a reading unit configured to read an image, and to output an image signal; a converting unit configured to perform gradation conversion on the image signal; a chart reading unit configured read a calibration reference chart that includes a plurality of chromatic patches having different hue areas that have a plane provided in parallel with a brightness axis in a color space as a boundary, and a plurality of achromatic patches having different concentrations; a reference-value storing unit configured store a reference value corresponding to each of the chromatic patches; a first correcting unit configured to correct R, G, and B signals corresponding to each of the hue areas based on the reference value and a read value of the chromatic patches obtained by reading the calibration reference chart; a masking-coefficient calculating unit configured to calculate a masking coefficient corresponding to each of the hue areas from corrected R, G, and B signals and C, M, Y, and K signals corresponding to each of the hue areas; and a second correcting unit configured to correct the image signal on which the gradation conversion has been performed, based on the masking coefficient.

An image forming apparatus according to still another aspect of the present invention has a function of outputting an image read by the image forming apparatus from another image forming apparatus. The image forming apparatus includes means for reading an image to output an image signal; means for performing gradation conversion on the image signal; means for reading a calibration reference chart that includes a plurality of chromatic patches having different hue areas that have a plane provided in parallel with a brightness axis in a color space as a boundary, and a plurality of achromatic patches having different concentrations; means for storing a reference value corresponding to each of the chromatic patches; means for correcting R, G, and B signals corresponding to each of the hue areas based on the reference value and a read value of the chromatic patches obtained by reading the calibration reference chart; means for calculating a masking coefficient corresponding to each of the hue areas from corrected R, G, and B signals and C, M, Y, and K signals corresponding to each of the hue areas; and means for correcting the image signal on which the gradation conversion has been performed, based on the masking coefficient.

A calibration reference chart according to still another aspect of the present invention is a patch type chart used for calibration of an image reading unit in an image forming apparatus that has a function of outputting an image read by the image reading unit from an image output unit of another image forming apparatus. The calibration reference chart is formed by arranging, on a recording medium, a plurality of chromatic patches having different hue areas having a plane provided in parallel with a brightness axis in a color space as a boundary and a plurality of achromatic patches having different concentrations.

An image forming method according to still another aspect of the present invention includes optically scanning an original document to read an image; outputting an image signal; performing a gradation conversion on the image signal; detecting, among a plurality of hue areas having a plane provided in parallel to a brightness axis in a color space as a boundary, a hue area including a signal color represented by a color image signal; and correcting the signal color according to the hue area; storing reference data corresponding to a patch in a reference chart including a plurality of achromatic patches having different gradation levels and a plurality of different chromatic patches, the reference chart obtained by reading an image; and generating, based on the reference data, a hue division parameter to be set at detecting the hue-area and a color correction parameter to be set at correcting the signal color.

An image forming method according to still another aspect of the present invention is for forming an image in an image forming apparatus that has a function of outputting an image read by the image forming apparatus from another image forming apparatus. The method includes reading an image; outputting an image signal; reading a calibration reference chart that includes a plurality of chromatic patches having different hue areas that have a plane provided in parallel with a brightness axis in a color space as a boundary, and a plurality of achromatic patches having different concentrations; storing a reference value corresponding to each of the chromatic patches; correcting R, G, and B signals corresponding to each of the hue areas based on the reference value and a read value of the chromatic patches obtained by reading the calibration reference chart; calculating a masking coefficient corresponding to each of the hue areas from corrected R, G, and B signals and C, M, Y, and K signals corresponding to each of the hue areas; and correcting an image signal obtained by performing gradation conversion on output image signal, based on the masking coefficient.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a schematic of a Laplacian filter shown in FIG. 7;

FIG. 9A is a schematic of a sub-scanning-direction edge-detection filter;

FIG. 9B is a schematic of a main-scanning-direction edge-detection filter;

FIG. 9C is a schematic of an oblique-direction detection filter;

FIG. 9D is a schematic of another oblique-direction detection filter;

FIG. 17B is a schematic for illustrating an index table when total thirty-six pixels, which is 6 pixels in a main scanning direction×6 pixels in a sub-scanning direction, are used in the dither processing;

FIG. 35 is a schematic of a display showing a screen for a read value;

FIG. 36 is a schematic of a display showing a screen for a correction coefficient;

FIG. 37 is a flowchart of the scanner calibration processing;

FIG. 39 is a table of reading reference values of chromatic and achromatic patches for yellow toner correction;

FIG. 43 is a table of reading reference values of chromatic and achromatic patches for the correction of cyan toner;

FIG. 57 is a flowchart of a correction by scanner data calibration; and

DETAILED DESCRIPTION OF THE PREFERRED EMBODIMENTS

Exemplary embodiments of the present invention are explained below in detail with reference to the accompanying drawings.

Note that, although examples described below are preferred examples of the present invention and thus have various technically preferable limitations, the scope of the present invention is not limited to these examples unless the following description includes a particular description for limiting the present invention.

In a first embodiment of the present invention, the present invention is applied to, as an example of an image forming apparatus, an electrophotographic color copying apparatus 1, a so-called multi function peripheral (MPF), that includes a copy function, a facsimile (FAX) function, a printing function, a scanner function, and a function to deliver an input image (an original image read by the scanner function or an image input by the printer or the FAX function).

Figure 1:
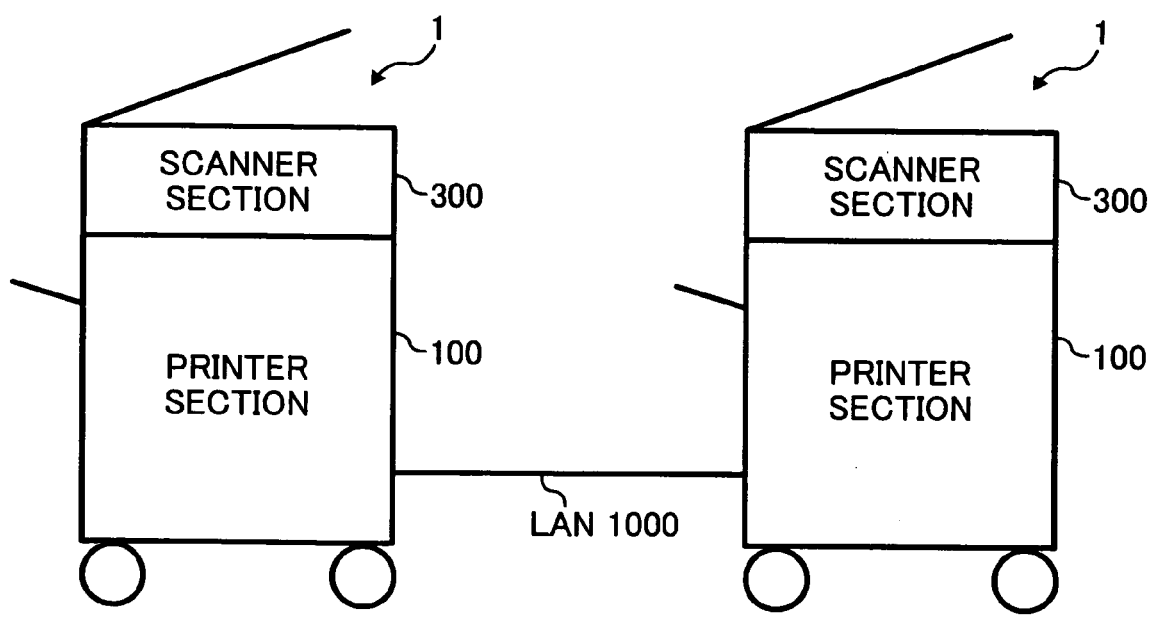
FIG. 1 is a schematic of a system configuration in which color copying apparatuses using an image forming apparatus according to a first embodiment of the present invention are linked.

FIG. 1 is a schematic of a system configuration in which the color copying apparatuses 1, to which the image forming apparatus of the present invention is applied, are linked and connected. As shown in FIG. 1, each of the respective color copying apparatuses 1 is connected via a local area network (LAN) cable 1000 to be capable of transmitting and receiving data. Such a color copying apparatus 1 functions as a child color copying apparatus when the color copying apparatus 1 is linked and connected to another color copying apparatus 1. Specifically, to copy only one original in a large quantity and in a short period of time, the original is read by a scanner section 300 of one color copying apparatus 1 and read original image data is sent to the other linked color copying apparatus 1. The respective color copying apparatuses 1 perform image processing to print and output images via printer sections 100 simultaneously. This is a linkage output function.

In such a case, due to fluctuation in spectral sensitivities of CCDs of the scanner sections of the respective color copying apparatuses 1, fluctuation in spectral sensitivities of infrared-ray cut filters for removing infrared ray components, deterioration with time and use of a scanner optical system, and the like, machines may have different read values of original image data. Thus, even when the same color original is read by the machines, the scanner sections 300 of the respective color copying apparatuses 1 output different image signals. This causes a difference between the output colors for display and printed colors. In order to solve the problem, the present invention makes it possible to set an image processing parameter for the purpose of reducing the differences in the scanner sections 300 of the respective color copying apparatuses 1, improving printer adjustment accuracy, and reducing fluctuation in adjustment. Details are described below.

Figure 2:
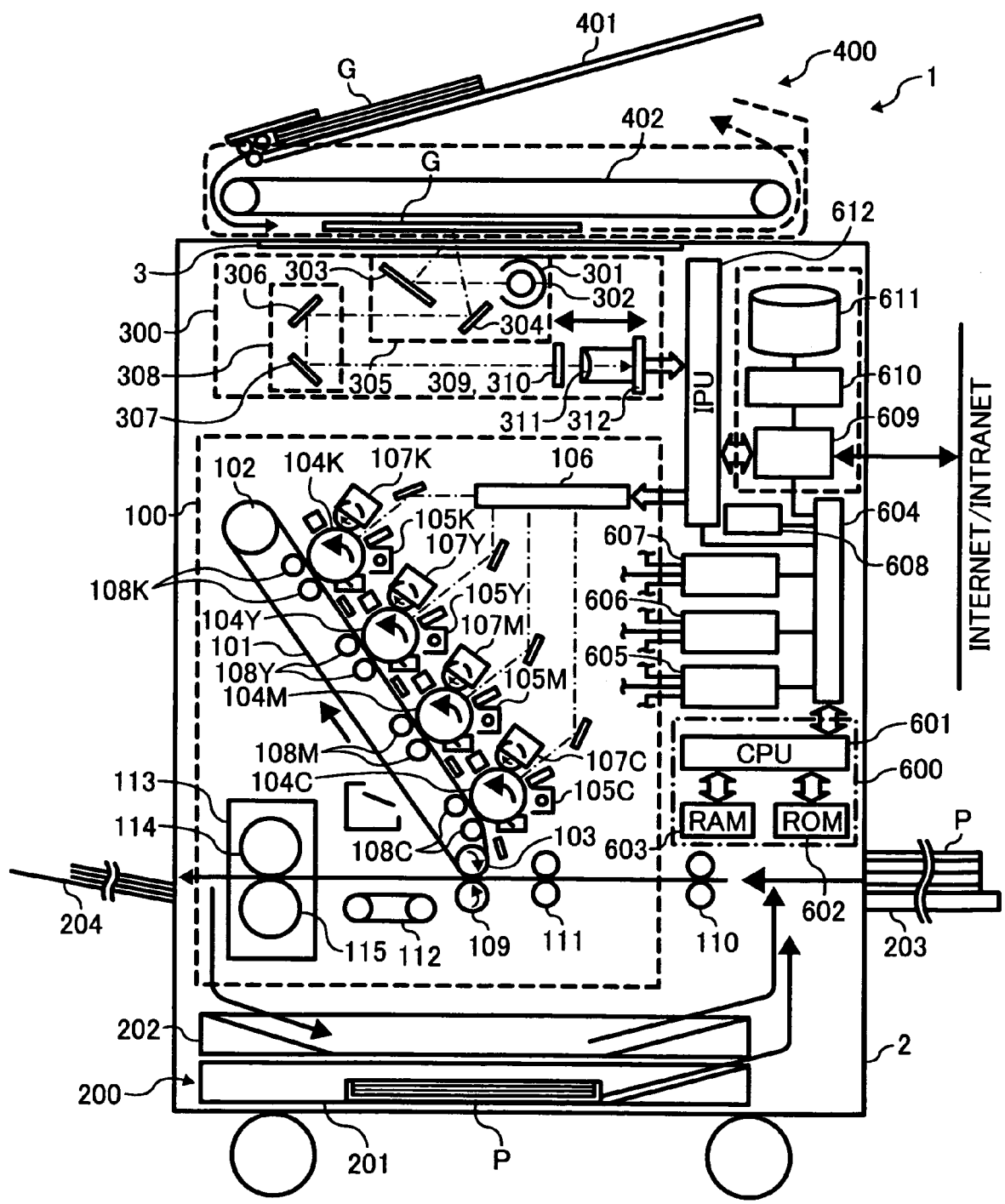
FIG. 2 is a schematic of an electrophotographic color copying apparatus.

FIG. 2 is a schematic of the electrophotographic color copying apparatus 1. In FIG. 2, in the color copying apparatus 1, the printer section 100 serving as image formation unit, a sheet feeding section 200, the scanner section 300 serving as an image reading unit, and the like are built in a body housing 2. A contact glass 3 is disposed on an upper surface of the body housing 2. An upper part of the color copying apparatus 1 has an auto document feeder (ADF) 400. The ADF 400 separates a plurality of originals G set on an original stand 40 one by one to convey the originals with a roller and an original conveyor belt 402 to an original reading position, where the originals are read by the scanner section 300, on the contact glass 3. The read originals G are discharged onto a sheet discharge tray (not shown) by the original conveyor belt 402.

The sheet feeding section 200 includes a sheet feeding tray 201, a reversing section 202, a conveyance roller (not shown), and the like and separates a plurality of pieces of transfer paper (transfer materials) P on the sheet feeding tray 201 one by one to convey the transfer paper to the printer section 100. The reversing section 202 reverses front and back surfaces of the transfer paper P subjected to image formation by the printer section 100 to send the transfer paper P to the printer section 100 again to subject the back surface to image formation. One side surface of the body housing 101 includes a sheet feeding tray 203 on which the transfer paper P is set manually. The sheet feeding section 200 also conveys the transfer paper P on this sheet feeding tray 203 to the printer section 100.

A side surface of the body housing 101 on the opposite side of the sheet feeding tray 203 has a sheet discharge tray 204 for sequentially discharging the transfer paper P subjected to image formation by the printer section 100 to the sheet discharge tray 204.

The printer section 100 is provided in substantially the center of the body housing 2. An annular intermediate transfer belt 101 is provided in substantially the center of the printer section 100 over a predetermined length in an oblique direction along a longitudinal direction of the printer section 100. The intermediate transfer belt 101 is disposed to surround a driving roller 102 and a transfer roller 103 and is rotated and driven in a clockwise direction indicated by an arrow in FIG. 2. Along this intermediate transfer belt 101, organic photosensitive element (OPC) drums 104K to 104C having a diameter of φ30 millimeters serving as four image bearing members of black (K) and three colors of yellow (Y), magenta (M), and cyan (C) are disposed. Around the photosensitive element drums 104K to 104C, electrification chargers 105K to 105C for electrification of surfaces of the photosensitive element drums 104K to 104C, a laser optical system 106 that emits a laser beam to the surfaces of the uniformly electrified photosensitive element drums 104K to 104C to form an electrostatic latent image, a black development unit 107K and three color development units 107Y, 107M, and 107C of Y (yellow), M (magenta), and C (cyan) that supply respective color toners to electrostatic latent images to develop the images to form toner images of the respective colors, bias rollers 108K to 108C that apply a transfer voltage to the intermediate transfer belt 101, a cleaning device (that is not denoted by a reference numeral) that removes the toner remaining on the surfaces of the transferred photosensitive element drums 104K to 104C, a charge removing section that removes changes remaining on the surfaces of the transferred photosensitive element drums 104K to 104C, and the like are disposed.

The printer section 100 uniformly charges the photosensitive element drums 104K to 104C rotated in a counter-clockwise direction with the electrification chargers 105K to 105C, irradiates laser beams modulated by color data of the respective colors on the uniformly charged photosensitive element drums 104K to 104C from the laser optical system 106 to form electrostatic latent images. The printer section 100 supplies toners of the respective colors to the respective photosensitive element drums 104K to 104C on which the electrostatic latent images are formed from the development units 107K to 107C of the respective colors to form toner images. The printer section 100 uses the bias rollers 108K to 108C to apply a transfer voltage to the intermediate transfer belt 101 and sequentially transfers the respective toner images onto the photosensitive element drums 104K to 104C to be superposed one on top of another on the intermediate transfer belt 101 to transfer a full color toner image.

In the printer section 100, a pressure roller 109 is arranged in a position opposed to the transfer roller 103 across the intermediate transfer belt 101. The transfer paper P is transferred to a space between the pressure roller 109 and the transfer roller 103 from the sheet feeding section 200. On a conveyance path of the transfer paper P to the pressure roller 109 and the transfer roller 103, a conveyance roller 110 and a resist roller 111 are provided. The conveyance roller 110 conveys the transfer paper P from the sheet feeding section 200 to the resist roller 111 and the resist roller 111 adjusts timing for the conveyed transfer paper P and the toner image on the intermediate transfer belt 101 to convey the transfer paper P to the space between the pressure roller 109 and the transfer roller 103.

The transfer roller 103 applies a transfer voltage to the intermediate transfer belt 101 to transfer the toner image onto the intermediate transfer belt 101 to the transfer paper P conveyed to the space between the transfer roller 103 and the pressure roller 109.

In the printer section 100, on a downstream side of the conveyance direction of the transfer paper P onto which the toner image is already transferred, a conveyor belt 112 and a fixing unit 113 are provided. The transfer paper P onto which the toner image is transferred and which is peeled from the intermediate transfer belt 101 is conveyed by the conveyor belt 112 to the fixing unit 113. The fixing unit 113 includes a fixing roller 114 heated to a fixing temperature and a pressure roller 115 brought into press contact with the fixing roller 114. The fixing unit 113 conveys the conveyed transfer paper P while heating and pressurizing the transfer paper P with the fixing roller 114 and the pressure roller 115, which are driven to rotate, fixes the toner image on the transfer paper P, and discharges the transfer paper P onto a sheet discharge tray 204 provided on a side surface of the body housing 2.

Figure 3:
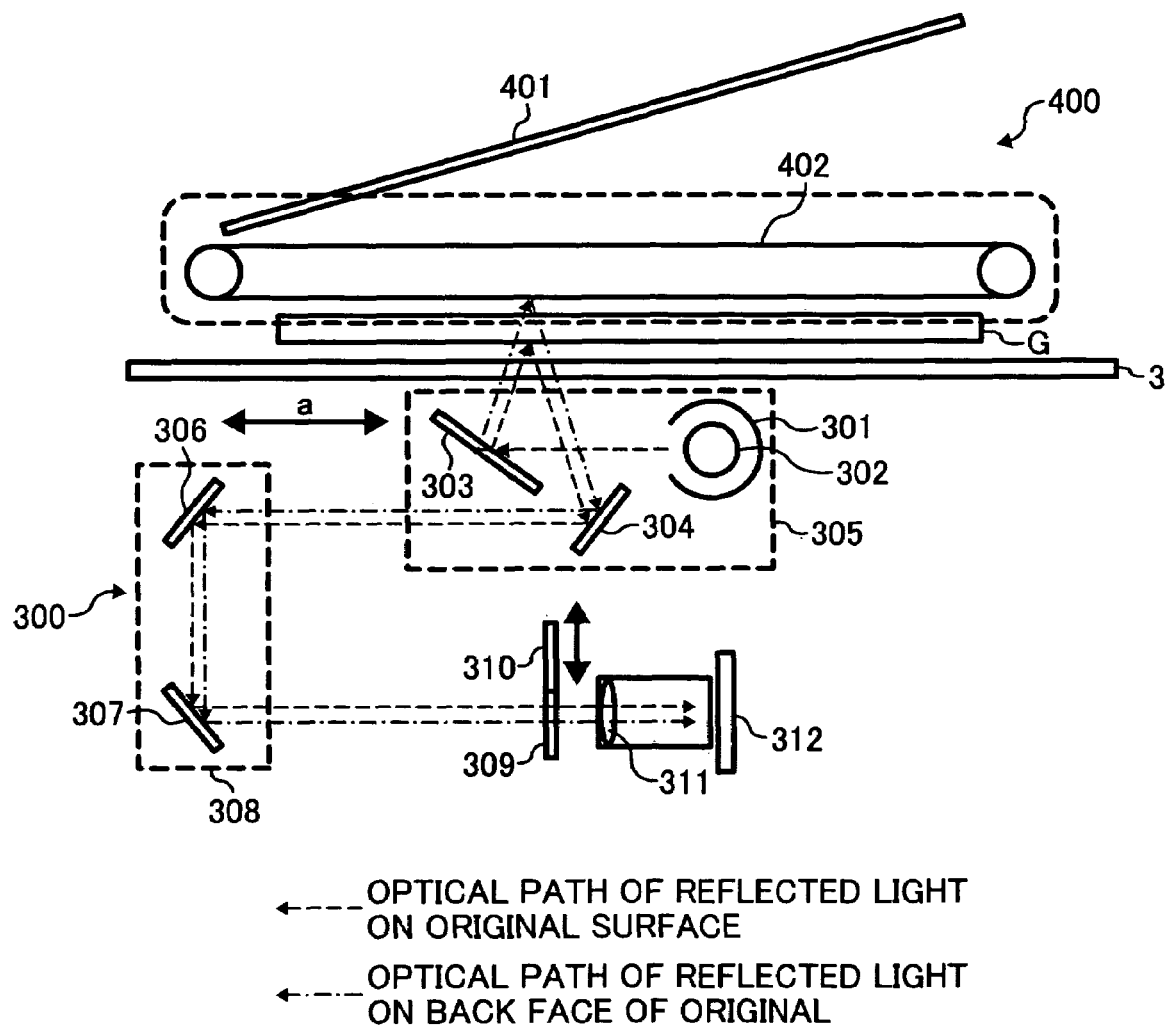
FIG. 3 is an enlarged view of a scanner section and an ADF section in the color copying apparatus shown in FIG. 2.

As shown in FIG. 3 in an enlarged form, the scanner section 300 includes a first carrier 305 including a halogen lamp 302 having a lampshade 301 and a first mirror 303 for reflecting light from the original G and the halogen lamp 302 to an original G and a white reference plate (not shown) and a second mirror 304 for reflecting reflected light from the original G and the white reference plate, a second carrier 308 including a third mirror 306 and a fourth mirror 307 for sequentially reflecting light reflected by the second mirror 304, two switchable infrared-ray cut filters 309 and 310, a lens 311, a CCD 312 serving as a photoelectric conversion element, and the like. While moving the first carrier 305 and the second carrier 308 at a predetermined movement speed in a sub-scanning direction (a direction indicated by an arrow "a" shown in FIG. 3), the scanner unit 300 irradiates reading light on the original G on the contact glass 3 from the halogen lamp 302 on the first carrier 305 and reflects reflected light from the original G to the third mirror 306 on the second carrier 308 with the second mirror 304. The scanner section 300 uses the third mirror 306 to reflect the reflected light from the second mirror 304 in a direction of the fourth mirror 307 and uses the fourth mirror 307 to reflect the reflected light in a direction of the infrared-ray cut filters 309 and 310. The infrared-ray cut filter 309 or the infrared-ray cut filter 310 positioned on the optical path at the point are used to cut infrared ray to cause the light to be incident on the lens 311. The scanner section 300 collects the incident light to the CCD 312. The CCD 312 subjects the incident light to photoelectric conversion to read the image of the original G and output the image as an analog image signal.

Figure 4:
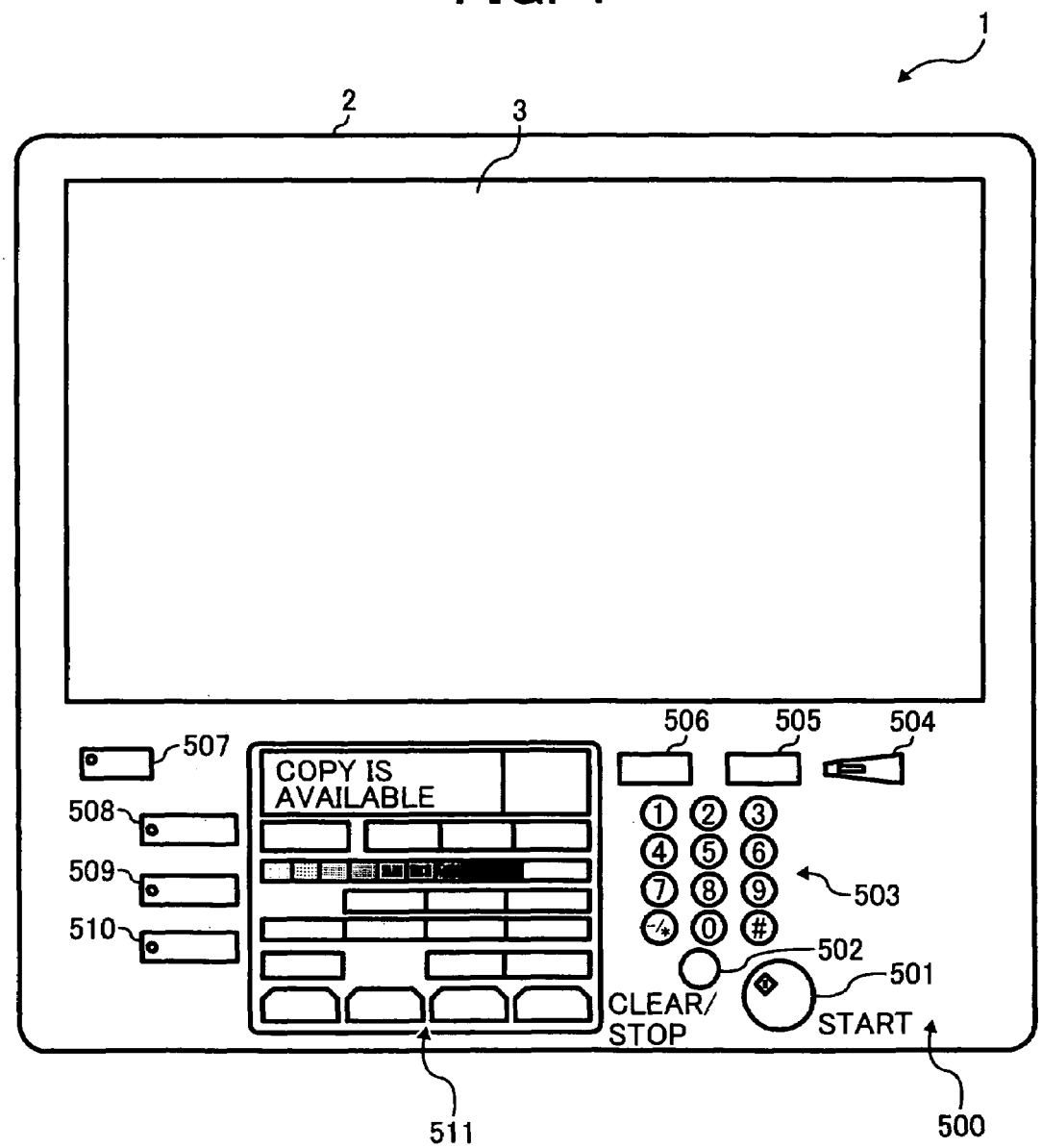
FIG. 4 is a top view of the color copying apparatus shown in FIG. 2.

In the color copying apparatus 1, the upper surface part of the body housing 2 includes, as shown in FIG. 4, an operation section 500. The operation section 500 includes a start key 501, a clear/stop key 502, a numeric keypad 503, an interruption key 504, a memory call key 505, a preheating/mode clear key 506, a color adjustment/registration key 507, a program key 508, an option key 509, an area processing key 510, a liquid crystal screen 511, and the like.

Figure 5:
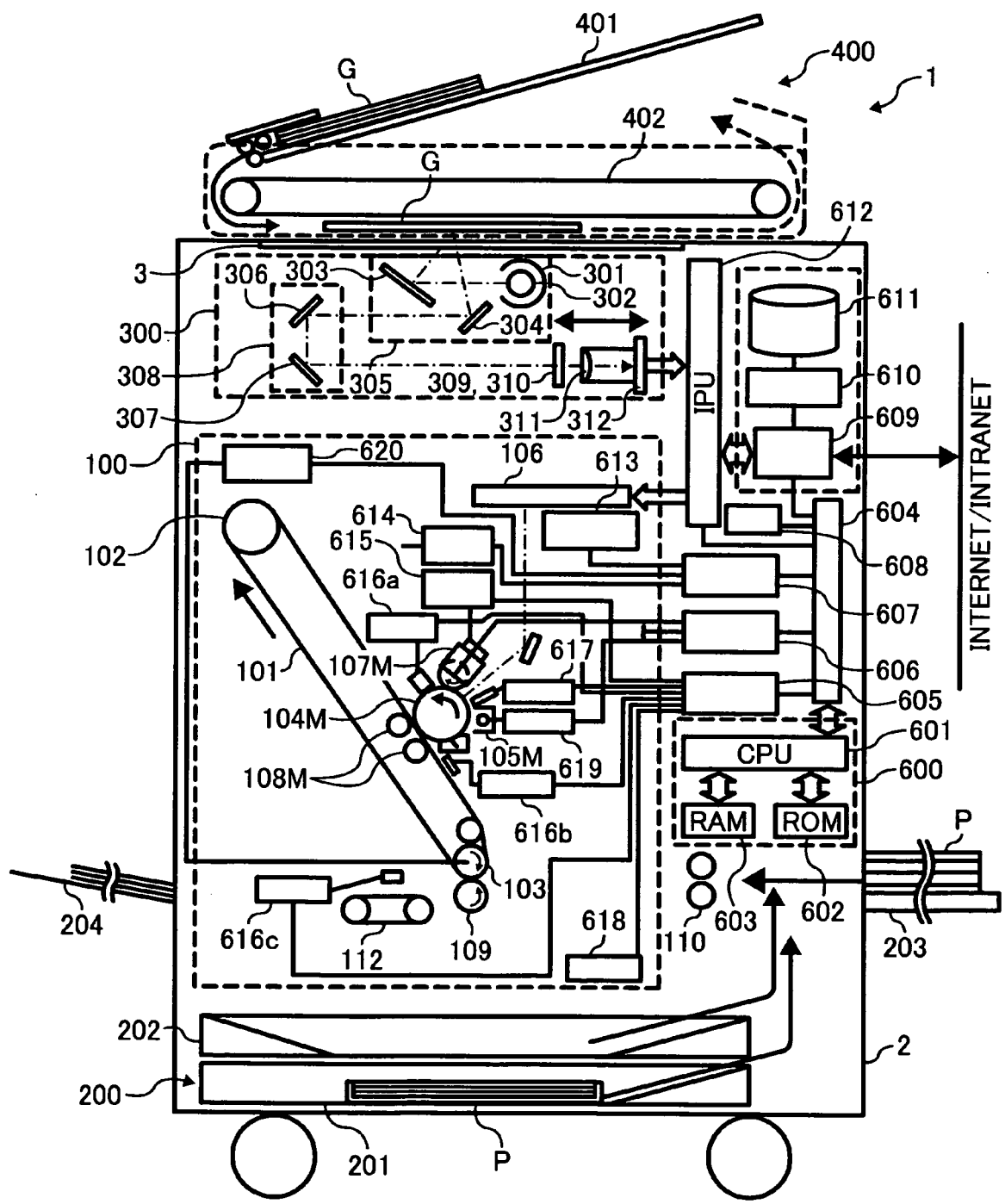
FIG. 5 is a schematic of a control system of the color copying apparatus shown in FIG. 2.

A control system of the color copying apparatus 1 is constituted as shown in FIG. 5. The control system includes a central processing unit (CPU) 601 of a system controller 600 that controls the respective sections of the color copying apparatus 1 to execute the processing by the color copying apparatus 1, a read only memory (ROM) 602 for storing various programs and data, a random access memory (RAM) 603 used as a work memory of the CPU 601, an interface I/O 604 for connecting the CPU 601 to various circuit sections, a various sensor control section 605, a power source/bias control section 606, a driving control section 607, an operation control section 608, a communication control section 609, a storage control section 610, a storage 611, an IPU 612, a laser optical system driving section 613, a toner supply circuit 614, and the like.

Toner concentration sensors 615 provided in the respective Y, M, C, and K development units 107K to 107C, optical sensors 616a to 616c provided in the respective Y, M, C, and K development units 107K to 107C, a potential sensor 617, an environment sensor 618, and the like are connected to the various sensor control section 605. Sensor signals from the respective sensors 615 to 618 are output to the CPU 601 via the interface I/O 604. This optical sensor 616a is provided to be opposed to the respective photosensitive element drums 104K to 104C to detect an amount of toner deposited on the photosensitive element drums 104K to 104C. The optical sensor 616b is provided near the respective photosensitive element drums 104K to 104C to be opposed to the intermediate transfer belt 101 to detect an amount of toner deposited on the intermediate transfer belt 101. The optical sensor 616c is provided to be opposed to the conveyor belt 112 to detect an amount of toner deposited on the conveyor belt 112. In a practical use, the amount of deposited toner may be detected by any one of the optical sensors 616a to 616c.

The optical sensor 616a is provided at a position outside an image area in an axial direction of the photosensitive element drums 104K to 104C and near the image area. The optical sensor 616a includes a light-emitting element (e.g., light-emitting diode) and a light-receiving element (e.g., photo sensor). The optical sensor 616*a* detects, for each of the colors, an amount of depositions of toners in the toner image of the detection pattern latent image formed on the photosensitive element drums 104K to 104C and an amount of deposition of toners of the respective colors in the background section. The optical sensor 616*a* also detects a so-called residual potential after charge removal for the photosensitive element drums 104K to 104C to output a detection signal to the various sensor control section 605. The various sensor control section 605 calculates, based on the detection signal from the optical sensor 616*a*, a ratio of the toner deposition amount in the toner image of the detected pattern toner image and the toner deposition amount in the background section to compare a value of the ratio with a reference value to detect fluctuation in image concentration. Consequently, the various sensor control section 605 performs correction of control values from the respective Y, M, C, and K toner concentration sensors 615. Note that the optical sensor 616*a* in a practical use is not required to be provided in the respective photosensitive element drums 104K to 104C and the toner deposition amount may be detected by any one of the photosensitive element drums 104K to 104C.

The toner concentration sensor 615 is provided in the respective development units 107K to 107C and detects, based on a change in magnetic permeability of developers in the development units 107K to 107C, toner concentration to output a detection signal to the various sensor control section 605. The various sensor control section 605 compares, based on the detection by the toner concentration sensor 615, the detected toner concentration value with a reference value, and when it is judged that the toner concentration is lower than a fixed value and the toner is in shortage, outputs a toner supply signal having a magnitude corresponding to the amount of shortage to the toner supply circuit 614. Based on the toner supply signal, the toner supply circuit 614 supplies toner to the corresponding development units 104K to 104C.

The potential sensor 617 detects the surface potentials of the respective photosensitive element drums 104K to 104C serving as image bearing members to output a detection signal to the various sensor control section 605.

The power source/bias control section 606 controls power supply to the development units 107K to 107C and the power supply circuit 619. The power supply circuit 619 supplies a predetermined electrification discharge voltage to the electrification chargers 105K to 105C, supplies a development bias of a predetermined voltage to the development units 107K to 107C, and supplies a predetermined transfer voltage to the bias rollers 108K to 108C and the electrification chargers 105K to 105C.

The driving control section 607 controls driving of the laser optical system driving section 613 that adjusts the laser output of the laser optical system 106, the intermediate transfer belt driving section 620 that controls the rotation and driving of the intermediate transfer belt 101, and the toner supply circuit 614 that supplies toner to the development units 107K to 107C. The operation control section 608 performs, under the control by the CPU 601, acquisition of operation contents of the operation section 500, lighting control for a lamp or the like, control for display of a liquid crystal screen, and the like.

The communication control section 609 is connected to a network (e.g., the Internet, an intranet) to perform communication via the network. The storage 611 is constituted by a hard disk or the like and stores, under control by the storage control section 610, various pieces of information (particularly image data).

Figure 6A:
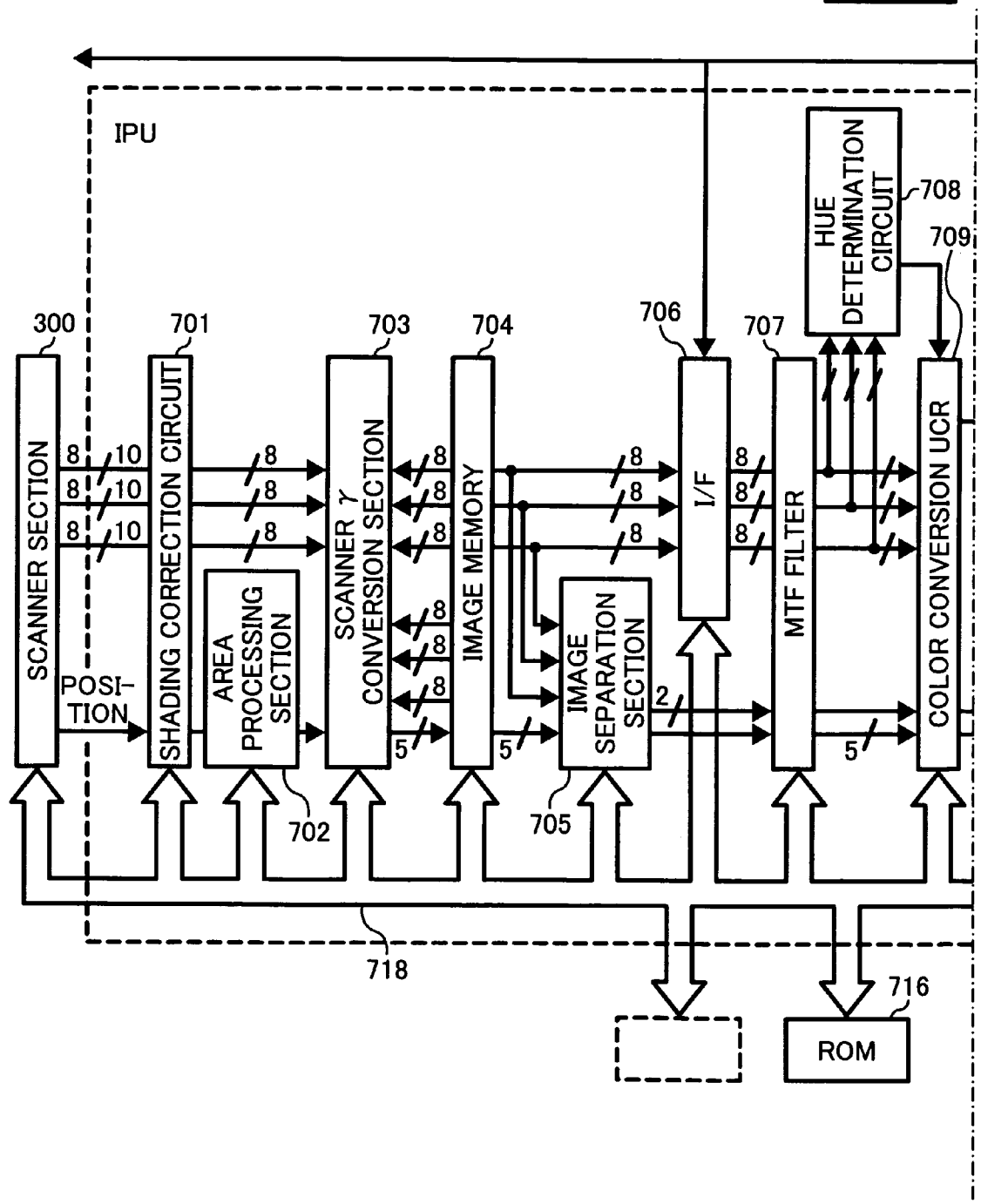
FIG. 6 is a schematic of an IPU and a printer section of the color copying apparatus shown in FIG. 2.
Figure 6B:
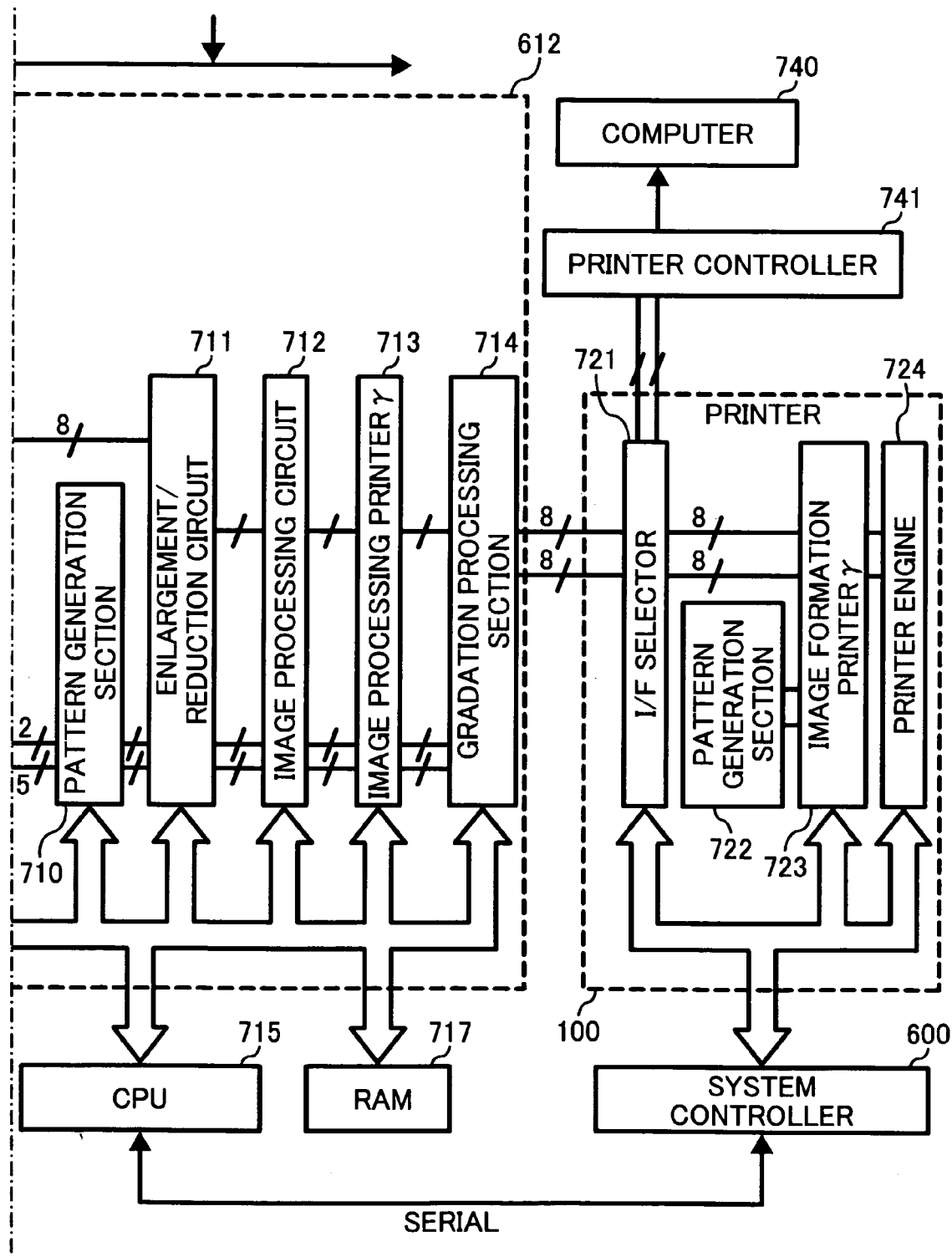

As shown in FIG. 6, the IPU 612 includes a shading correction circuit 701, an area processing section 702, a scanner gamma conversion section 703, an image memory 704, an image separation section 705, an interface (I/F) 706, an modulation transfer function (MTF) filter 707, a hue determination circuit 708, a color conversion under color removal (UCR), a processing circuit 709, a pattern generation section (a gradation pattern generating unit) 710, an enlargement/reduction circuit 711, an image processing circuit 712, an image processing printer gamma conversion circuit (a first image signal converting unit) 713, a gradation processing circuit (a color converting unit) 714, a CPU 715, a ROM 716, and a RAM 717. The respective sections are connected by a bus 718.

The printer section 100 also includes an I/F selector 721, a pattern generation section (a gradation pattern generating unit) 722, an image formation printer γ correction circuit (a second image signal converting unit) 723, and a printer engine 724 for actually performing the image formation in the printer section 100.

The CPU 715 is connected to the ROM 716 and the RAM 717 via the bus 718 and is also connected to the system controller 600 via a serial I/F to receive a command from the operation section 500 or the like via the system controller 600. The CPU 715 determines various parameters for the respective sections of the IPU 612 requiring the parameters based on an image quality mode, concentration information, and area information, or the like sent from the operation section 500 or the like.

The scanner section 300 subjects the original G on the contact glass 3 to color separation of R, G, and B to read the original G with, for example, 10 bits to output the image signal of the read original G to the shading correction circuit 701 of the IPU 612.

The shading correction circuit 701 corrects unevenness of an image signal input from the scanner section 300 in the main scanning direction to output the image signal as, for example, an 8-bit signal to the scanner gamma conversion section 703.

The area processing section 702 generates an area signal for determining which area in the original G corresponds to currently-processed image data. This area signal is used to switch a parameter used in image processing in a subsequent stage. This area processing section 702 determines, depending on each specified area, image processing parameter (e.g., a color correction coefficient, a space filter, or a gradation conversion table) optimal for each original G (e.g., a character, a silver salt photograph (a printing paper), a printed original, an ink jet, a highlight pen, a map, a thermal transfer original).

The scanner gamma conversion section 703 converts a read signal from the scanner section 300 from reflectivity data to color brightness data to store the data in the image memory 704. The image memory 704 stores the image signal after the scanner gamma conversion to output a signal to the MTF filter 707 via the image separation section 70 and the I/F 706. The image separation section 705 determines a character part and a photograph part of the original G and determines a chromatic part and an achromatic part to output the determination result to the MTF filter 707.

The MTF filter 707 performs processing for changing the frequency characteristic of an image signal (e.g., edge enhancement, smoothing, or the like for providing a sharp image, a soft image, the like suitable for preference of a user) and also performs edge enhancement processing depending on the edge level of an image signal (adaptation edge enhancement processing). For example, the MTF filter 707 applies so-called adaptation edge enhancement, in which a character edge is subjected to edge enhancement and a halftone dot image is subjected to edge enhancement, to the respective R, G, and B signals.

Figure 7:
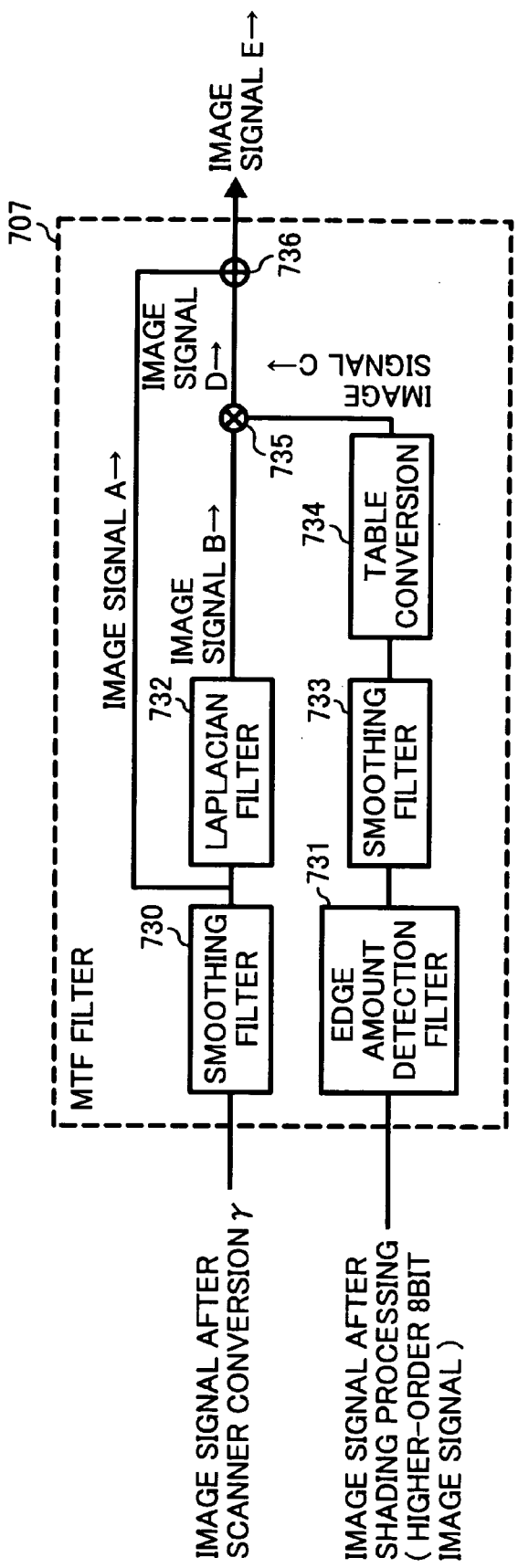
FIG. 7 is a block diagram of an MTF shown in FIG. 6.

Specifically, for example, the MTF filter 707 includes, as shown in FIG. 7, a smoothing filter 730, an edge amount detection filter 731, a Laplacian filter 732, a smoothing filter 733, a table conversion 734, an integrator 735, and an adder 736. The smoothing filter 730 smoothes an image signal, which is converted by the scanner gamma conversion section 703 from a reflectivity linear signal to a brightness linear signal, using the coefficients as described below to output the signal as an image signal A to the Laplacian filter 732 and the adder 736.

TABLE 1

| ($1/18$)x | | | | |
|---|---|---|---|---|
| 0 | 1 | 2 | 1 | 0 |
| 1 | 2 | 4 | 2 | 1 |
| 0 | 1 | 2 | 1 | 0 |

The 3×3 Laplacian filter 732 uses a filter shown in FIG. 8 extract a differential component of image data and outputs the component as the image signal B to the integrator 735.

Among 10 bit image signals that are not subjected to the gamma conversion by the scanner gamma conversion section 703, for example, a higher-order 8 bit component is input to the edge amount detection filter 731. The edge amount detection filter 731 uses a sub-scanning direction edge detection filter shown in FIG. 9A, a main scanning direction edge detection filter shown in FIG. 9B, and an oblique direction detection filter shown in FIG. 9C and FIG. 9D to perform edge detection and output a maximum value among detected edge amounts as an edge level to the smoothing filter 733.

The smoothing filter 733 smoothes an edge level detected by the edge amount detection filter 731 by using, for example, the coefficients shown below to reduce an influence of a difference in sensitivity between even number pixels and odd number pixels of the scanner section 300 and output the edge level to the table conversion circuit 734.

TABLE 2

| ($1/4$)x | | |
|---|---|---|
| 1 | 2 | 1 |

Figure 10:
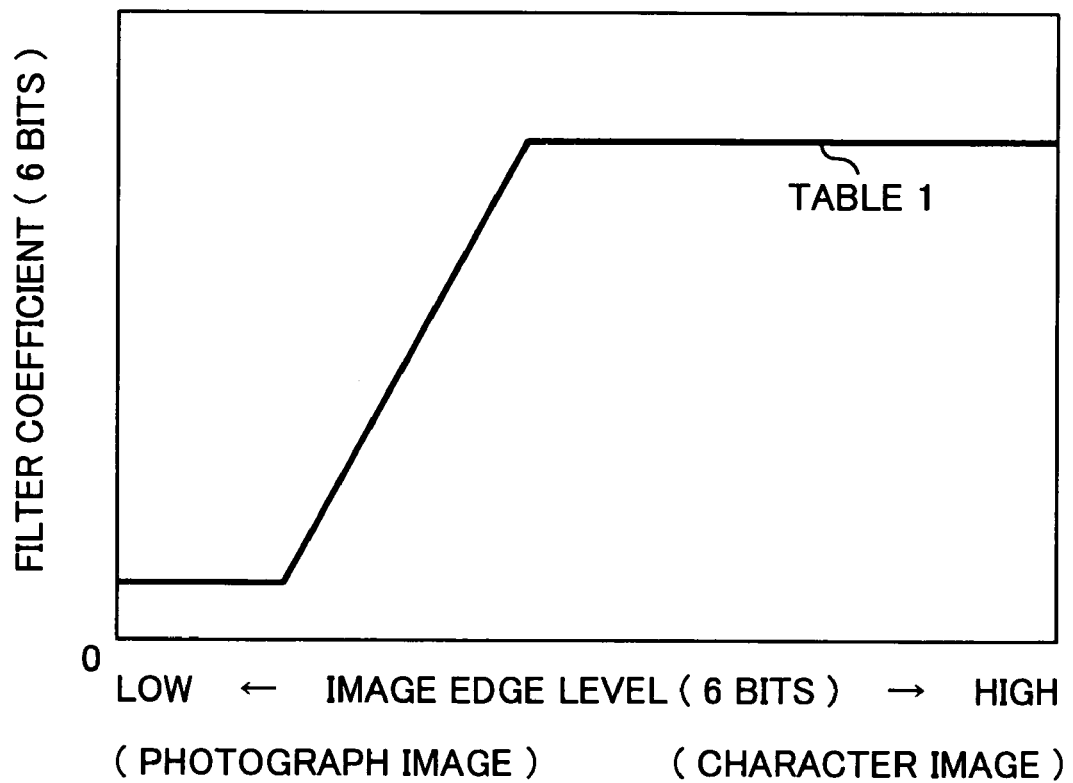
FIG. 10 is a schematic for illustrating table conversion of an edge level by a table conversion circuit.

The table conversion circuit 734 subjects the calculated edge level to table conversion to output the edge level as the image signal C to the integrator 735. In this case, the table conversion circuit 734 uses a table value to specify density of a line or a point (including contrast and concentration) and smoothness of a halftone dot part. An example of the table is shown in FIG. 10. The edge level is maximum when a black line or point is placed in a white background and is smaller when a pixel boundary is smoother (e.g., a fine-printed halftone dot, a silver salt photograph, or a thermal transfer original).

The integrator 735 obtains a product of the edge level converted by the table conversion circuit 734 (the image signal C) and an output value of the Laplacian filter 732 (the image signal B) to output the product as an image signal D to the adder 736. The adder 736 adds the image signal after the smoothing processing (the image signal A) to the image signal D to output a resultant signal as an image signal E to the hue determination circuit 708 and the color conversion UCR processing circuit 709 serving as an image processing circuit in a later stage.

The color conversion UCR processing circuit 709 includes a color correction processing section that corrects a difference between a color separation characteristic of an input system and a spectral characteristic of color materials of an output system to calculate an amount of color materials Y, M, and C required for faithful color reproduction and a UCR processing section for replacing a part where the three colors of Y, M, and C are superposed with K (black). A method for the color correction processing is described with reference to color space diagrams in FIGS. 11 to 13.

Figure 11:
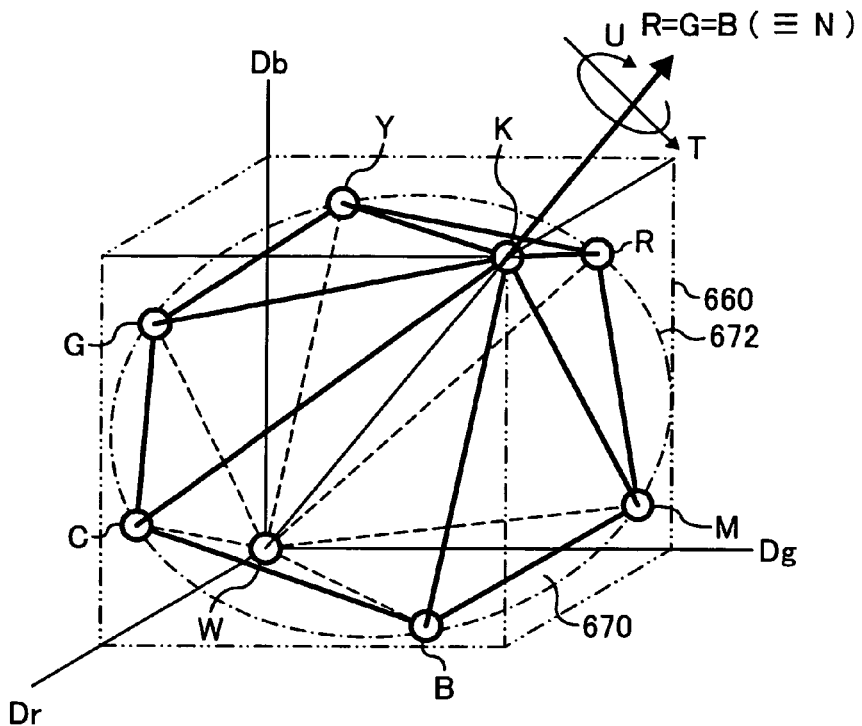
FIG. 11 is a schematic of a color space for explaining a color correction processing.

As shown in FIG. 11, the color correction processing is performed by dividing color spaces (R, G, and B) on a plane radially expanding around an achromatic axis (R=G=B(=N axis)). A saturation changes along a T axis provided to be vertical to the N axis. A hue changes along a rotation direction U around the N axis in a plane parallel to the T axis. Specifically, in the predetermined rotation direction U, all points on a plane formed to be parallel to the N axis are points showing color determined by the rotation direction U.

Points C, M, and Y are points where the saturation is maximized in primary colors of C, M, and Y of the printer, respectively. Points R, G, and B are points where the saturation is maximized in secondary colors of R, G, and B of the printer, respectively. The printer color reproduction area 672 is a substantially spherical area formed by connecting these points C, M, Y, R, G, and B with a point W and a point K with a curve. An inner side of this printer color reproduction area 672 is an area of a color that can be output by the printer. The signal color area 660 is an area of a color that could be taken by a signal color with respect to a color image signal.

Note that the image processing apparatus recognizes, to simplify processing in correcting a signal color in this color space, the printer color reproduction area 670 as the printer color reproduction area 672. The printer color reproduction area 670 is a dodecahedron-like area formed by connecting the points C, M, Y, R, G, and B, and the point W and the point K corresponding to maximum values of eight colors with a straight line. Note that, by recognizing the printer color reproduction area 670 as the printer color reproduction area 672 as described above, no error occurs in a correction amount X.

Figure 12:
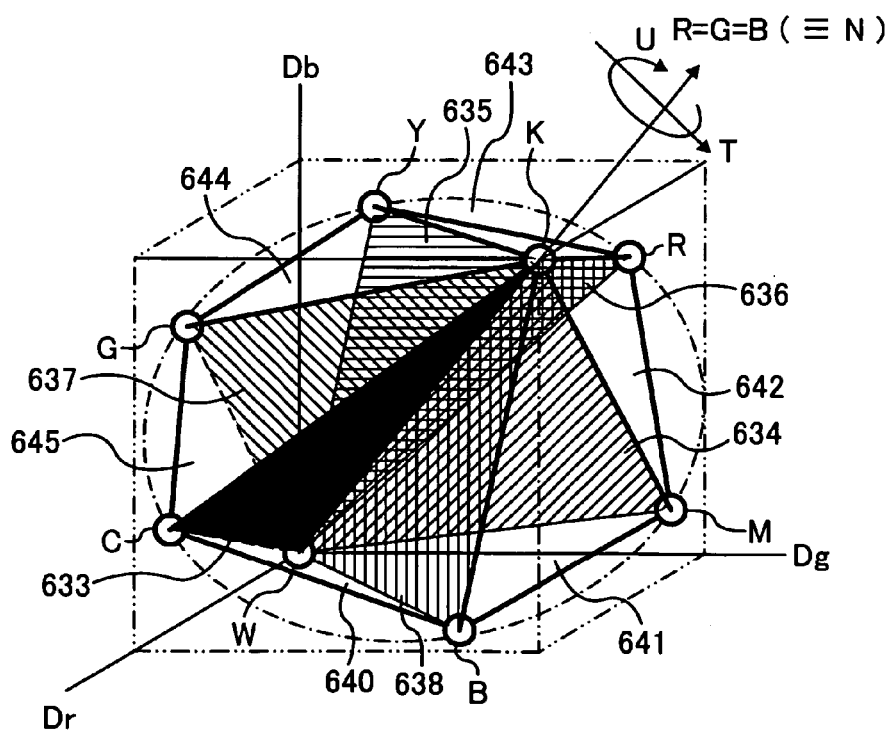
FIG. 12 is a schematic of a color space for explaining a color correction processing.
Figure 13:
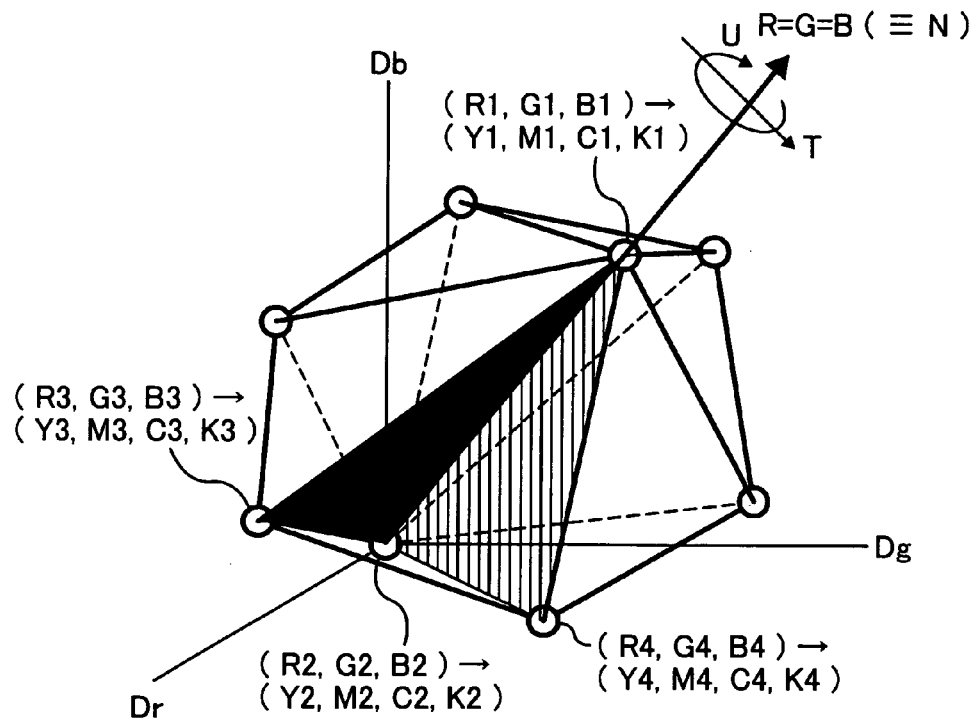
FIG. 13 is a schematic of a color space for explaining a color correction processing.

A hue area is explained with reference to FIG. 12 and FIG. 13. FIG. 12 and FIG. 13 show a color space divided into a plurality of hue areas. A C boundary surface 633 is a plane defined by the points C, W, and K. Similarly, "i" boundary surfaces 634 to 638 (i=M, Y, R, G, and B) are planes defined by the points i, W, and K (i=M, Y, R, G, and B), respectively. The color space is divided by these boundary surfaces 633 to 638. The color spaces divided by these boundary surfaces 633 to 638 include a CB hue area 640, a BM hue area 641, a MR hue area 642, a RY hue area 643, a YG hue area 644, and a GC hue area 645.

A method of determining a hue of image data using the hue determination circuit 708 is explained. First, a hue determination method for a three-dimensional space is explained. Then, a hue determination method for a two-dimensional color plane is explained.

In the hue determination method for a three-dimensional space, each hue evaluation value Fx is calculated based on image data to determine, based on a hue evaluation value Fx, a hue area code of a hue area including a signal color.

A theoretical method of deriving the hue evaluation value Fx is explained. Color coordinates representing the points C, M, Y, R, G, B, W, and K in FIG. 11 are represented as (Dir, Dig, Dib) (i=c, m, y, r, g, b, w, and k).

For example, color coordinates corresponding to the point C are (Dcr, Dcg, Dcb). In this case, the C boundary surface 633 is represented by, for example, Equations 1 to 6 below.

$$(Dcg-Dcb)*Dr+(Dcb-Dcr)*Dg+(Dcr-Dcg)*Db=0 \quad (1)$$

$$(Dmg-Dmb)*Dr+(Dmb-Dmr)*Dg+(Dmr-Dmg)*Db=0 \quad (2)$$

$$(Dyg-Dyb)*Dr+(Dyb-Dyr)*Dg+(Dyr-Dyg)*Db=0 \quad (3)$$

$$(Drg-Drb)*Dr+(Drb-Drr)*Dg+(Drr-Drg)*Db=0 \quad (4)$$

$$(Dgg-Dgb)*Dr+(Dgb-Dgr)*Dg+(Dgr-Dgg)*Db=0 \quad (5)$$

$$(Dbg-Dbb)*Dr+(Dbb-Dbr)*Dg+(Dbr-Dbg)*Db=0 \quad (6)$$

A color space is divided, for example, by the boundary surface 633 into two areas, an area including the CB hue area 640 and an area including the GC hue area 645. Similarly, the color space is divided to two areas by the respective boundary surfaces 634 to 638. Thus, it is possible to determine which hue area includes a color image signal based on which area of two areas formed by the respective boundary surfaces 633 to 638 includes the color image signal. It is possible to determine a hue area including the color image signal based on plus and minus of a value obtained by substituting the color image signals (Dr, Dg, and Db) in Equations 1 to 6. Thus, the hue evaluation value Fx is determined based on Equations 1 to 6. The left sides of Equations 1 to 6 are assumed to be Fc, Fm, Fy, Fr, Fg, and Fb, respectively.

Therefore, in the hue determination for a three-dimensional space, the respective hue evaluation values Fx determined in Equations 7 to 12 below are calculated.

$$Fc=(Dcg-Dcb)*Dr+(Dcb-Dcr)*Dg+(Dcr-Dcg)*Db \quad (7)$$

$$Fc=(Dmg-Dcm)*Dr+(Dmb-Dmr)*Dg+(Dmr-Dmg)*Db \quad (8)$$

$$Fc=(Dyg-Dyb)*Dr+(Dyb-Dyr)*Dg+(Dyr-Dyg)*Db \quad (9)$$

$$Fc=(Drg-Drb)*Dr+(Drb-Drr)*Dg+(Drr-Drg)*Db \quad (10)$$

$$Fc=(Dgg-Dgb)*Dr+(Dgb-Dgr)*Dg+(Dgr-Dgg)*Db \quad (11)$$

$$Fc=(Dbg-Dbb)*Dr+(Dbb-Dbr)*Dg+(Dbr-Dbg)*Db \quad (12)$$

For example, when Fc and Fg calculated at arbitrary points (Dr, Dg, Db) in a color space satisfy a condition "Fc≦0 and Fb>0", this point is included in the CB hue area, as it is seen from the table shown below.

TABLE 3

| Conditions for hue evaluation coefficients | Hue area codes |
| --- | --- |
| Fc ≦ 0 and Fb > 0 | 0{CB hue area} |
| Fc ≦ 0 and Fm > 0 | 1{BM hue area} |
| Fm ≦ 0 and Fr > 0 | 2{MR hue area} |
| Fr ≦ 0 and Fy > 0 | 3{RY hue area} |
| Fy ≦ 0 and Fg > 0 | 4{YG hue area} |
| Fg ≦ 0 and Fg > 0 | 5{GC hue area} |

As described above, each hue area is defined by the hue evaluation value Fx. The conditions for hue evaluation value Fx associated with the hue area codes in the hue area code table shown in Table 3 are conditions determined by the equations.

Note that, although the hue area code table shown in Table 3 includes color coordinates on the N axis in the GC hue area for convenience, the color coordinates may be included in other hue areas. The hue evaluation value Fx changes depending on an actual value of (Dir, Dig, Dib) (i=c, m, y, r, g, b, w, k). Thus, conditions for hue evaluation values to be associated with the respective hue area codes in the hue area code table (Table 8) may be changed depending on a hue evaluation value.

Figure 14:
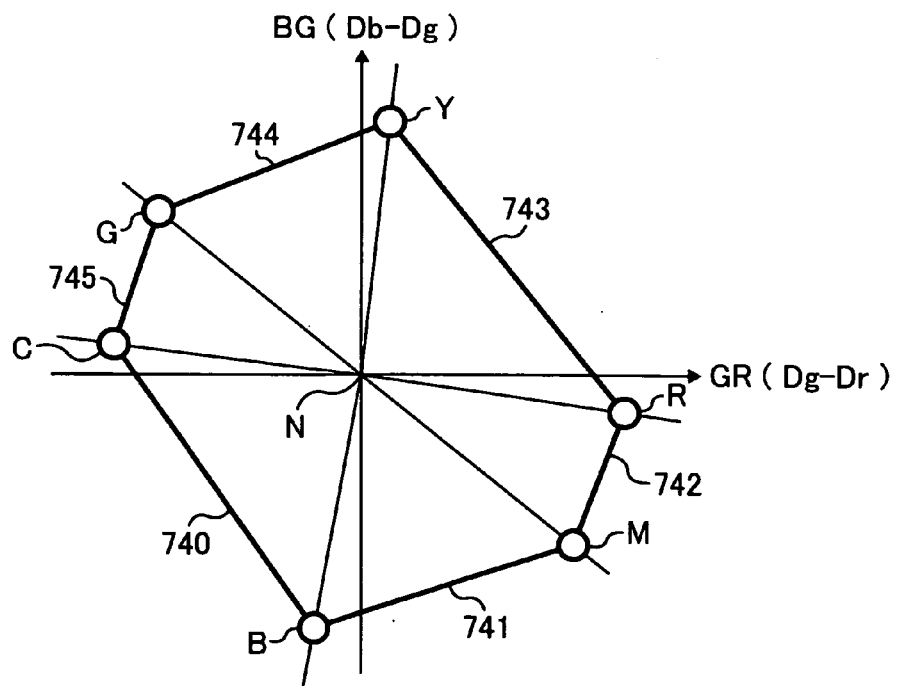
FIG. 14 is a schematic of a color space for explaining a color correction processing.
Figure 15:
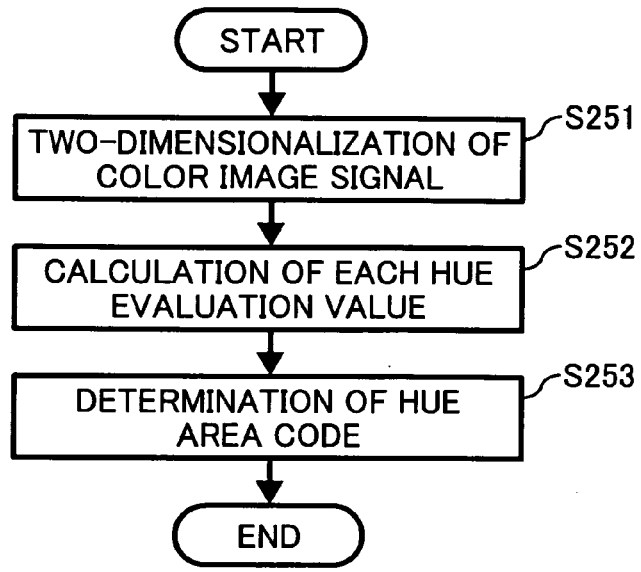
FIG. 15 is a flowchart of a hue determination processing.

A method of mapping a three-dimensional color space to a two-dimensional plane to use a color coordinate of a color image signal in a two-dimensional plane to determine the hue area including the color image signal is explained based on a color plane diagram in FIG. 14 and a flowchart in FIG. 15 with respect to operations of the hue determination circuit 708.

In the flowchart shown in FIG. 15, first, when a color image signal is input to the hue determination circuit 708, a value of the color image signal is two-dimensionalized (S251). The value of the color image signal is substituted in the following Equation to obtain a difference GR and a difference BG.

$$GR=Dg-Dr \quad (13)$$

$$BG=Db-Dg \quad (14)$$

Consequently, values (Dr, Dg, Db) in a color space of the color image signal are converted the values (GR, BG) in a color plane.

FIG. 14 is a schematic of a two-dimensional plane to which a color image signal should be mapped. In this two-dimensional plane, a straight line corresponding to "Dg–Dr" is assumed to be the GR axis and a straight line corresponding to "Db–Dg" is assumed to be the BG axis. The GR axis and the BR axis are orthogonal to each other.

The points (Dr, Dg, Db) on the color space are mapped to the color plane shown in FIG. 14 by a Equation below. The points (Dnr, Dng, Dnb) on the N axis in the color space are mapped to the (Dng–Dnr, Dnb–Dng) in the color plane shown in FIG. 14. Since Dnr=Dng=Dnb is established, Equation 15 below is obtained.

$$(Dng-Dnr, Dnb\cdot Dng)=(0,0) \quad (15)$$

All points on the N axis are mapped to the origin n in the plane shown in FIG. 14. The points C, M, Y, R, G, and B in the color space are arranged around the origin n as shown in FIG. 14. Thus, six hue areas 640 to 645 shown in FIG. 12 are mapped to areas 740 to 745 in the color plane that are divided by straight lines connecting the N axis to the points C, M, Y, R, G, and B, respectively.

Based on the respective color values of the input color image signal, the difference GR, the difference BG, and each hue evaluation value Fx' (x=c, m, y, r, g, b) are calculated (S252). Based on the respective hue evaluation value Fx', difference GR, and difference BG, the hue area code table shown in the Table 4 below is used to determine a hue area code of a hue area including a signal color (S253).

A method of deriving the hue evaluation value Fx' is explained. In the color plane shown in FIG. 14, the straight lines connecting the point N to the points C, M, Y, R, G, and B (i.e., straight line NC, straight line NM, straight line NY, straight line NR, straight line NG, and straight line NB) are represented as follows, respectively.

$$BG=(Dcb-Dcg)/(Dcg-Dcr)*GR \text{ (where } Dcg-Dcr\neq 0) \quad (16)$$

$$BG=(Dmb-Dmg)/(Dmg-Dmr)*GR \text{ (where } Dmg-Dmr\neq 0) \quad (17)$$

$$BG=(Dyb-Dyg)/(Dyg-Dyr)*GR \text{ (where } Dyg-Dyr\neq 0) \quad (18)$$

$$BG=(Drb-Drg)/(Drg-Drr)*GR \text{ (where } Drg-Drr\neq 0) \quad (19)$$

$$BG=(Dgb-Dgg)/(Dgg-Dgr)*GR \text{ (where } Dgg-Dgr\neq 0) \quad (20)$$

$$BG=(Dbb-Dbg)/(Dbg-Dbr)*GR \text{ (where } Dbg-Dbr\neq 0) \quad (21)$$

From a magnitude relation between the BG value obtained by substituting the GR value of the color image signal and the actual BG value of the color image signal in respective Equations 16 to 21, a positional relation between a straight line determined by each Equation and a point corresponding to a color image signal are seen. Thus, it is possible to determine which hue area includes the color image signal based on the magnitude relation between the BG value obtained by substituting the GR value of the color image signal in Equations 16 to 21 and the BG value of the color image signal.

Thus, based on Equations 16 to 21, the hue evaluation value Fx' is determined in the manner as described below.

$$Fc'=(Dcb-Dcg)/(Dcg-Dcr)*GR \quad (22)$$

$$Fm'=(Dmb-Dmg)/(Dmg-Dmr)*GR \quad (23)$$

$$Fy'=(Dyb-Dyg)/(Dyg-Dyr)*GR \quad (24)$$

$$Fr'=(Drb-Drg)/(Drg-Drr)*GR \quad (25)$$

$$Fg'=(Dgb-Dgg)/(Dgg-Dgr)*GR \quad (26)$$

$$Fb'=(Dbb-Dbg)/(Dbg-Dbr)*GR \quad (27)$$

Equations 22 to 27 are obtained by changing the left sides of Equations 16 to 21 to Fc', Fm', Fy', Fr', Fg', and Fb'.

For example, when Fc' and Fb' calculated from an arbitrary point (GR, BG) in a color plane satisfy a condition "BG≦Fc' and BG>Fb'", it is seen from a table below that this point is included in the CB hue area.

TABLE 4

| Conditions for hue evaluation coefficients Fx' | Hue area codes code |
|---|---|
| BG ≦ fc' and BG > fb' | 0{CB part color space} |
| BG ≦ fb' and BG > fm' | 1{BM part color space} |
| BG ≦ fm' and BG > fr' | 2{MR part color space} |
| BG ≦ fr' and BG > fy' | 3{RY part color space} |
| BG ≦ fy' and BG > fg' | 4{YG part color space} |
| BG ≦ fg' and BG ≧ fc' | 5{GC part color space} |

Figure 16:
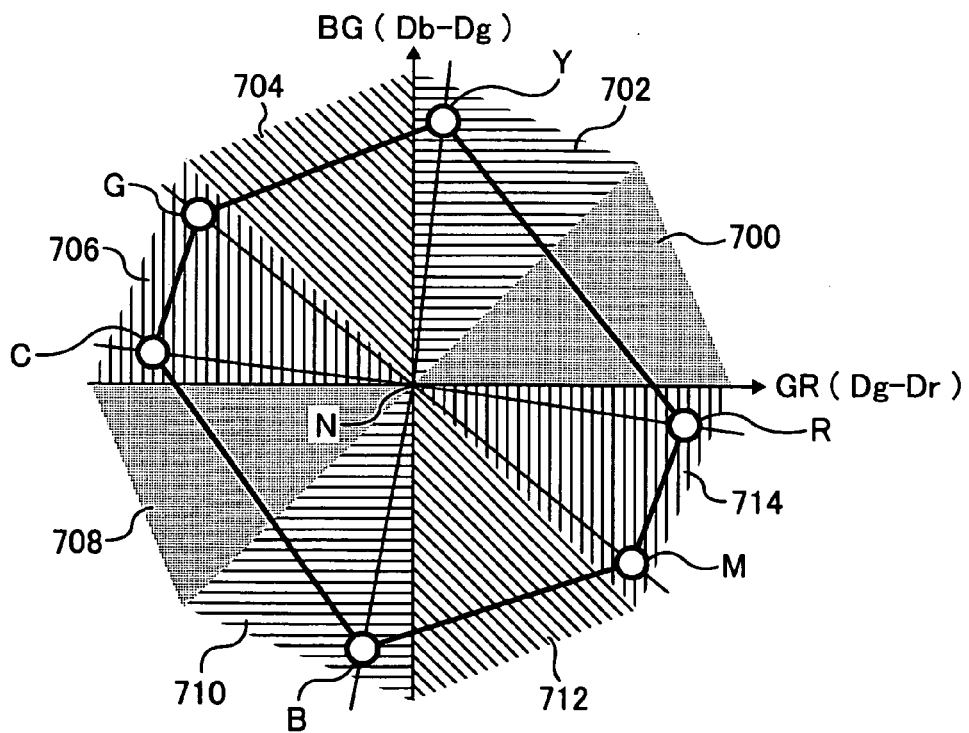
FIG. 16 is a schematic of a color plane for explaining color correction processing.

Conditions for hue evaluation value Fx' in the hue area code table shown in Table 4 that are associated with hue area codes are conditions determined based on the equation. In this way, the conditions for the hue evaluation value Fx' are set in the hue area code table of Table 4 in advance. Thus, the hue determination circuit 708 only has to specify, from the conditions for the hue evaluation value Fx' associated with the respective hue area codes as shown in the hue area code table of Table 4, conditions satisfied by the BG and the hue evaluation value Fx' to select, in the hue area code table (Table 4), a hue area code corresponding to this condition. FIG. 16 is the color plane diagram in FIG. 14 associated with a hue area.

In the hue area code table shown in Table 4, the color coordinates on the N axis are included in the GC hue area. However, the color coordinates may be included in other hue areas.

The hue evaluation value Fx' changes depending on an actual value of (Dir, Dig, Dib) (i=c, m, y, r, g, b, w, and k). Therefore, in the hue area code table (Table 4), conditions of a hue evaluation value that should be associated with each hue area code may be changed depending on a value of the hue evaluation value Fx'.

Note that, although the conversion equation shown in Equations 13 and 14 are used to convert the color image signal (Dr, Dg, Db) to the value (GR, BG) in the color plane, the color image signal may be converted by Equations 28 and 29 below.

$$GR=Ri\cdot Dr+Gi\cdot Dg+Bi\cdot Db \quad (28)$$

$$BG=Rj\cdot Dr+Gj\cdot Dg+Bj\cdot Db \quad (29)$$

where Ri=Gi=Bi=0 and Rj=Gj=Bj=0.

As described above, it is judged by the hue determination circuit 708 to which part in the divided spaces the input image signal (R, G, B) belongs. Thereafter, masking coefficients set in advance for the respective spaces are used to perform a color correction processing with the following Equation (30) (a color correcting unit).

$$\begin{pmatrix} Y(hue) \\ M(hue) \\ C(hue) \\ K(hue) \end{pmatrix} = \begin{pmatrix} aYB(hue) & aYG(hue) & aYR(hue) & aY(hue) \\ aMB(hue) & aMG(hue) & aMR(hue) & aM(hue) \\ aCB(hue) & aCG(hue) & aCR(hue) & aC(hue) \\ aKB(hue) & aKG(hue) & aKR(hue) & aK(hue) \end{pmatrix} \begin{pmatrix} B(hue) \\ G(hue) \\ R(hue) \\ 1 \end{pmatrix} \quad (30)$$

In that case, linear processing for a masking coefficient (e.g., concentration adjustment or color balance adjustment) is performed as required. Note that, in the following description, a division point refers to a point where a boundary surface intersects with a side (e.g., point G (Green) in FIG. 11). In one example, when the hue is G (Green), the following Equation 31 is obtained.

$$\begin{pmatrix} Y(G) \\ M(G) \\ C(G) \\ K(G) \end{pmatrix} = \begin{pmatrix} aYB(G) & aYG(G) & aYR(G) & aY(G) \\ aMB(G) & aMG(G) & aMR(G) & aM(G) \\ aCB(G) & aCG(G) & aCR(G) & aC(G) \\ aKB(G) & aKG(G) & aKR(G) & aK(G) \end{pmatrix} \begin{pmatrix} B(G) \\ G(G) \\ R(G) \\ 1 \end{pmatrix} \quad (31)$$

The left side P (hue) (P=C, M, Y, K; hue=hues R, G, B, Y, M, C, K, W etc) is referred to as a printer vector, the right side S (hue)(S=B, G, R; hue=hues R, G, B, Y, M, C, K, W etc) is referred to as a scanner vector, and aPS (hue) (P=C, M, Y, K; S=B, G, and R) is referred to as a linear masking coefficient for each hue.

Usually, a linear masking coefficient aPS (hue) (P=Y, M, C, K; S=R, G, B, constant) of each space is calculated by calculation described below by determining in advance the R,G,B values at four points, that is, different two points (R1, G1, B1)

and (R2, G2, B2) on an achromatic axis as shown in FIG. 13 and two points (R3, G3, B3) and (R4, G4, B4) on 2 boundary surfaces not on the achromatic axis, and recording values of development sections C, M, Y, and K optimal for the color reproduction (C1, M1, Y1, K1), (C2, M2, Y2, K2), (C3, M3, Y3, K3), and (C4, M4, Y4, K4).

$$\begin{pmatrix} aYB(3-4) & aYG(3-4) & aYR(3-4) & aY(3-4) \\ aMB(3-4) & aMG(3-4) & aMR(3-4) & aM(3-4) \\ aCB(3-4) & aCG(3-4) & aCR(3-4) & aC(3-4) \\ aKB(3-4) & aKG(3-4) & aKR(3-4) & aK(3-4) \end{pmatrix} = \begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}^{-1}$$

(32)

Equation 32 is obtained by multiplying $$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} = \begin{pmatrix} aYB(3-4) & aYG(3-4) & aYR(3-4) & aY(3-4) \\ aMB(3-4) & aMG(3-4) & aMR(3-4) & aM(3-4) \\ aCB(3-4) & aCG(3-4) & aCR(3-4) & aC(3-4) \\ aKB(3-4) & aKG(3-4) & aKR(3-4) & aK(3-4) \end{pmatrix} \begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}$$

(33)

$$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}$$

(34)

which is an inverse matrix of $$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}^{-1}$$

(35)

and replacing both sides.

In Equation 33, aXY(3-4) represents a masking coefficient established in a color area between the hue 3 and the hue 4. Recording values of C, M, Y, and K at the respective points are equivalent achromatic concentration conversion values before the UCR.

Note that, to simplify the explanation, it is assumed that two points on an achromatic axis are a white point and a black point. In this case, when a maximum value taken by the equivalent achromatic concentration conversion value is assumed to be Xmax, the respective values have the relations as shown below.

In the case of a white point: R1=G1=B1=C1=M1=Y1=0≧K1

In the case of a black point: R1=G1=B1=C1=M1=Y1=Xmax≧K2

It is preferable that two points on the boundary surface are points where the minimum values of the recording values of the development sections C, M, Y, and K are 0 and the maximum value of the recording value are Xmax (i.e., a point that can be recorded on each boundary surface and that has the highest saturation). The following conditions are established.

Min(C3,M3,Y3)=0≧K3

Max(C3,M3,Y3)=Xmax

Min(C4,M4,Y4)=0≧K4

Max(C4,M4,Y4)=Xmax

It is also possible to control a UCR ratio by determining a recording value of the development section K from a minimum value among the minimum values of the development sections C, M, and Y in the manner as described below.

In the case of the UCR ratio of 100%: K=Min(C, M, Y) In the case of the UCR ratio of 70%: K=Min(C, M, Y)×0.7

When the color space (R, G, B) is divided by 6 boundary surfaces as shown in FIG. 11, the R, G, and B values at eight points, that is, at least six points on each boundary surface and two points on the achromatic axis and recording values of C, M, Y, and K of development sections optimal for the reproduction of the color, are determined in advance. Based on the values, masking coefficients of the respective spaces are calculated. Note that, it is possible to calculate the masking coefficients of the respective spaces in advance as described above, store the masking coefficients in a ROM, RAM, or the like, and select an appropriate masking coefficient according to a color judged in the hue judgment to perform color correction to perform a color correction in color correction processing.

On the other hand, the color conversion UCR processing circuit 709 performs a calculation using the following equation to perform a color correction processing.

$$Y'=Y-\alpha*\min(Y,M,C)$$

$$M'=M-\alpha*\min(Y,M,C)$$

$$C'=C-\alpha*\min(Y,M,C)$$

$$Bk=\alpha*\min(Y,M,C)$$

In the equation, α denotes a coefficient that determines amount of UCR and, when α is 1, a 100% UCR processing is obtained. The value α may be a fixed value. For example, α is set close to 1 in a high concentration part and is set close to 0 in a highlight part (a low image concentration section) to smooth an image in the highlight part.

The masking coefficients are different for each of fourteen hues, that is, twelve hues obtained by further evenly dividing six hues of R, G, B, Y, M, and C, respectively, and black and white.

The hue determination circuit 708 determines to which hue an image data read by the scanner section 300 belongs to output a result of the determination to the color conversion UCR processing circuit 709.

Based on the determination result of the hue determination circuit 708, the color conversion UCR processing circuit 709 selects masking coefficients for the respective hues to perform the color correction processing.

The enlargement/reduction circuit 711 subjects the image data after the color correction processing to vertical and horizontal enlargement/reduction. The image processing (create) circuit 712 subjects the image data after the enlargement/reduction processing to repeat processing or the like to output a result the processing to the image processing printer gamma conversion circuit 713.

The image processing printer gamma conversion circuit 713 can also perform, according to the image quality mode (e.g., character, photograph), correction of an image signal while simultaneously performing a background skip or the like. The image processing printer gamma conversion circuit 713 has a plurality of gradation conversion tables (image signal conversion tables) (e.g., ten tables) that can be switched according to an area signal generated by the image processing circuit 712 to select a gradation conversion table optimal for each original (e.g., a character, a silver salt photograph (printing paper), a printed original, ink jet, a highlight pen, a map, or a thermal transfer original) from a plurality of image processing parameters, correct an image signal depending on the image quality mode, and output the result to the gradation processing circuit 714.

The gradation processing circuit 714 subjects the image data input from the image processing printer gamma conversion circuit 713 to dither processing to output a result of the processing to the interface selector 721 of the printer section 100.

The gradation processing circuit 714 can select dither processing of an arbitrary size from a 1×1 no-dither processing to dither processing by m×n pixels (m and n are positive integers). For example, the gradation processing circuit 714 performs dither processing using up to thirty-six pixels. The size of a dither processing using all of thirty-six pixels includes, for example, 6 pixels in the main scanning direction×6 pixels in the sub-scanning direction (total thirty-six pixels) or 18 pixels in the main scanning direction×2 pixels in the sub-scanning direction (total thirty-six pixels).

Figure 17A:
FIG. 17A is a schematic for illustrating pixel numbers when total thirty-six pixels, which is 6 pixels in a main scanning direction×6 pixels in a sub-scanning direction, are used in a dither processing.
Figure 18A:
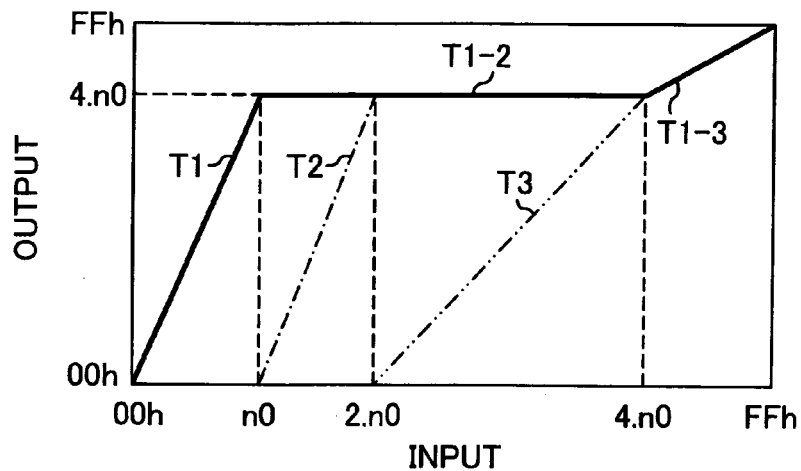
FIG. 18A is a schematic of a gradation processing table for 2 pixels in the main scanning×2 pixels in the sub-scanning in the case of an index table in FIG. 17B.
Figure 18B:
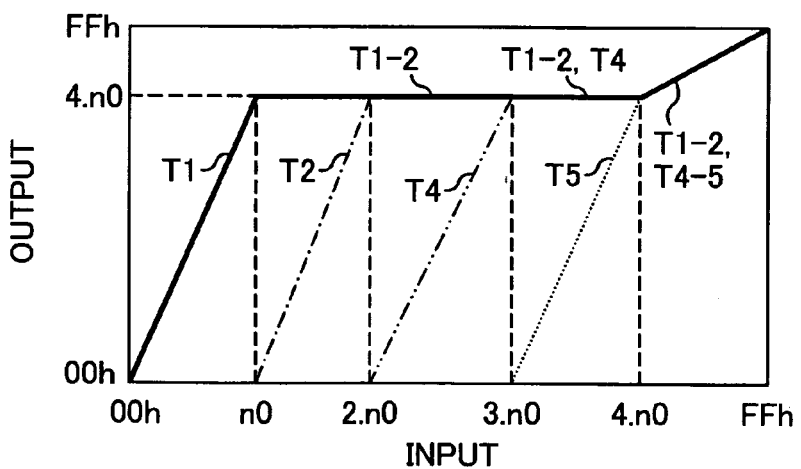
FIG. 18B is a schematic of a gradation processing table for 2 pixels in the main scanning×2 pixels in the sub-scanning in the case of an index table in FIG. 17B.
Figure 18C:
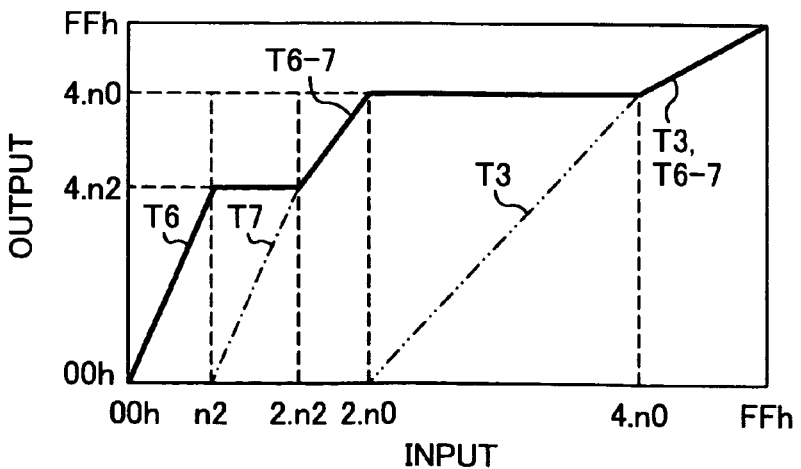
FIG. 18C is a schematic of a gradation processing table for 2 pixels in the main scanning×2 pixels in the sub-scanning in the case of an index table in FIG. 17B.

FIG. 17A is a schematic of an example in which 6 pixels in the main scanning direction×6 pixels in the sub-scanning direction (total thirty-six pixels) are used for the dither processing. FIG. 17B is a schematic of an example of an index table that records correspondence between respective pixels and gradation table numbers adapted to the pixels. FIGS. 18A to 18C are schematics of examples of the gradation processing table (a dither table) of 2 pixels in the main scanning direction×2 pixels in the sub-scanning direction.

The gradation processing circuit 714 stores the index table and the gradation processing table in a temporary memory referred to as an internal resistor. Values for the respective tables are set according to control of the CPU 715.

In the gradation processing tables of FIGS. 18A to 18C, the horizontal axis represents an image signal input to a pixel while the vertical axis represents an output value from the pixel. FIG. 18A is a diagram of three gradation processing tables of T1, T2, and T3. FIG. 18B is a diagram of gradation processing tables of T1 to T5. The gradation processing tables of T1 and T2 are common to those in FIG. 18A but the gradation processing tables of T4 and T5 are different from those in FIG. 18A. FIG. 18C is a diagram of gradation processing tables of T6, T7, and T3. The gradation processing table of T3 is common to that of FIG. 18A.

Figures 19A, 19B:
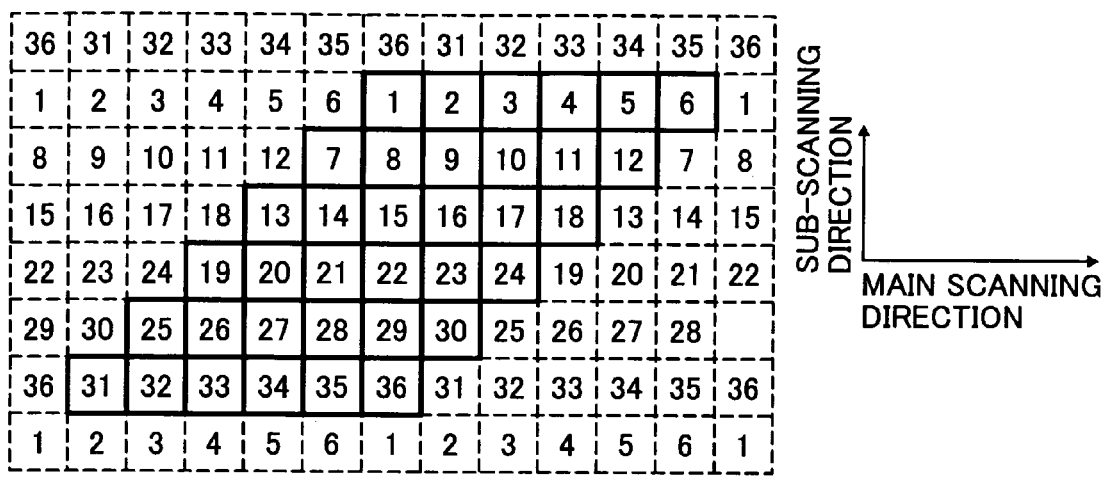
FIG. 19A is a schematic for illustrating pixel numbers when the pixel numbers shown in FIG. 17A are shifted by one pixel in the main scanning direction.
FIG. 19B is a schematic for illustrating an index table when the pixel numbers shown in FIG. 17A are shifted by one pixel in the main scanning direction.

In FIG. 17A, when values of the pixel numbers are set such that the pixel numbers are shifted by one pixel in the main scanning direction (FIG. 19A), an index table as shown in FIG. 19B is obtained. Although not shown in the figure, the values may set such that the pixel numbers are shifted in the sub-scanning direction. The values of the shift amount of the pixel numbers in the main scanning direction and the shift amount of the pixel numbers in the sub-scanning direction may be set to set a gradation processing in which different screen angles are set for the respective colors of Y, M, C, and K.

Figure 20:
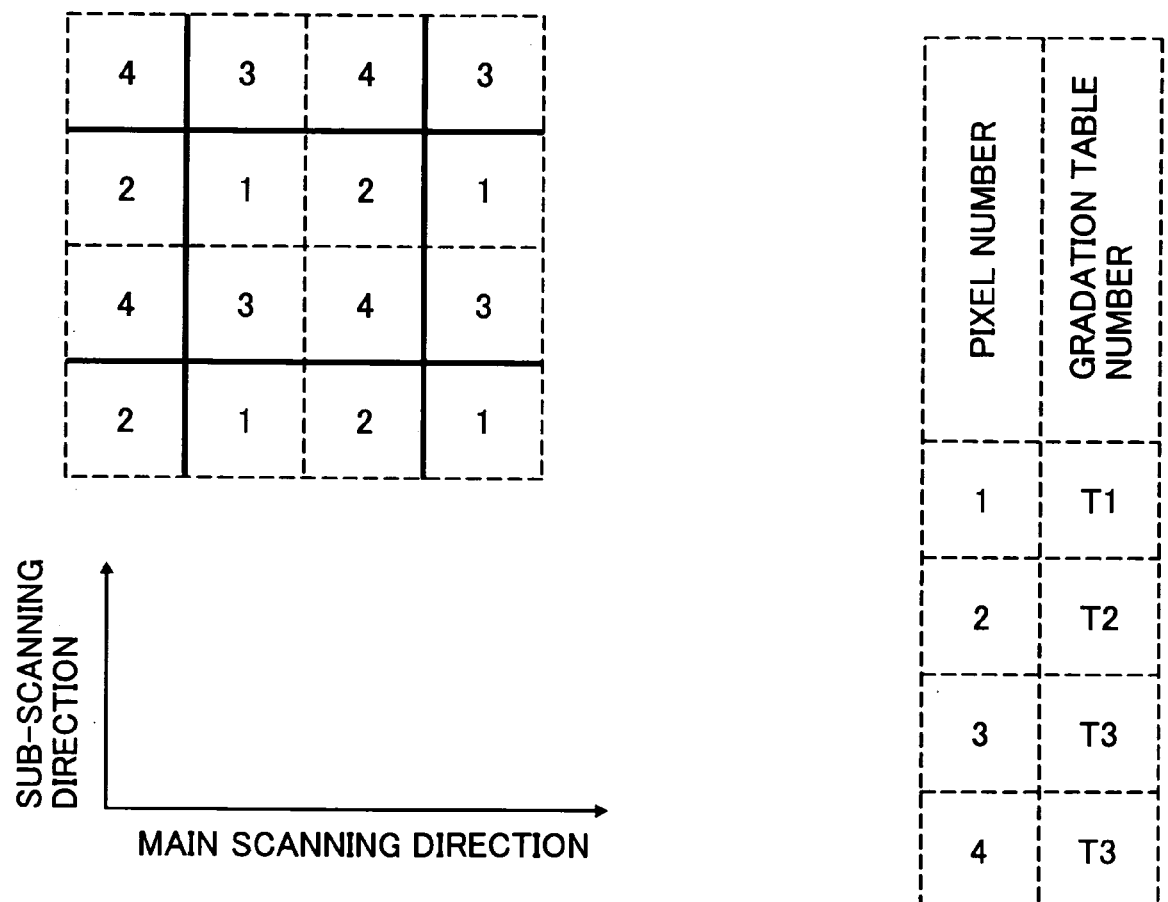
FIG. 20 is a schematic for illustrating an index table corresponding to dither of 2 pixels in the main scanning direction×2 pixels in the sub-scanning direction.

FIG. 20 is a schematic of an index table corresponding to dither of 2 pixels in the main scanning direction×2 pixels in the sub-scanning direction.

In this case, in an output of the gradation processing circuit 714, a pixel frequency is reduced to ½. Thus, the image data bus has a width of sixteen bits (two pieces of image data of eight bits) to be able to simultaneously transfer data of two pixels to the printer section 100.

Referring back to FIG. 6, the printer section 100 is connected to the IPU 612 by the I/F selector 721 as described above. The I/F selector 721 has a switching function to output the image data read by the scanner section 300 for processing by an external image processing apparatus or the like or to allow the printer section 100 to output the image data from an external host computer 740 or an image processing apparatus. Note that the image data from the external host computer 740 is input to the I/F selector 721 via the printer controller 741.

The image formation printer γ (process control γ) correction circuit 723 converts the image signal from the I/F selector 721 with a gradation conversion table (an image signal conversion table) to output a result of the conversion to a laser modulation circuit of the printer engine 724.

As described above, it is possible to use the color copying apparatus 1 a printer because the image signal from the host computer 740 is input to the I/F selector 721 via the image signal and subjected to gradation conversion by the image formation printer γ correction circuit 723 and image formation is performed by the printer engine 724.

The color copying apparatus 1 executes image processing when the CPU 715 uses the RAM 717 as a work memory based on a program in the ROM 716 to control the respective sections of the IPU 612. When the CPU 715 is connected to the system controller 600 via the serial I/F to receive a command from the operation section 500 or the like (e.g., an image quality mode, concentration information, or area information) via the system controller 600, the CPU 715 sets various parameters in the IPU 612 based on the image quality mode, the concentration information, the area information, or the like to perform the image processing.

The pattern generation section 710 of the IPU 612 and the pattern generation section 722 of the printer section 100 generate gradation patterns to be used by the IPU 612 and the printer section 100, respectively.

Figure 21:
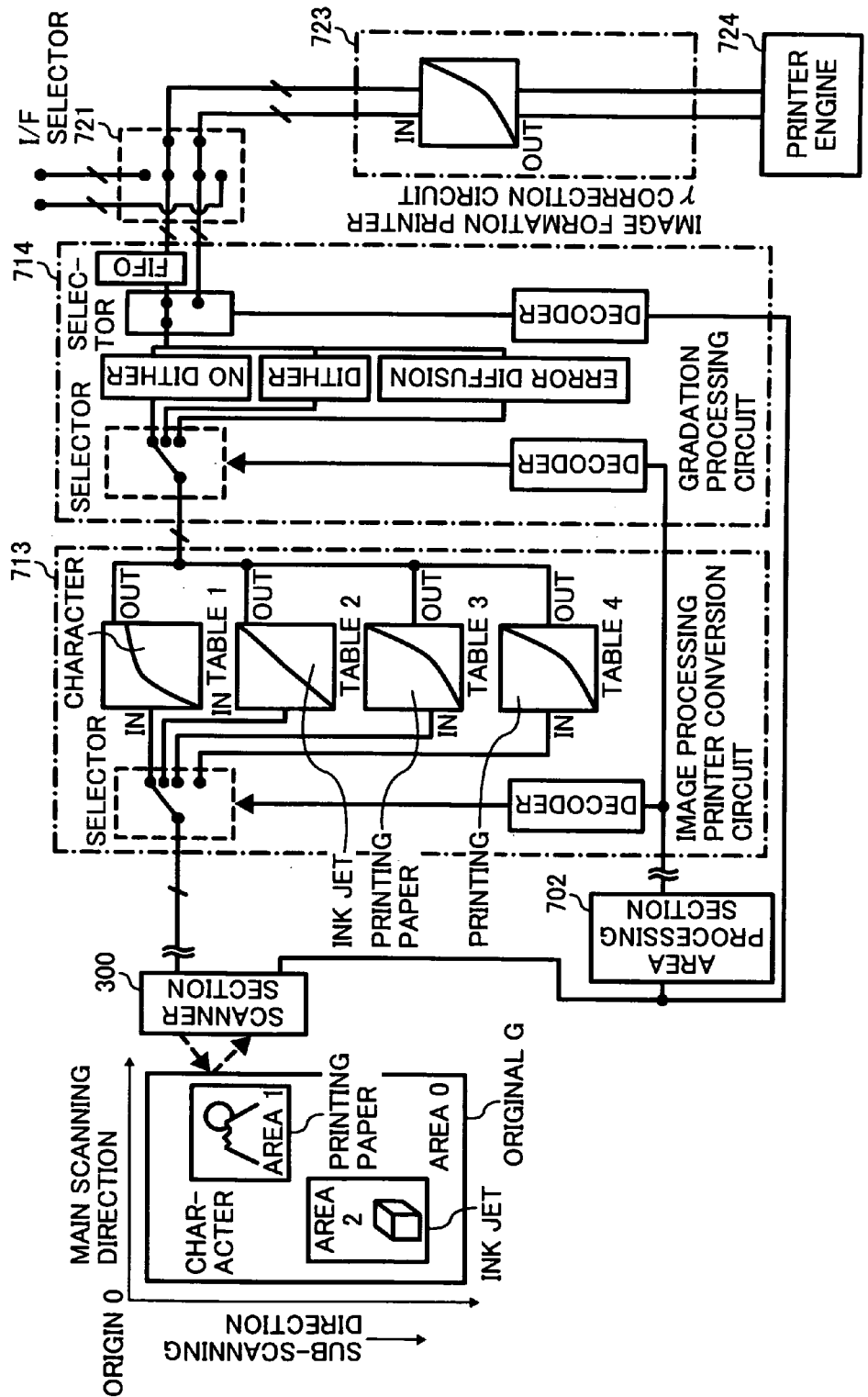
FIG. 21 is a schematic for illustrating an area processing by an area processing section shown in FIG. 6.

The area processing section 702 generates, as described above, an area signal to differentiate a currently-processed image data corresponding to an area in the original G. This area signal is used to switch a parameter used for image processing in a later stage. It is possible to represent a concept of the area processing by this area processing section 702 as shown in FIG. 21. In FIG. 21, with respect to image data obtained by reading the original G having a plurality of areas (e.g., a character area (an area 0), a printing paper area (an area 1), and an ink jet area (an area 2)) with the scanner section 300, the area processing section 702 compares specified area information (area information) on the original G with read position information during image reading to generate an area signal. As in the description for the image processing printer gamma conversion circuit 713 and the gradation processing circuit 714 in FIG. 21, the IPU 612 changes, based on this area signal from the area processing section 702, parameters used by the scanner gamma conversion section 703, the MTF filter 707, the color conversion UCR processing circuit 709, the image processing circuit 712, the image processing printer gamma conversion circuit 713, and the gradation processing circuit 714.

For example, the image processing printer gamma conversion circuit 713 decodes an area signal from the area processing section 702 with a decoder and uses a selector to select a table from a plurality of gradation conversion tables (e.g., a character (table 1), ink jet (table 2), printing paper (table 3), printing (table 4)). In the example of the original G in FIG. 21, the character area 0, the printing paper area 1, and the ink jet area 2 are provided. The image processing printer gamma conversion circuit 713 selects the character gradation conversion table 1 for the character area 0, the printing paper gradation conversion table 3 for the printing paper area 1, and the ink jet gradation conversion table 2 for the ink jet area 2.

Based on the signal obtained by decoding the area signal with the decoder again, the gradation processing circuit 714 uses the selector 2 to switch, with respect to the image signal subjected to the gradation conversion by the image processing printer gamma conversion circuit 713, gradation processing (e.g., processing without using a dithering, processing using dither, and error diffusion processing). Note that the gradation processing circuit 714 subjects the ink jet original G and the ink jet area of the original G to error diffusion processing.

The gradation processing circuit 714 uses the decoder to select a line 1 or a line 2 for the image signal after the gradation processing based on the read position information. This selection of the line 1 or the line 2 is switched for every different one pixel in the sub-scanning direction. The gradation processing circuit 714 temporarily stores the data for the line 1 in a first in First out (FIFO) memory located at the downstream of the selector and outputs the data for the line 1 and line 2 to reduce the pixel frequency to ½ and output the data to the I/F selector 721.

Figure 22:
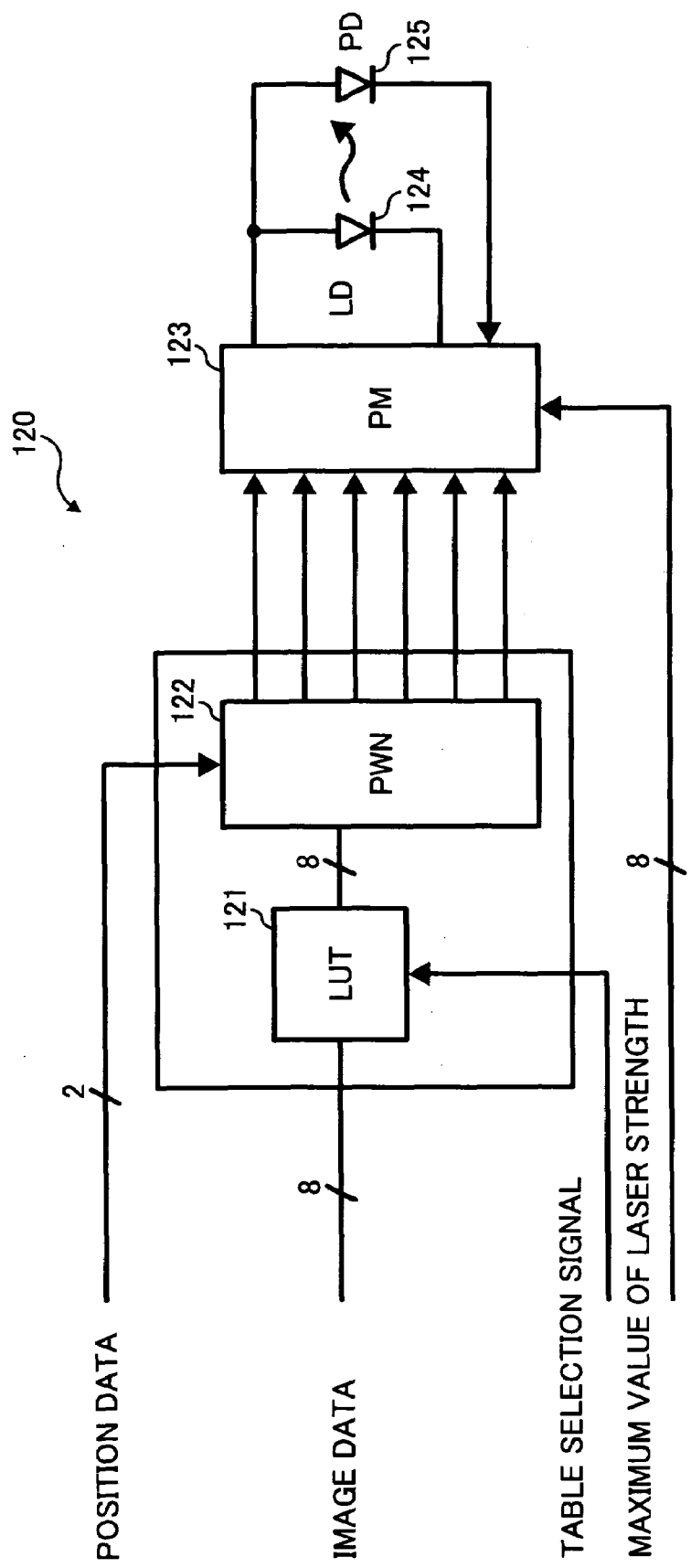
FIG. 22 is a block diagram of a laser modulation circuit of a printer section in the color copying apparatus shown in FIG. 2.

In the color copying apparatus 1, the laser optical system 106 of the printer section 100 includes a laser modulation circuit 120 as shown in FIG. 22 that includes a lookup table (LUT) 121, a pulse width modulation circuit (PWM) 122, and a power modulation circuit (PM) 123. In this laser modulation circuit 120, the writing frequency is 18.6 megahertz and the scanning time for 1 pixel is 53.8 nanoseconds.

8-bit image data is input to the lookup table (LUT) 121. The lookup table (LUT) subjects the input image data to gamma conversion to output the data to the pulse width modulation circuit (PWM) 122. The pulse width modulation circuit (PWM) 122 converts the data, based on the higher-order 3-bit signal of the 8-bit image signal input from the lookup table (LUT) 121, to 8-valued pulse width to output the converted data to the power modulation circuit (PM) 123. The power modulation circuit (PM) 123 subjects the data to 32-valued power modulation based on lower-order five bits. The power modulation circuit (PM) 123 is connected to a laser diode (LD) 124 and a photo detector (PD) 125. The power modulation circuit (PM) 123 causes the laser diode (LD) 124 to emit light based on the modulated signal and monitors, based on a monitor signal from the photo detector (PD) 125, light-emitting strength of the laser diode (LD) 124 to correct the light-emitting strength for each dot. It is possible change a maximum value of the strength of the laser light emitted by this laser diode (LD) 124 to eight bits (256 levels) independent of the image signal.

A beam diameter in the main scanning direction with respect to a size of one pixel of laser light emitted from the laser diode (LD) 124 (the beam diameter is defined as a width of the beam when the beam strength during the stationary status is attenuated to 1/e2 of the maximum value) is 50 micrometers in the main scanning direction and 60 micrometers in the sub-scanning direction in 600 DPI and one pixel of 42.3 micrometers.

This laser modulation circuit 120 is prepared in association with pieces of image data of the line 1 and line 2 explained with reference to FIG. 21. The pieces of image data of the line 1 and line 2 are synchronized and are scanned on the photosensitive element drums 104K to 104C in parallel to the main scanning direction.

Figure 23:
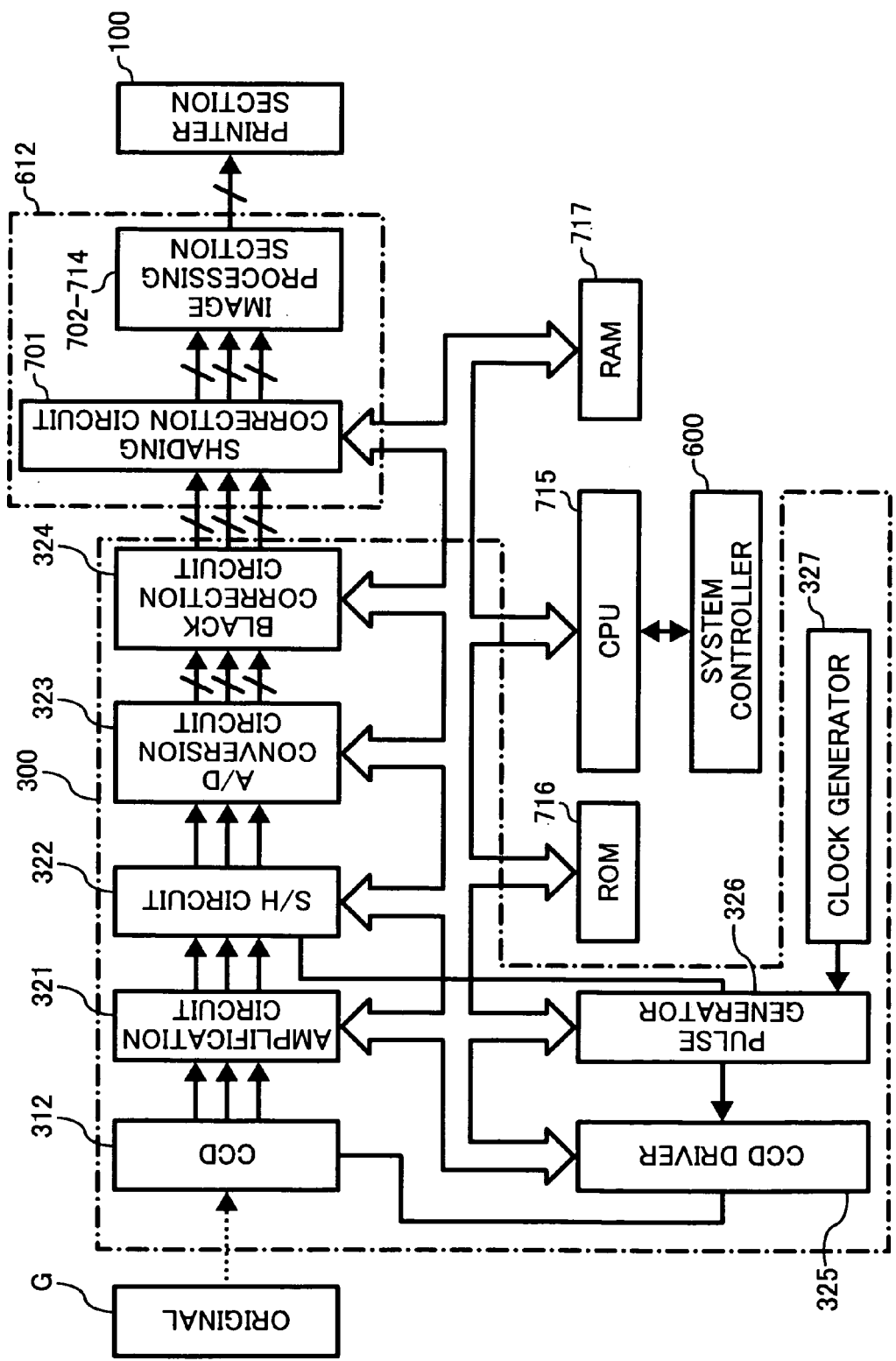
FIG. 23 is a block diagram of the scanner section shown in FIG. 2.

The scanner section 300 has a circuit block configuration shown in FIG. 23 and includes a CCD 312, an amplification circuit 321, a sample hold (S/H) circuit 322, an A/D conversion circuit 323, a black correction circuit 324, a CCD driver 325, a pulse generator 326, and a clock generator 327.

The scanner section 300 uses the halogen lamp 302 shown in FIG. 3 to emit light to the original G, subjects reflected light from original G to color separation with an RGB filter of the CCD 312, reads an image of the original G with the CCD 312, and outputs an analog image signal from the CCD 312. The CCD driver 325 supplies a pulse signal to drive the CCD 312. A pulse source required to drive the CCD driver 325 is generated by the pulse generator 326. The pulse generator 326 generates a pulse signal using a clock signal oscillated by the clock generator 327 that includes a crystal oscillator or the like as a reference signal. The S/H circuit 322 supplies a timing signal required for sample-holding an image signal from the CCD 312 to the S/H circuit 322.

The amplification circuit 321 amplifies the analog image signal from the CCD 312 to a predetermined level and outputs the signal to the S/H circuit 322. The S/H circuit 322 sample-holds the image signal from the amplification circuit 321 to output the signal to the A/D conversion circuit 323. The A/D conversion circuit 323 digitizes the analog image signal sample-held by the S/H circuit 322 to be, for example, an 8-bit signal and outputs the signal to the black correction circuit 324. The black correction circuit 324 reduces, with respect to the image data subjected to the digital conversion by the A/D conversion circuit 323, fluctuation in a black level among chips and pixels of the CCD 312 (electric signal when the amount of light is small) to prevent the black part of the image from having a linear mark or unevenness and outputs the data to the shading correction circuit 701 of the IPU 612.

Figure 24:
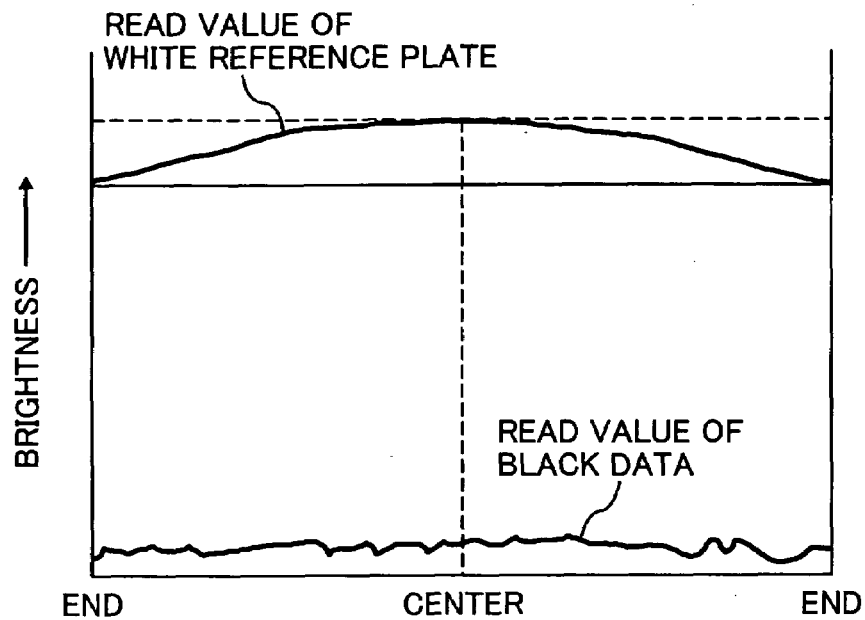
FIG. 24 is a schematic for illustrating white correction and black correction by a shading correction circuit shown in FIG. 23.

As described above, the shading correction circuit 701 corrects the white level (electric signal when the amount of light is large) to correct, as shown in FIG. 24, the white level by correcting the sensitivity dispersion of an irradiation system, optical system, or the CCD 312 based on the white color data obtained when the scanner section 300 is moved to a position of a uniform white reference plate and is irradiated.

An image signal from the shading correction circuit 701 is processed by an image processing section ranging from the area processing section 702 of the IPU 612 to the gradation processing circuit 714 and is recorded and output by the printer section 100. The above respective circuits are controlled by the CPU 715 based on the program and data in the ROM 716 and the RAM 717.

Figure 25:
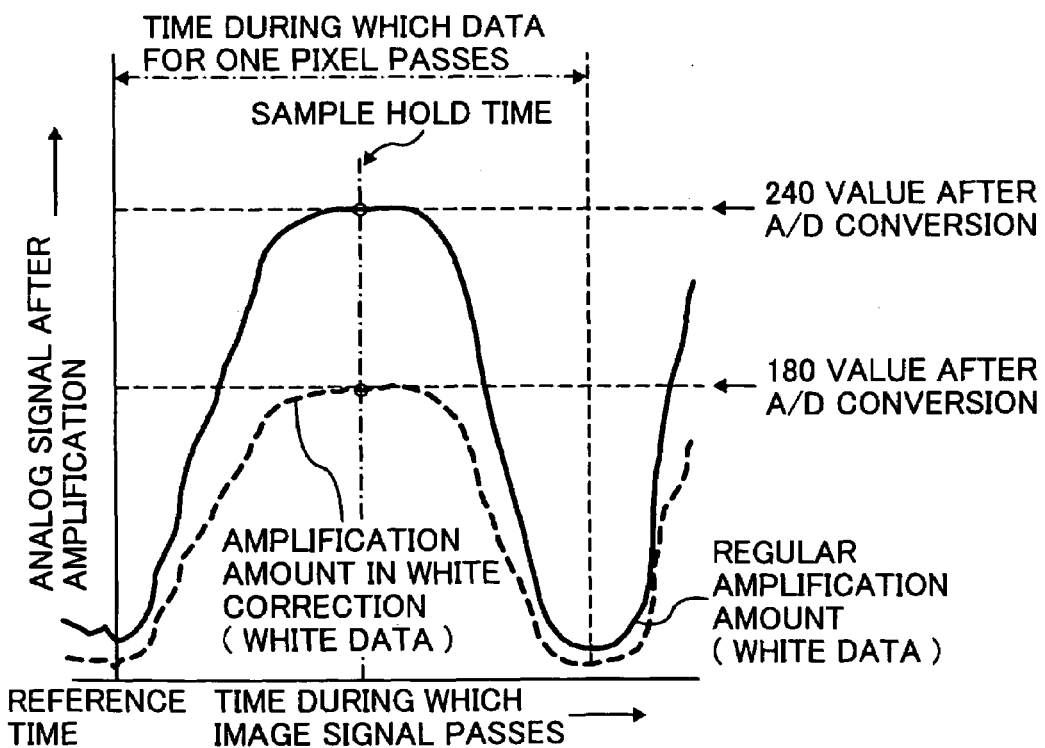
FIG. 25 is a schematic for illustrating a sample hold processing for a reading signal by an S/H circuit shown in FIG. 6.

An amplification amount of the amplification circuit 321 is determined such that an output value of the A/D conversion circuit 323 has a desired value with respect to a specific original concentration. For example, 240 values in an 8-bit signal value is obtained with an original concentration of 0.05 (0.891 of reflectivity) in a normal copying operation. In a shading correction, the amplification rate is reduced to increase the sensitivity of the shading correction. This is because an amplification ratio in a normal copy is saturated at 255 values when reflected light is high and when an image signal toner has the size exceeding 255 values in 8-bit signal, causing an error in the shading correction. Specifically, FIG. 25 is a schematic diagram in which an image reading signal amplified by the amplification circuit 321 sample-held by the S/H circuit 322. In FIG. 25, the horizontal axis represents time when the amplified analog image signal passes the S/H circuit 322 and the vertical axis represents a magnitude of the amplified analog signal. The analog signal is sample-held by the predetermined sample hold time shown in FIG. 25 and the signal is sent to the A/D conversion circuit 323. FIG. 25 is a schematic for illustrating the image signal for which the white level is read and the amplified image signal has, for example, 240 values as a value after the A/D conversion during a copy operation and 180 values during a white correction operation.

An effect of the embodiment is described. The color copying apparatus 1 of this embodiment executes, in using the linkage output function as described above, at least one scanner calibrations in advance (described below).

Figure 26:
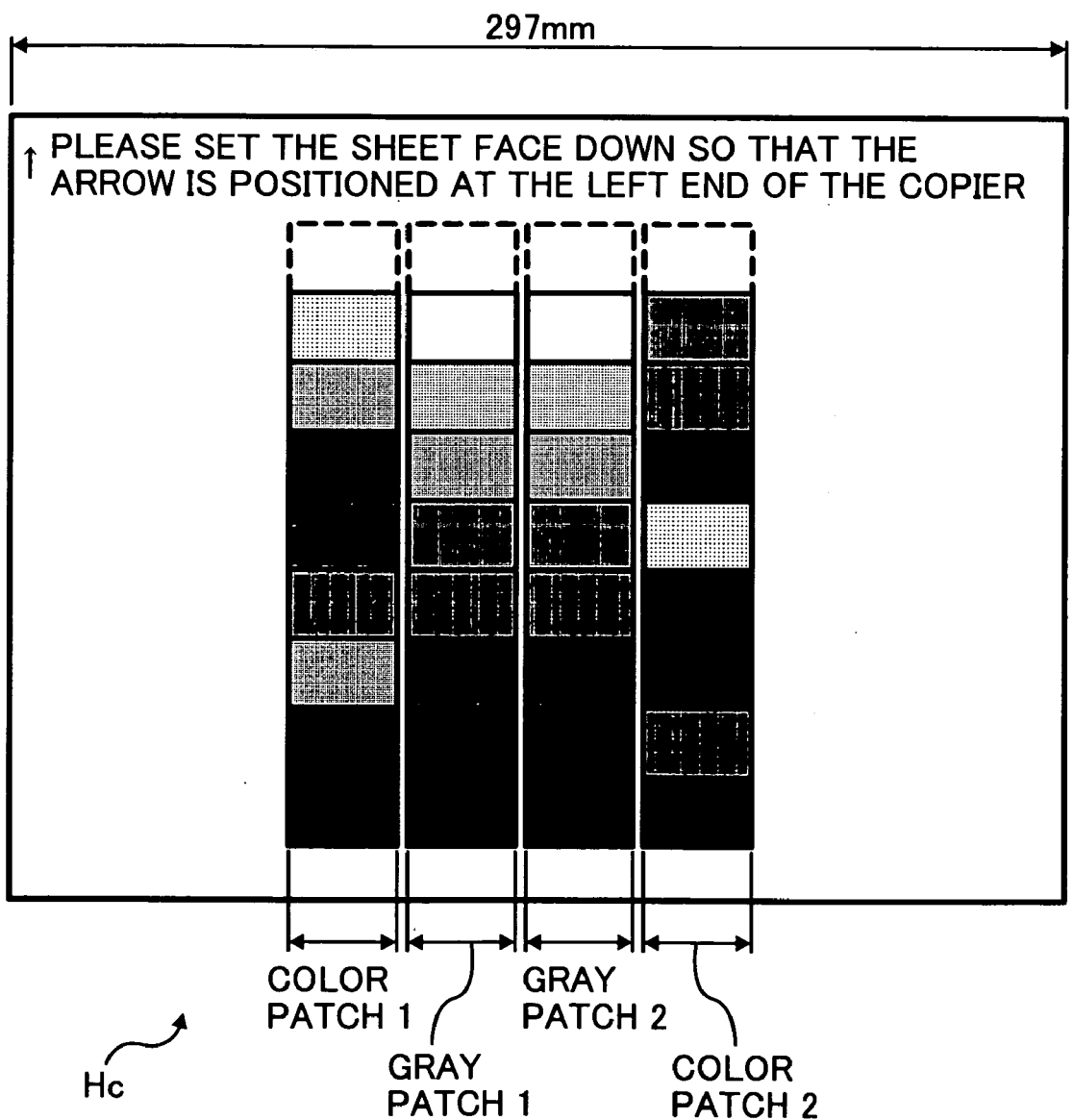
FIG. 26 is a schematic of a linkage color-correction chart used in scanner calibration.

The scanner calibration is performed, for example, using a linkage color correction chart HC as shown in FIG. 26 as a calibration reference chart. In this linkage color correction chart HC, hue areas provided to have a boundary as a plane provided in parallel to a brightness axis in a color space that are color patches of a plurality of different chromatic patches are originally drawn with colors. However, FIG. 26 as a patent drawing indicates the areas are displayed by white and black showing the color difference by different hatchings.

The linkage color correction chart HC is a patch type chart that is provided as shown in FIG. 26 such that the center has gray patches (black patches) as a plurality of different achromatic patches having different image concentrations that are provided on a recording medium (e.g., paper) and the left and right sides have a plurality of color patches having different hues. Among the two achromatic gray patches in the center, one is a gradation pattern printed by 3C gray (that is made achromatic by superimposing Y, M, and C one on top of another) and the other is a gradation pattern printed by black ink only. In the linkage color correction chart HC, with respect to the main scanning direction of the scanner section 300, colors are arrange in the following order: white 1 (background), color 1, black 1, black 2, color 2, and white 2 (background). By providing the color patch between white (background) and a black patch, it is possible to reduce the influence by flare light from the surrounding patches (particularly black patch). In the case of the arrangement, for example, in an order of the white 1 (background), black 1, color 1, black 2, color 2, and white 2 (background), the color 1 is influenced by both sides of black patches, causing the scanner section 300 to have a darker read value. To prevent this, the former arrangement is adopted.

Figure 47:
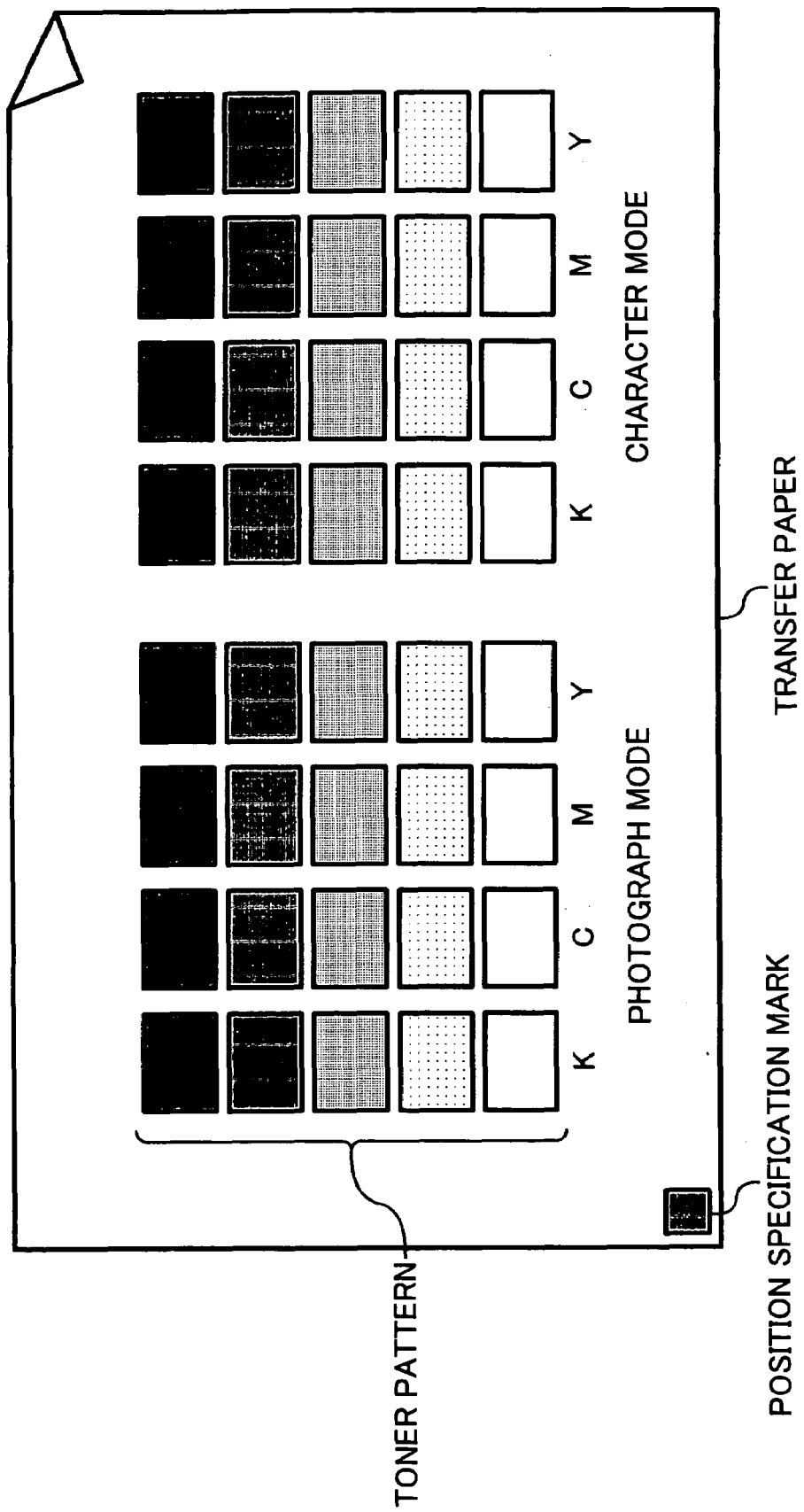
FIG. 47 is a schematic of a gradation pattern output on transfer paper in the ACC processing.

Each patch in the linkage color correction chart HC is formed to have a size that is about four times as large as a patch of the ACC pattern (see FIG. 47) used in the ACC (described later). The reason why the patch of the linkage color correction chart HC is provided to have a large size is that the influence from flare light (reflected light from an original surface surrounding the patch) is reduced in the scanner section 300.

As shown in FIG. 26, the linkage color correction chart HC is provided such that the patches are concentrated in substantially the center in the main scanning direction of the scanner section 300. The reason why the patches are concentrated in substantially the center in the main scanning direction of the scanner section 300 is that an end of the main scanning direction of the scanner section 300 tends to be darker compared to the center. Note that the patches of the linkage color correction chart HC are provided at positions included in a reading range of an ACC pattern. This is for an easy use of ACC pattern reading control software when an application program is created.

Chromatic color patches are provided as follows. Twelve color patches are provided by further dividing six hues of Y, R, M, B, C, and G (Yellow, Red, Magenta, Blue, Cyan, Green) to provide twelve color patches corresponding to hue division points (e.g., color between Y and YR) of twelve hue masking coefficients (Y, YR, R, RM, M, MB, B, BC, C, CG, G, GY) and additional Y, G, R, and Orange color patches as a reference (e.g., for visual evaluation by copy), thereby providing the total of 16 color patches. The respective color patches in the linkage color correction chart HC have hue angles as shown below when the hue angle $h^*$ is $b \leq h^* < 360$ degrees (deg) with respect to the brightness $L^*$, saturation $C^*$, and hue $h^*$.

Yellow Red ($h^*$=1 deg)
  Orange ($h^*$=26 deg)
  Red Yellow ($h^*$=47 deg)
  Red ($h^*$=54 deg)
  Red Magenta ($h^*$=60 deg)
  Magenta Red ($h^*$=84 deg)
  Magenta Blue ($h^*$=95 deg)
  Blue Magenta ($h^*$=139 deg)
  Blue Cyan ($h^*$=170 deg)
  Cyan Blue ($h^*$=207 deg)
  Cyan Green ($h^*$=232 deg)
  Green Cyan ($h^*$=277 deg)
  Green ($h^*$=291 deg)
  Green Yellow ($h^*$=313 deg)
  Yellow Green ($h^*$=352 deg)
  Yellow ($h^*$=356 deg)

Note that values are examples.

In the scanner calibration, the linkage color correction chart HC shown in FIG. 26 is read. Based on the reading result, first, a scanner gamma conversion table is created such that a machine difference of the scanner sections 300 is corrected.

Figure 27:
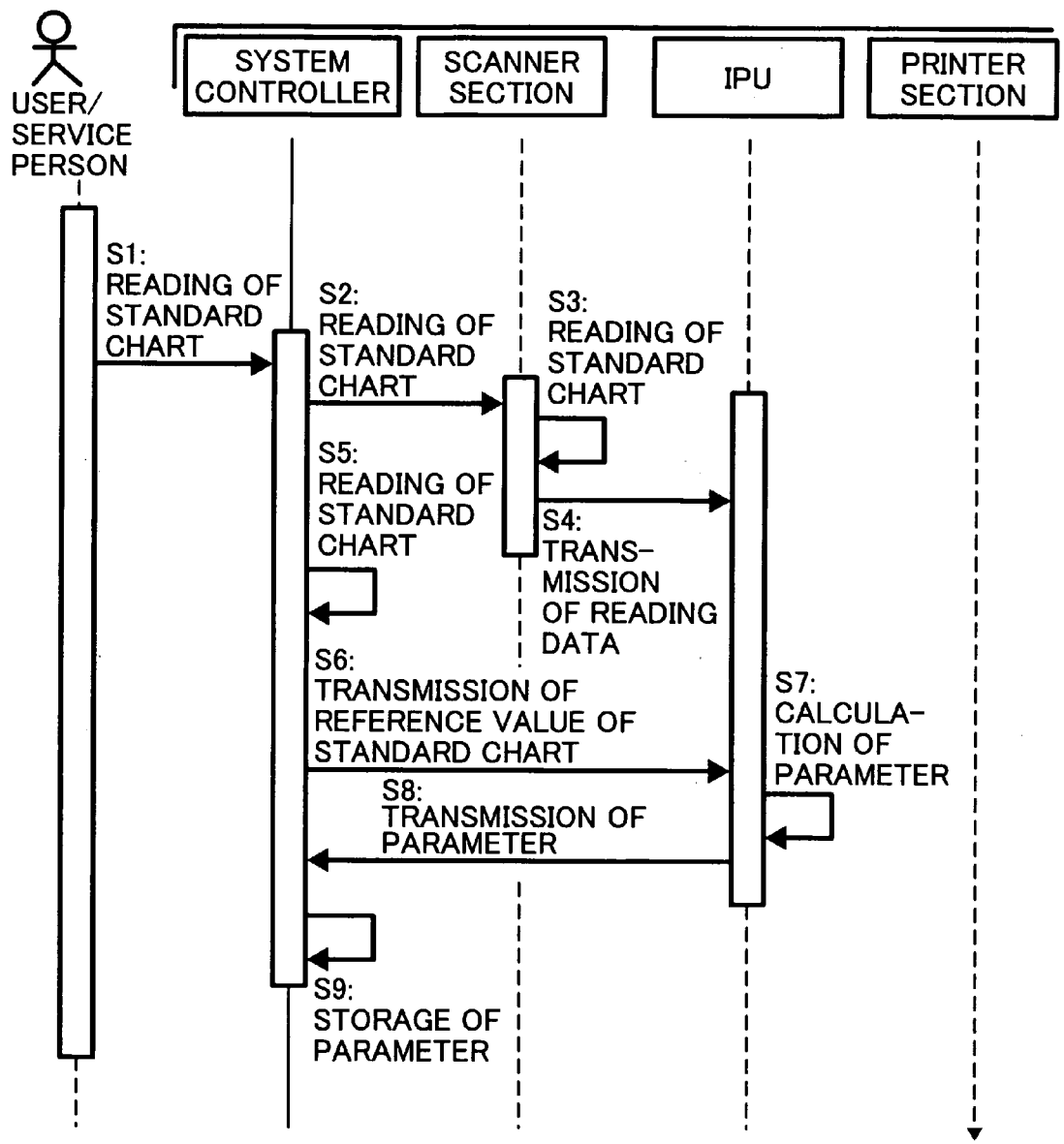
FIG. 27 is a sequence diagram of a scanner calibration by the color copying apparatus shown in FIG. 2.

A procedure for preparing the scanner gamma conversion table in this scanner calibration is as indicated by the sequence diagram of FIG. 27.

Figure 28:
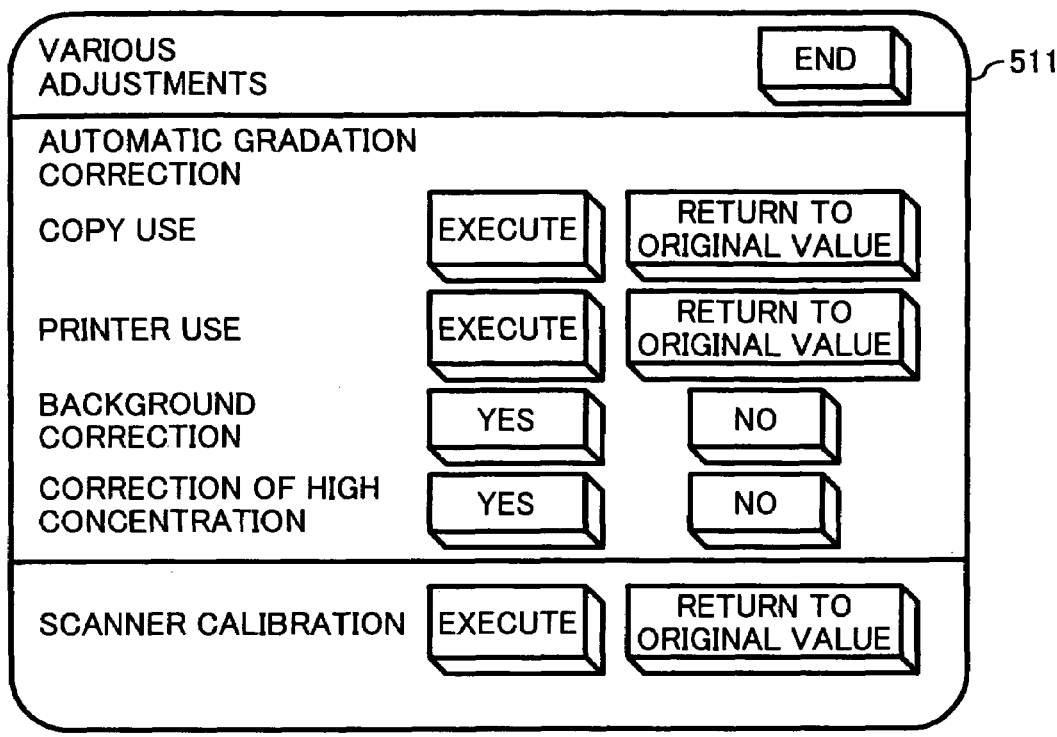
FIG. 28 is a schematic of a display showing a various-adjustments screen.
Figure 29:
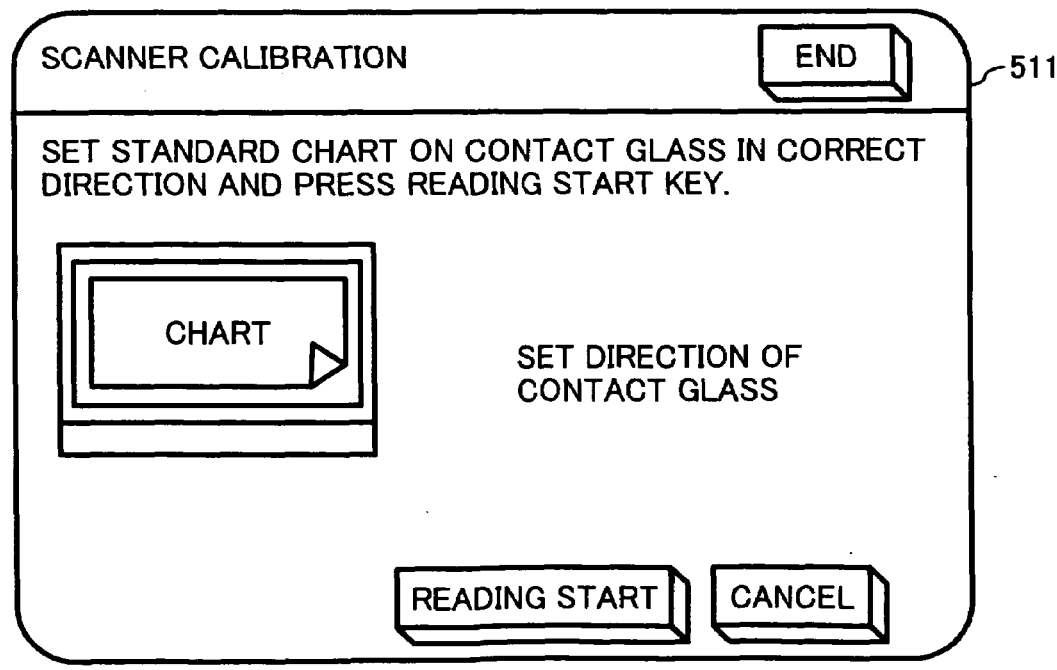
FIG. 29 is a schematic of a display showing a scanner-calibration start screen.

First, when a user or a service person selects the various setting mode in the liquid crystal screen 511 of the operation section 500 shown in FIG. 4, the color copying apparatus 1 causes the liquid crystal screen 511 to display the various adjustment screen as shown in FIG. 28. When the execution of "scanner calibration" is selected on this various adjustment screen, the scanner calibration mode is started and the liquid crystal screen 511 is caused to display the scanner calibration start screen as shown in FIG. 29. In this scanner calibration mode, the user or the service person places the linkage color correction chart HC on the contact glass 3 as an original stand to depress the "reading start" key in the scanner calibration start screen of the liquid crystal screen 511 shown in FIG. 29 (S1 in FIG. 20).

When the operation section 500 receives an instruction for starting the reading of the linkage color correction chart HC, the color copying apparatus 1 instructs, as shown by S2 in FIG. 27, a range from the system controller 600 to the scanner section 300 to read the linkage color correction chart HC. Then, as shown by S3 in FIG. 27, the scanner section 300 executes the reading of the linkage color correction chart HC to obtain the read values of R, G, and B signals with respect to the respective patches of the linkage color correction chart HC. As shown by S4 in FIG. 27, the scanner section 300 transmits the read values of the linkage color correction chart HC to the IPU 612.

Figure 30:
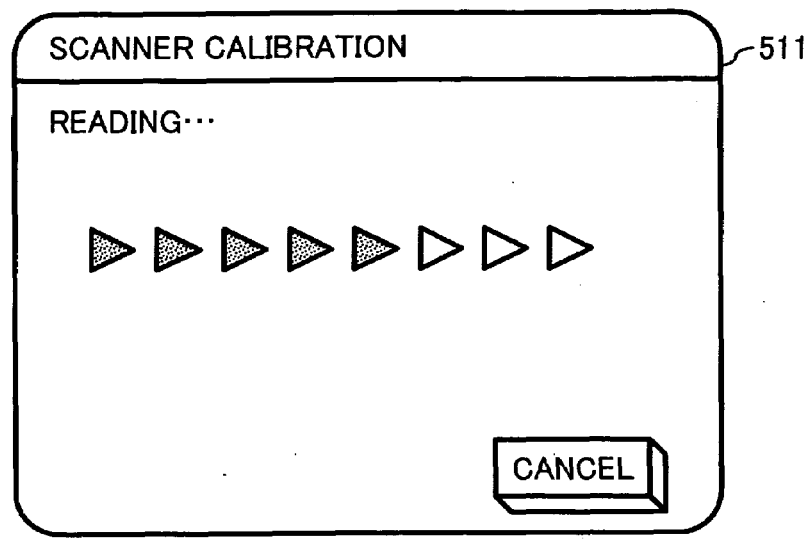
FIG. 30 is a schematic of a display showing a screen that indicates that a linkage color-correction chart is being read in a scanner calibration mode.

On the other hand, as indicated by S5 in FIG. 27, reading reference values (reference data) of the linkage color correction chart HC are read from a nonvolatile RAM (a reference value storing unit) in the system controller 600. Then, as shown by S6 in FIG. 27, the values are sent from the system controller 600 to the IPU 612. The color copying apparatus 1 displays, when the linkage color correction chart HC is being read, a screen shown in FIG. 30 that indicates that the reading is being performed.

In receiving the read values and reading reference values of the linkage color correction chart HC, the IPU 612 calculates, as shown by S7 in FIG. 27, image processing parameter to transmit the calculated parameter to the system controller 600 as indicated by S8 in FIG. 27.

As indicated by S9 in FIG. 27, the system controller 600 stores the received parameter in a nonvolatile RAM.

Figure 31:
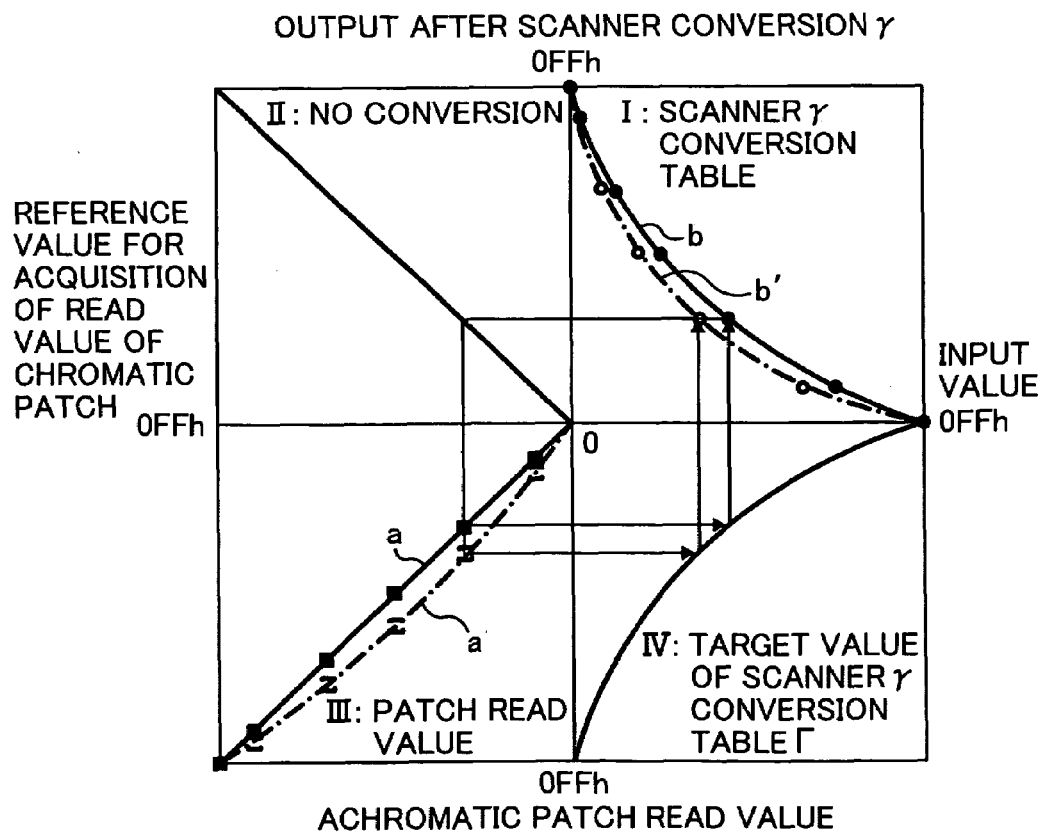
FIG. 31 is a schematic of a quaternary chart in the scanner calibration.

A method of creating the read value color scanner gamma conversion table based on the read values of achromatic patches of the linkage color correction chart HC (see FIG. 26) in S7 of the sequence diagram of FIG. 27 is described based on a quaternary chart shown in FIG. 31.

In the quaternary chart of FIG. 31, a first quadrant (1) represents a required scanner gamma conversion table and a horizontal axis represents an input value to the scanner gamma conversion table and a vertical axis represents an output after the scanner gamma conversion. In a fourth quadrant (IV), a vertical axis represents a read value of an achromatic patch and a graph shows a target value (a reference value) for obtaining the scanner gamma conversion table from the read values of the achromatic patches. In a third quadrant (III), a horizontal axis represents a reference value of a read value of an achromatic patch and a graph shows a result of reading an achromatic gray scale patch with the scanner section 300. A second quadrant (II) represents no conversion (through).

According to the characteristics shown in the quaternary chart in FIG. 31, the scanner gamma conversion table for b, b' of the first quadrant is created from read values a, a' of the third quadrant.

The target value of the read value shown in the fourth quadrant of the quaternary chart in FIG. 31 may be different target values for R, G, and B components of the scanner gamma conversion table used when the original is copied or may be the same target value.

As described above, the scanner gamma conversion table for correcting the difference in the scanner sections 300 is created.

Figure 32:
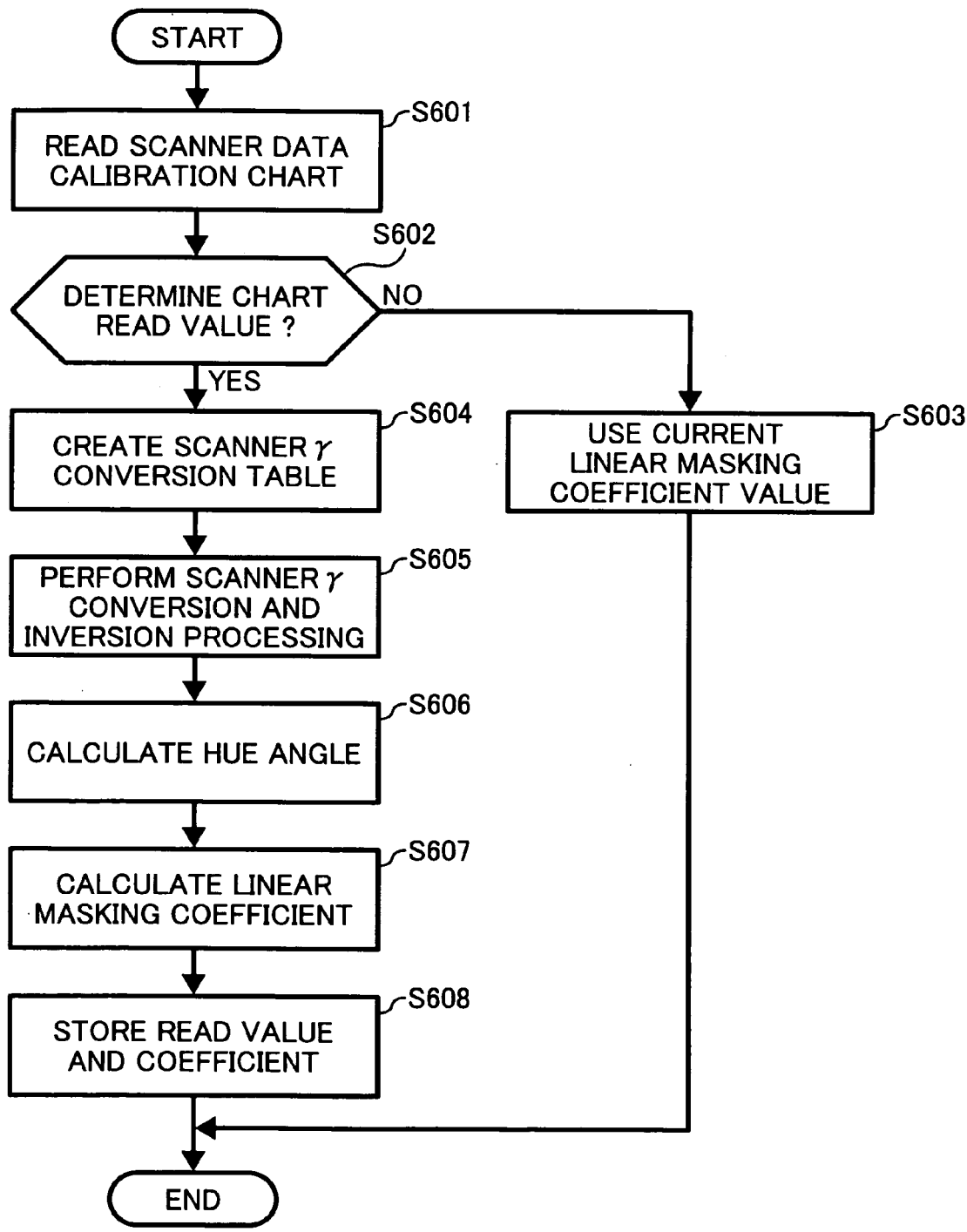
FIG. 32 is a flowchart of a scanner calibration processing.

FIG. 32 is a flowchart of a scanner calibration processing. The scanner calibration processing calculates determination reference parameters Fx' and masking coefficients of hue areas based on the reading result obtained by reading the linkage color correction chart HC shown in FIG. 26.

First, when the operation section 500 issues an instruction to start the reading of the linkage color correction chart HC, the linkage color correction chart HC (see FIG. 26) is read (step S601) to determine whether the read value of the linkage color correction chart HC is within a predetermined range (step S602).

When the read value is not within the predetermined range ("NO" at step S602), it is determined that an original other than that in the linkage color correction chart HC is placed on the scanner section 300 and a current linear masking coefficient value is used (step S603). The processing is completed.

On the other hand, when the read value is within the predetermined range ("YES" at step S602), the scanner gamma conversion table is created (step S604). As described above, the achromatic patch of the linkage color correction chart HC is used to create the scanner gamma conversion table. Consequently, the machine difference of the scanner section 300 is reduced.

The scanner gamma conversion table is used to convert the read value and reverse the value (step S605). Read values S[1] of R, G, and B components of the first patch having 10-bit accuracy are subjected to the scanner gamma conversion at f(S[1]) and further subjected to gradation reversal. Assuming that the value subjected to the gradation inversion is S'[1], $$S'[1]=S[\text{White}]-f(S[1])$$

is obtained. S[1] includes the three components of Red, Green, and Blue and S[White] is a white reference value for R, G, and B. The scanner gamma conversion is performed to improve color reproducibility. A value of a color having high saturation is increased while a value of a color having a low saturation is reduced to make it easy to handle a color.

A hue angle is calculated (step S606). Based on the read values of data for R, G, and B of the respective patches of the linkage color correction chart HC (Dr,bg,Db)(=Ri, Gi, Bi (i=number of each patch)), Equations 13 to 29 are used to calculate the parameters GR, GB, and Fx' and divide the R, G, and B image data of the read original for each hue.

Linear masking coefficients are calculated (step S607). The linear masking coefficient is calculated by using the method and the following Equation 36 to calculate, based on the read values Ri, Gi, and Bi (i=number of each patch) of the respective patches, linear masking coefficients for the respective patches.

$$\begin{pmatrix} aYB(3'\ 4') & aYG(3'\ 4') & aYR(3'\ 4') & aY(3'\ 4') \\ aMB(3'\ 4') & aMG(3'\ 4') & aMR(3'\ 4') & aM(3'\ 4') \\ aCB(3'\ 4') & aCG(3'\ 4') & aCR(3'\ 4') & aC(3'\ 4') \\ aKB(3'\ 4') & aKG(3'\ 4') & aKR(3'\ 4') & aK(3'\ 4') \end{pmatrix} = \begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \times \quad (36)$$

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}^{-1}$$

The method is described specifically. A value obtained by reading a point on a boundary surface not existing on an achromatic axis with a scanner CCD showing a standard spectral characteristic for example is (Ri, Gi, Bi) (i=hue 1 to 4). When this point is read by another scanner, because of fluctuation in spectral characteristics of the scanner CCDs, this point is read as (Ri', Gi', Bi')(i=hues 1 to 4) different from (Ri, Gi, Bi) (i=hues 1 to 4). As a result, according to Equation (1), the recording values of the development sections C, M, Y, and K are (Ci', Mi', Yi', Ki')(i=hues 1 to 4). It is possible to represent Equation 32 as follows.

$$\begin{pmatrix} Y(1') & Y(2') & Y(3') & Y(4') \\ M(1') & M(2') & M(3') & M(4') \\ C(1') & C(2') & C(3') & C(4') \\ K(1') & K(2') & K(3') & K(4') \end{pmatrix} = \begin{pmatrix} aYB(3'-4') & aYG(3'-4') & aYR(3'-4') & aY(3'-4') \\ aMB(3'-4') & aMG(3'-4') & aMR(3'-4') & aM(3'-4') \\ aCB(3'-4') & aCG(3'-4') & aCR(3'-4') & aC(3'-4') \\ aKB(3'-4') & aKG(3'-4') & aKR(3'-4') & aK(3'-4') \end{pmatrix} \begin{pmatrix} B(1') & B(2') & B(3') & B(4') \\ G(1') & G(2') & G(3') & G(4') \\ R(1') & G(2') & G(3') & G(4') \\ 1 & 1 & 1 & 1 \end{pmatrix} \quad (37)$$

where approximation is performed as (R(I')), G(I'), B(f'))=–(R(i)+ΔR(i), G(i)+ΔG(i), B(i)+ΔB(i))(i=hues 1 to 4) to obtain the following Equation.

$$\begin{pmatrix} Y(1') & Y(2') & Y(3') & Y(4') \\ M(1') & M(2') & M(3') & M(4') \\ C(1') & C(2') & C(3') & C(4') \\ K(1') & K(2') & K(3') & K(4') \end{pmatrix} = \begin{pmatrix} aYB(3'-4') & aYG(3'-4') & aYR(3'-4') & aY(3'-4') \\ aMB(3'-4') & aMG(3'-4') & aMR(3'-4') & aM(3'-4') \\ aCB(3'-4') & aCG(3'-4') & aCR(3'-4') & aC(3'-4') \\ aKB(3'-4') & aKG(3'-4') & aKR(3'-4') & aK(3'-4') \end{pmatrix} \times \quad (38)$$

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}$$

where $\Delta Ri = kR1$ {(R component of current chromatic value of hue i)–(R component of reference chromatic value of hue i)}
$\Delta Gi = kG1$ {(G component of current chromatic value of hue i)–(G component of reference chromatic value of hue i)}
$\Delta Bi = kB1$ {(B component of current chromatic value of hue i)–(B component of reference chromatic value of hue i)}
Instead of using an actual read value (Ri', Gi', Bi'), a difference between a reference value of a chromatic reference patch and a read value is multiplied by a predetermined coefficient kX (X=R, G, and B) and a product is added to a scanner vector consisting of R, G, and B components (Ri, Gi, Bi)(i=1, 2, 3, and 4) stored in advance. Note that, when the scanner vector (Ri, Gi, Bi)(i=1, 2, 3, and 4) is the same as a reference patch obtained by the reference value of the linkage color correction chart HC of the chromatic patch and the reference patch providing the read value, the following coefficient is obtained.

KX=1 (X=R, G, B)

In this embodiment, it is possible to select a combination of a present value and a reference value with an operation section described below according to a fluctuation factor of a scanner machine difference.

Figure 33:
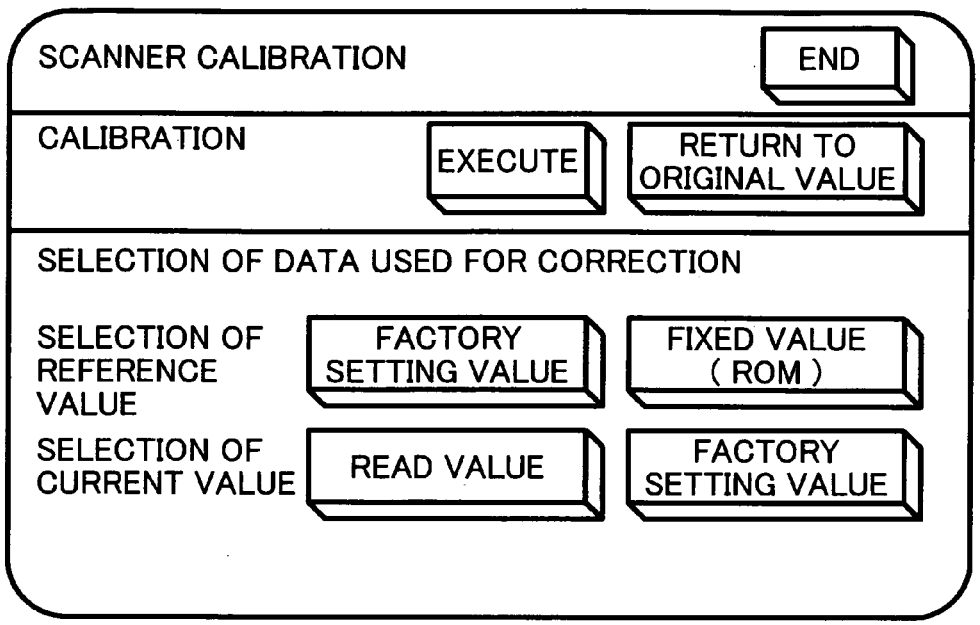
FIG. 33 is a schematic of a display showing a scanner calibration screen.
Figure 34:
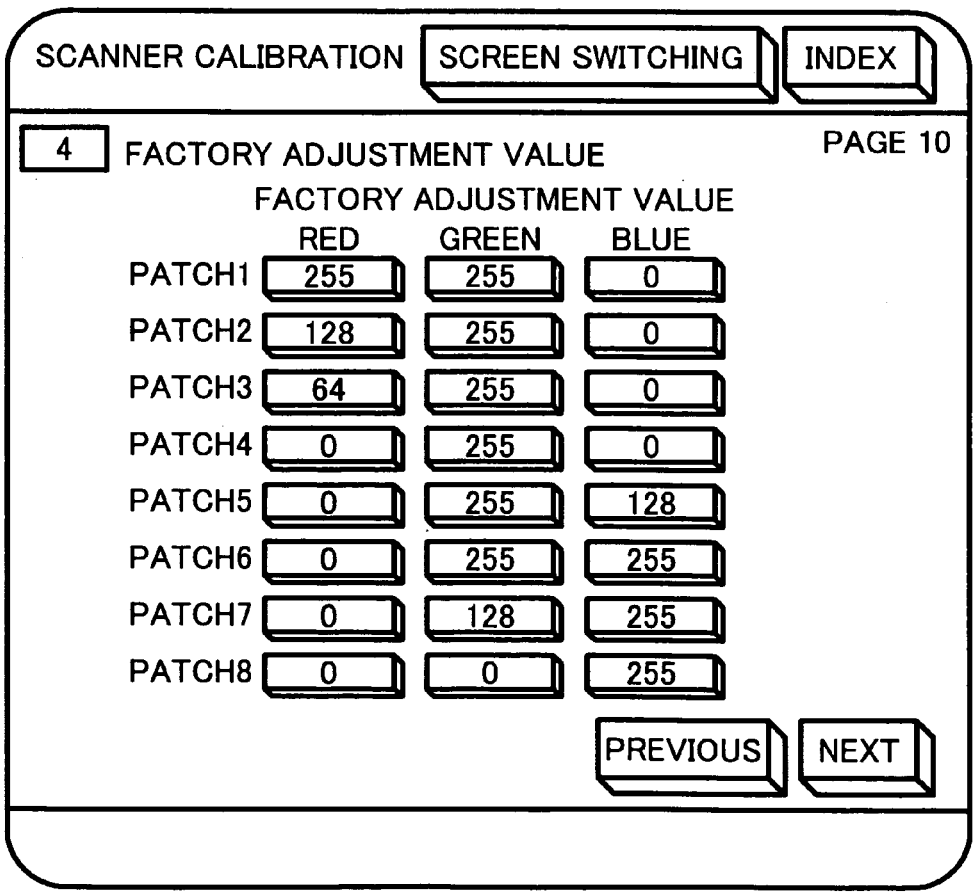
FIG. 34 is a schematic of a display showing a screen for a factory adjustment value.

In the liquid crystal screen 511 of the operation section 500 shown in FIG. 4, when a scanner calibration menu is called up, a scanner calibration screen shown in FIG. 33 is displayed. The scanner calibration screen in FIG. 33 shows keys for setting the combination of a "reference value" and a "present value". When a [factory setting value] is selected as a reference value or a present value, the factory setting value serving as a standard read value of the linkage color correction chart HC shown in FIG. 34 is displayed on the liquid crystal screen 511. When a [read value] is selected as a present value, a read value is displayed on the liquid crystal screen 511 as shown in FIG. 35. Note that, it is possible to change a factory setting value shown in FIG. 34 and a read value shown in FIG. 35. Consequently, a reference value selecting unit and a present value selecting unit are realized.

For example, with respect to the scanner section 300 having a small temporal fluctuation of the read value of the reference patch, a factory setting value serving as a standard read value of the linkage color correction chart HC is set as a present value and a design value (fixed value) in the ROM is set as a reference value. The design value (fixed value) is the first chromatic patch read value when the coefficient (Ri), (Gi), and (Bi) values of Equation 38 are determined. As the factory setting value, the present value is calculated by the chart consisting of chromatic patches for which the colors are controlled in advance. When there is fluctuation of colors of the chromatic patches (e.g., lot difference), the coefficient kX (X=R, G, and B) is reduced in inverse proportion to a color difference from the design value. The coefficient kX is provided based on a color difference of an L*a*b component of a CIE Lab color difference between the reference patch for which ΔE*ii is used for the design of the ii-th patch and the reference patch used for the adjustment in the factory.

In the case of ΔE*ii≦1 kX=1 (X=R,G,B)
In the case of 1<E*ii≦2 kX=0.75 (X=R,G,B)
In the case of 2<E*ii≦4 kX=0.5 (X=R,G,B)
In the case of 4<E*ii≦8 kX=0.25 (X=R,G,B)
In the case of 8<E*ii kX=0.0 (X=R,G,B)

With respect to the scanner section 300 having a small temporal fluctuation of read values of the reference patch, instead of using the factory setting value as a present value, a read value of the linkage color correction chart HC is used in which a present value is read every time. The reference value is a design value (a fixed value) stored in the ROM. The coefficient kX (X=R, G, and B) is calculated as described above.

In performing correction using the linkage color correction chart HC in which a color of a reference patch used for the design is different in an amount equal to or higher than a predetermined value due to a difference among printing lots, the scanner calibration screen shown in FIG. 36 is used. A standard read value of the linkage color correction chart HC having a different color is set as a reference value during manufacture or in a factory (a factory setting value) and a value obtained by causing each apparatus to read this linkage color correction chart HC is used as a present value. The coefficient in this case is set, as shown in FIG. 36, to be a correction coefficient in inverse proportion to fluctuation (a standard error) in the color in the printing lot. When the standard error of the fluctuation is large, the coefficient kX (X=R, G, and B) is set to a value close to 0 and, when the standard error is small, the coefficient kX (x=R, G, and B) is set to a value equal to or close to 1. Here, a correction coefficient setting unit is realized.

Note that the liquid crystal screen 511 of the operation section 500 is a touch panel screen in which a setting value to be changed is selected and then a parameter is input by a numeric keypad and is set by an enter key.

It is also possible that a personal computer connected via a LAN cable 1000 or a personal computer connected via a USB cable, a RS-232C cable, a centronics cable, or the like is caused to display the screens shown in FIG. 34 to FIG. 36 and values are set on line from the personal computer on which these screens are displayed.

Since an objective is to calculate the masking coefficient aPS (i–j) (P=Y, M, C, K, S=B, G, R; i,j=1, 2, 3, 4, j=1, 2, 3, 4) for which the left sides of Equation 32 and 37 is (Y(i), M(i), C(i), K(i))=(Y(I'), M(I'), K(I')) where hue I=1, 2, 3, and 4, Equation 39 below is obtained.

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \approx \begin{pmatrix} aYB(3'\ 4') & aYG(3'\ 4') & aYR(3'\ 4') & aY(3'\ 4') \\ aMB(3'\ 4') & aMG(3'\ 4') & aMR(3'\ 4') & aM(3'\ 4') \\ aCB(3'\ 4') & aCG(3'\ 4') & aCR(3'\ 4') & aC(3'\ 4') \\ aKB(3'\ 4') & aKG(3'\ 4') & aKR(3'\ 4') & aK(3'\ 4') \end{pmatrix} \times \begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix} \quad (39)$$

Equation 36 is obtained by multiplying both sides 39 by $$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix} \quad (40)$$

which is an inverse matrix of $$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta B(4) \\ R(1)+\Delta R(1) & R(2)+\Delta R(2) & R(3)+\Delta R(3) & R(4)+\Delta R(4) \\ 1 & 1 & 1 & 1 \end{pmatrix}^{-1} \quad (41)$$

Finally, the read value and the linear masking coefficient are stored in a nonvolatile RAM, RAM, or the like (step S608). The processing is completed.

Note that, as shown in the flowchart in FIG. 37, instead of performing step S604 of the flowchart in FIG. 32 to create the scanner gamma conversion table, a fixed scanner gamma conversion table stored in advance may be used to convert a chromatic reference patch.

Figure 38A:
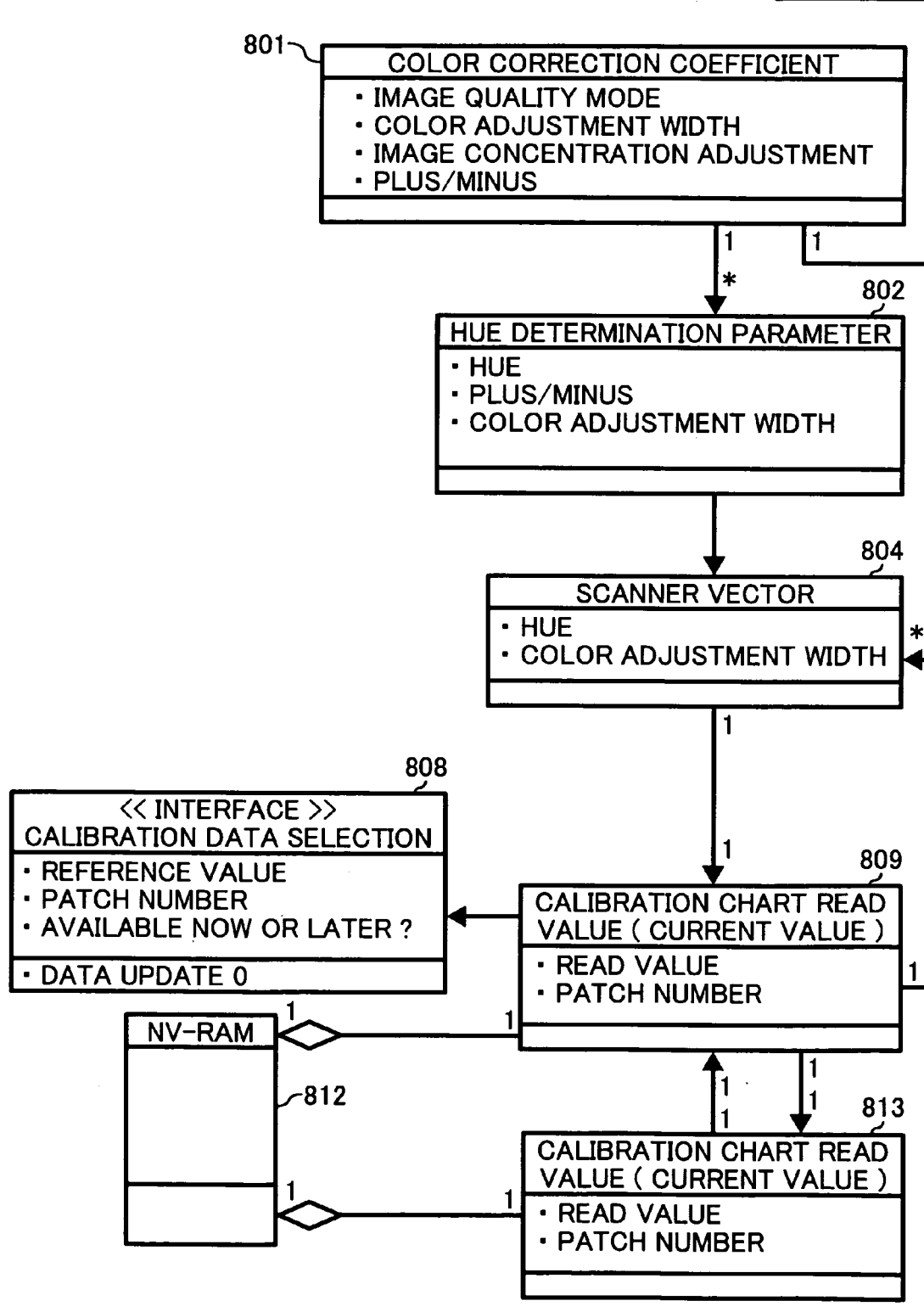
FIG. 38 is a schematic of classes of scanner calibration.
Figure 38B:
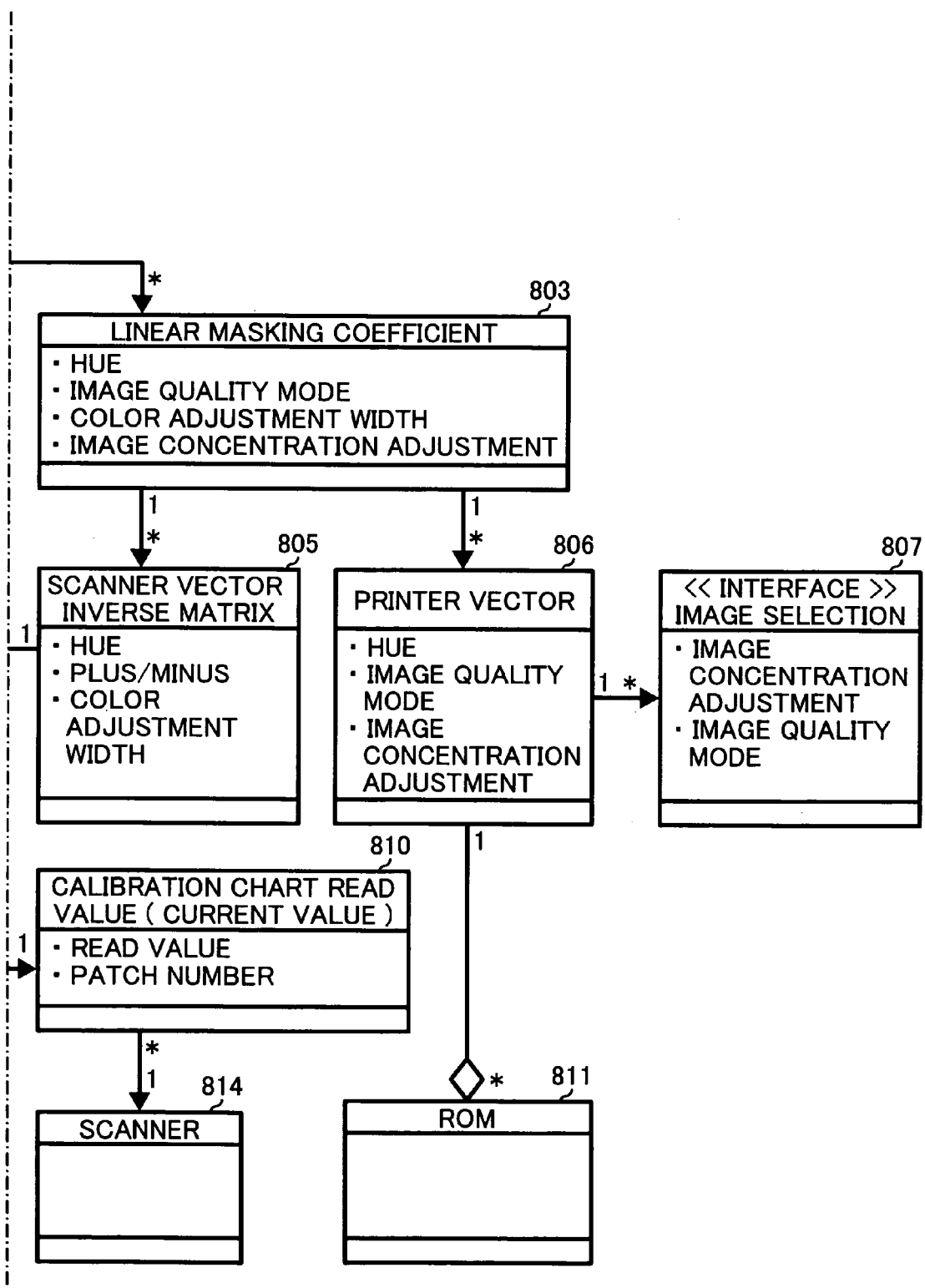

FIG. 38 is a schematic of classes of the scanner calibration. In FIG. 38, a color correction coefficient used for copy (resistor value set for a color correction circuit (ASIC)) 801, a linear masking coefficient 803, a hue determination parameter 802, a scanner vector 804, a scanner inverse matrix parameter 805, a printer vector 806, an image concentration selection 807 (in an operation section), a calibration data selection I/F 808 (in an operation section), a linkage color correction chart HC read value (present value) 809 as an object, a linkage color correction chart HC read value (this time value) 810 as an object, a ROM 811, a nonvolatile RAM (NV-RAM) 812, a linkage color correction chart HC read value (previous value) 813 as an object, and a scanner 814 are shown.

It is possible to calculate the color correction coefficient 801 based on the hue determination parameter 802 and the linear masking coefficient 803. It is possible to calculate the hue determination parameter 802 based on the scanner vector 804. It is possible to calculate the linear masking coefficient 803 based on the scanner inverse matrix parameter 8015 and the printer vector 806. It is possible to calculate the scanner inverse matrix parameter 805 based on the scanner vector 804. The printer vector 806 is selected from the image quality mode and the concentration selection by the image selection I/F 807 of the operation section. The data of the printer vector 806 is stored in the RAM 811. The scanner vector 804 is calculated based on the linkage color correction chart HC read value (present value) 809 as an object. According to the calibration data selection I/F 808 (in an operation section), it is possible to select the linkage color correction chart HC read value (present value) 809 from the linkage color correction chart HC read value (previous value) 813 that is read and stored in the NV-RAM 812 in advance and the linkage color correction chart HC read value (this time value) 810 read from the scanner 814 anew. The linkage color correction chart HC read value (present value) 809 and the linkage color correction chart HC read value (previous value) 813 are stored in the NV-RAM 812.

When the linkage color correction chart HC read value (previous value) 813 is desired to be used as the linkage color correction chart HC read value (present value) 809, "return to an original value" of the scanner calibration in FIG. 28 is selected. Consequently, the value read and stored in advance is called up and the color correction coefficient 801 is recalculated.

Note that a scanner gamma conversion table for the ACC is different from the copy (original reading) scanner gamma conversion table in that the sensitivity is high with respect to a spectral reflection factor characteristic of toner on transfer paper to be read and the ACC pattern reading scanner gamma conversion table is created according to a chromatic patch read value of the linkage color correction chart HC such that the influence by fluctuation in spectral sensitivities of the CCD 312 is corrected.

As described later, based on a chromatic patch and an achromatic patch having different tints, an ACC pattern (see FIG. 47) reading scanner gamma conversion table is created. The creation is explained with reference to FIG. 39 with a method of creating a yellow toner reading scanner y correction table (scanner gamma conversion table) as an example.

A chromatic (color) patch used for the correction of yellow toner is the one as shown in FIG. 39. This chromatic patch is an example of a value obtained by reading a color patch extracted for the correction of yellow toner by a scanner serving as a reference. When yellow toner is read, a blue signal is used because of the high sensitivity of blue. A blue signal is used out of different R, G, and B reading signals of 1. white, 2. yellow, 5. blue, 6. cyan, 10. gray, and 11. black from a plurality of chromatic color patches having different tints to create a correction table for reading yellow toner.

When the yellow reading correction table at the time of execution of the ACC is created, the linkage color correction chart HC is created by printing ink. Thus, a spectral reflection factor of the chart is different from that of toner. FIG. 39 shows an example of a correction coefficient for blue for the difference.

Figure 40:
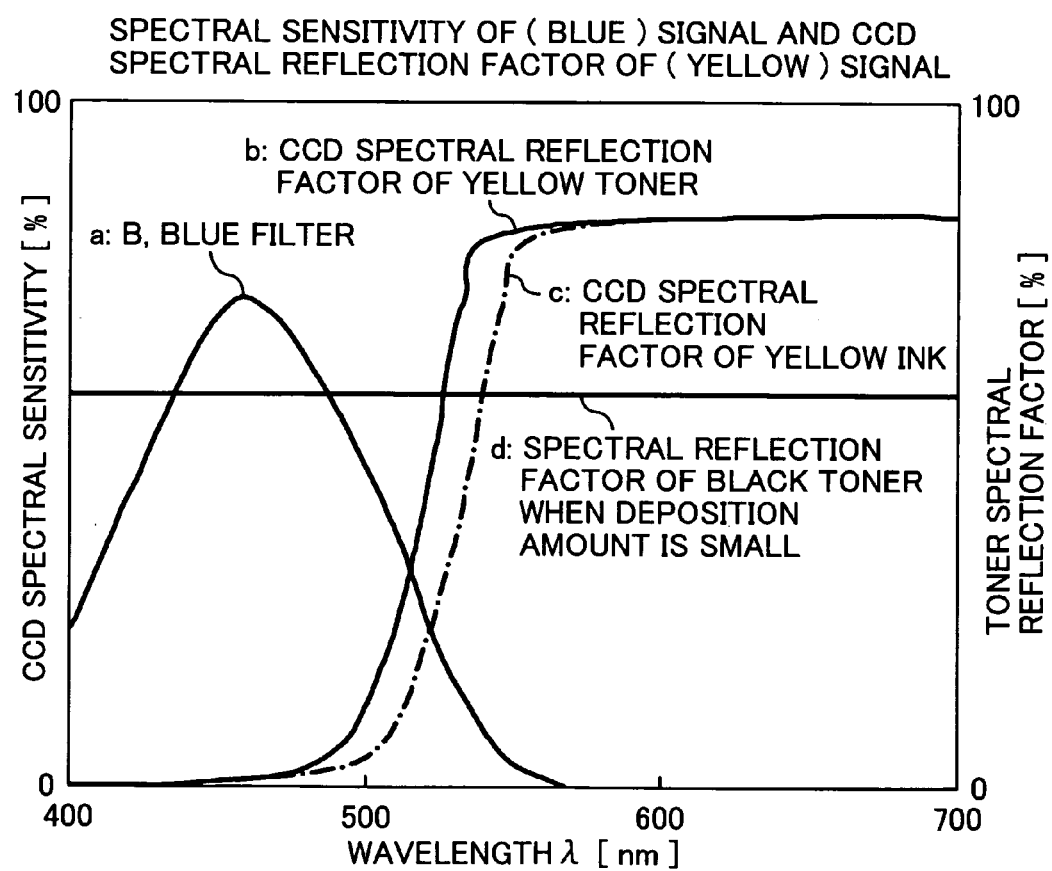
FIG. 40 is a schematic for illustrating a relation between CCD spectral sensitivity of a blue signal and a spectral reflection factor of a yellow toner.

It is possible to calculate this correction coefficient based on FIG. 40 that represents the spectral sensitivity of a blue signal of the CCD 312 and a spectral reflection factor of yellow toner by wavelength $\lambda$. In FIG. 40, the horizontal axis represents the wavelength $\lambda$ while the vertical axis in the graph (a) represents the spectral sensitivity [%] of the CCD 312 shown in the left side axis and the vertical axes in the graphs (c) and (d) represent the spectral reflection factor [%] of toner shown in the right side. In FIG. 40, (a) represents a spectral sensitivity of a blue signal filter, (c) represents a spectral reflection factor of a yellow toner, (d) represents a spectral reflection factor of yellow ink, and (d) represents a spectral reflection factor of black (Bk) toner when the deposition amount is small. The (a) spectral sensitivity is obtained by multiplying the spectral transmission rate of blue filter of the CCD 312 with the spectral energy of the light source (halogen lamp 302).

As it is seen from FIG. 40, an output B of the blue signal (CCD 312, color material) is obtained by integrating the wavelength $\lambda$ with an integration value S (CCD, $\lambda$)×σ(color material, $\lambda$, area ratio) of spectral sensitivity S (CCD, $\lambda$) of the CCD 312 and the color material spectral reflection factor σ (color material, $\lambda$, area ratio). The output B of the blue signal (CCD 312, color material) is given by the following Equation 42.

$$B(CCD, \text{color material, area ratio}) = \int S(CCD, \lambda) \cdot \sigma (\text{color material}, \lambda, \text{area ratio}) \quad (42)$$

When yellow toner (hereinafter simply referred to as Y toner) and yellow ink (hereinafter simply referred to as Y ink) are read, blue signals to the spectral sensitivity characteristic "a" of the CCD 312 are represented by the following Equations 43 and 44.

$$B(a, Y\text{toner}, 100\%) = \int S(a, \lambda) \cdot \sigma(Y\text{toner}, \lambda, 100\%) d\lambda \quad (43)$$

$$B(a, Y\text{ink}, 100\%) = \int S(a, \lambda) \cdot \sigma(Y\text{ink}, \lambda, 100\%) d\lambda \quad (44)$$

The spectral sensitivity S (a, $\lambda$) is assumed to be a representative value of the scanner section 300 to be used and Y toner σ (Y toner, $\lambda$) and Y ink spectral reflection factor σ (Y ink, $\lambda$) are measured by a spectrophotometric colorimetry device. Consequently, it is possible to calculate B (a, Y toner) and B (a, Y ink) can be calculated.

In predicting, based on the read value B (Y ink) of the blue signal obtained by reading the yellow patch of the printing ink on the linkage color correction chart HC, the read value B (Y toner) at the time when Y toner is read as a read value for Y toner at the execution of the ACC, the following Equation 45 is used as a correction coefficient k (Yellow).

$$B(Y\text{toner}) = k(\text{Yellow}) \times B(Y\text{ink}) \quad (45)$$

where k (Yellow)=B(a, Y toner, 100%)/B(a, Y ink, 100%).

Although the yellow toner is explained above, concerning other color patches, a Y toner area ratio or a toner deposition amount per a unit area mg/cm2, at which the spectral reflection factor of the yellow toner and the reflectivity of a color patch of a printing ink to be calculated are substantially equal in an area in which the blue spectral sensitivity of the CCD 312 is not 0, is used.

Figure 41:
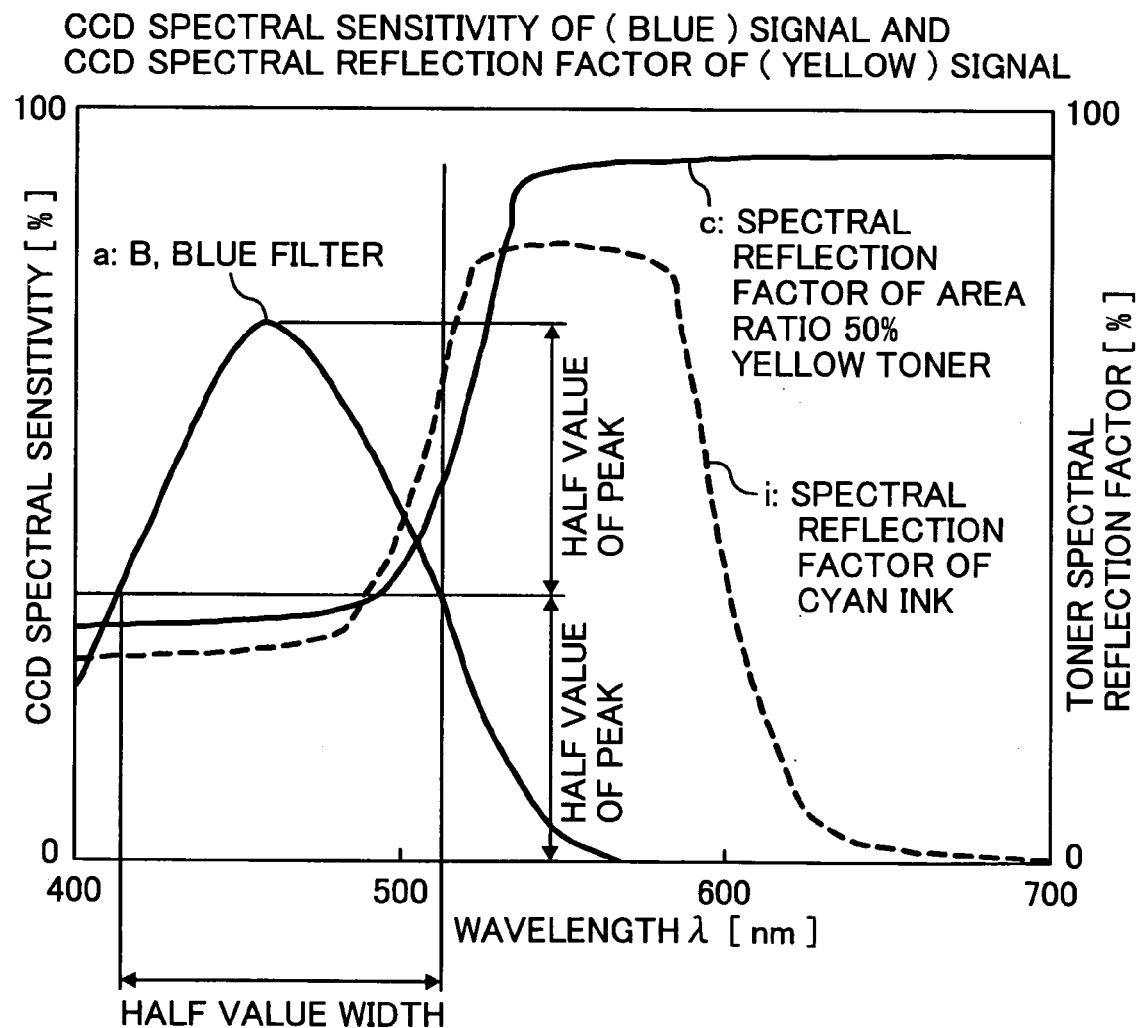
FIG. 41 is a schematic for illustrating a relation among a spectral reflection factor characteristic of cyan ink, a spectral reflection factor of area rate 50% yellow toner, and a read value of the blue signal.

For example, concerning a patch for which the read values of the spectral reflection factor characteristic (i) of blue green ink shown in FIG. 41 and the yellow toner spectral reflection factor (c) and the blue signal at an area ratio of 50% are lower than the read value of yellow toner (ink) (e.g., Black, Green), the calculation of the correction coefficient is not performed and 1 is used as the coefficient. It is possible to represent the correction coefficient k calculated in this way as shown in FIG. 39.

Figure 42:
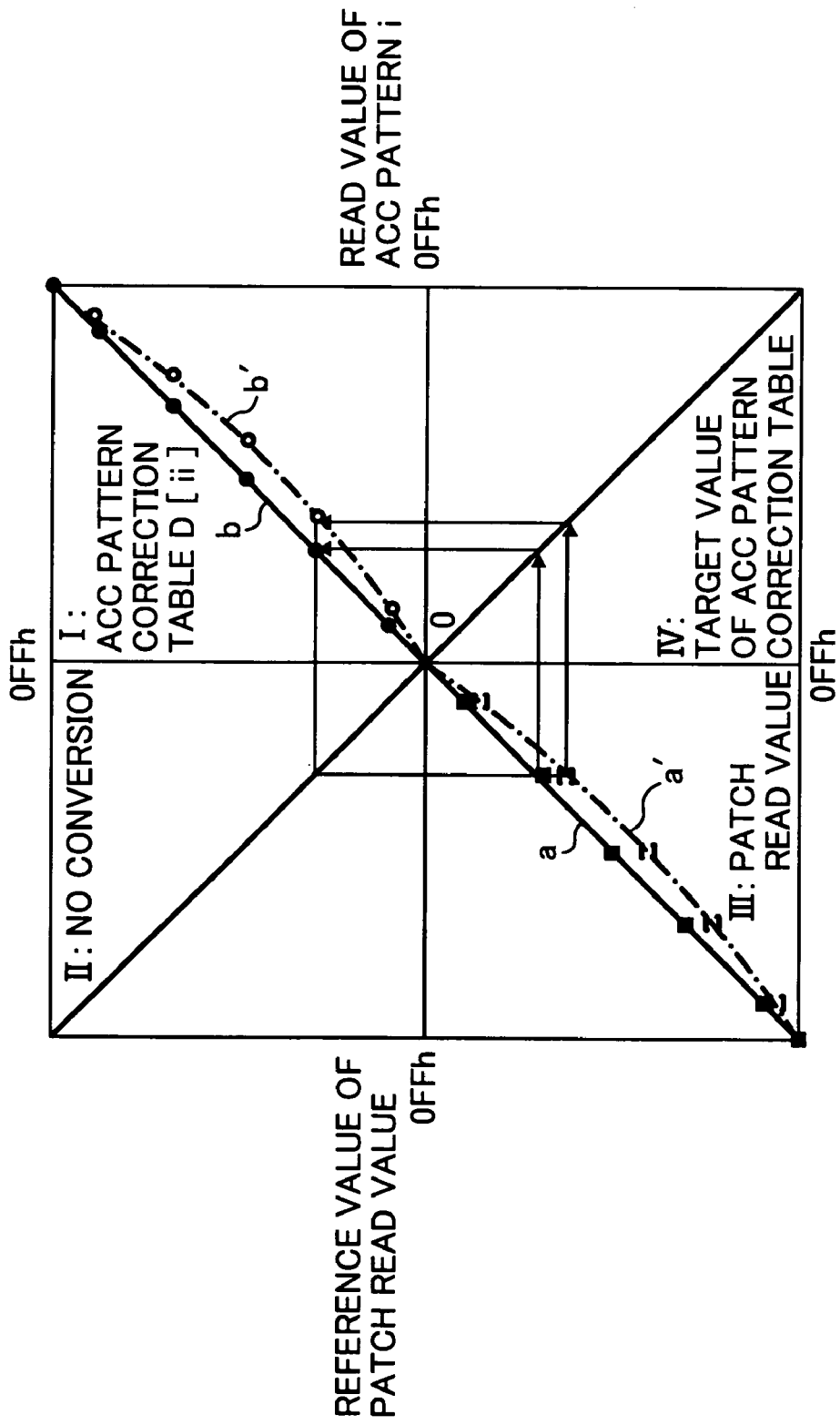
FIG. 42 is a quaternary chart of an automatic color correction (ACC) pattern read value correction table.

A method of creating an ACC pattern read value correction conversion table is explained based on a quaternary chart of an ACC pattern read value correction table shown in FIG. 42.

A first quadrant (1) in FIG. 42 represents a conversion table for correction of a required ACC pattern read value in which a horizontal axis represents a CCD pattern read value and a vertical axis represents a value after conversion. In a fourth quadrant (IV), a vertical axis represents a read value after correction with a correction coefficient k by chromatic and achromatic patches and a graph shows a target value (a reference value) for the purpose of obtaining a conversion table for a correction of ACC pattern read value based on read values of chromatic and achromatic patches. In a third quadrant (III), a horizontal axis represents a reference value of read values of chromatic and achromatic patches and a graph represents a value obtained by correcting a read value, which is obtained by reading the chromatic and achromatic patches, with a scanner with the correction coefficient k. A second quadrant (II) represents no conversion (through).

According to the characteristics shown in FIG. 42, based on results "a" and "a'" of the read value of the third quadrant (III), a conversion table (correction table) D [ii] (ii=0, 1, 2, ..., 255) for the correction of the ACC pattern read value required by the first quadrant (1) b, b' is created, respectively.

A target value of a read value shown in the fourth quadrant (IV) in FIG. 42 is created for the respective toners of Y, M, C, and K read by the ACC pattern. In this way, it is possible to improve adjustment accuracy of the ACC.

FIG. 43 is a schematic of an example of values obtained by reading color patches extracted for the correction of cyan toner with a scanner serving as a reference. In reading cyan toner, since sensitivity of a red signal is high, the red signal is used. Thus, a correction table for cyan toner reading at the time of ACC execution is created by using red signals of chromatic and achromatic patches of 1.white, 2. yellow, 3. red (or 4. magenta), 5. color 1 between magenta and blue, 6. color 2 between magenta and blue, 7. blue, 8. cyan, 10. gray, and 11. black that output different red signal values from a plurality of chromatic color patches having different tints.

Consequently, it is possible to prevent fluctuation in reading image signals due to the difference in the scanner sections 300 and improve the adjustment accuracy of the ACC. Therefore, it is possible to further improve an image quality.

Moreover, a gradation conversion table set for the image processing printer gamma conversion circuit 713 when a gradation pattern is read is generated using an image signal having a common one component in image signals obtained by reading a plurality of different color patches of the linkage color correction chart HC by the scanner section 300. Thus, it is possible to improve adjustment accuracy of a gradation conversion table and improve, even when a linkage output is performed, an image quality by using, among the R, G, and B image signals obtained by reading different color patches of the linkage color correction chart HC, the reading image signal of the scanner section 300 corresponding to a complementary color signal of Y, M, and C toners.

Furthermore, when a cyan reading scanner gamma conversion table at the execution of the ACC is created, the linkage color correction chart HC is created by printing ink. This causes a difference of a spectral reflection factor from that of toner. FIG. 43 shows an example of correction coefficients for the correction for red.

In this way, it is possible to create a further superior scanner gamma conversion table as an image signal conversion table for the ACC and further improve an image quality by correcting a difference between the spectral reflection factor characteristic of the printing ink of the linkage color correction chart HC and the toner spectral reflection factor characteristic of the printer section 100 that records and outputs a gradation pattern.

An operation screen for selecting an ACC function for image concentration (gradation characteristic) is described.

Figure 44:
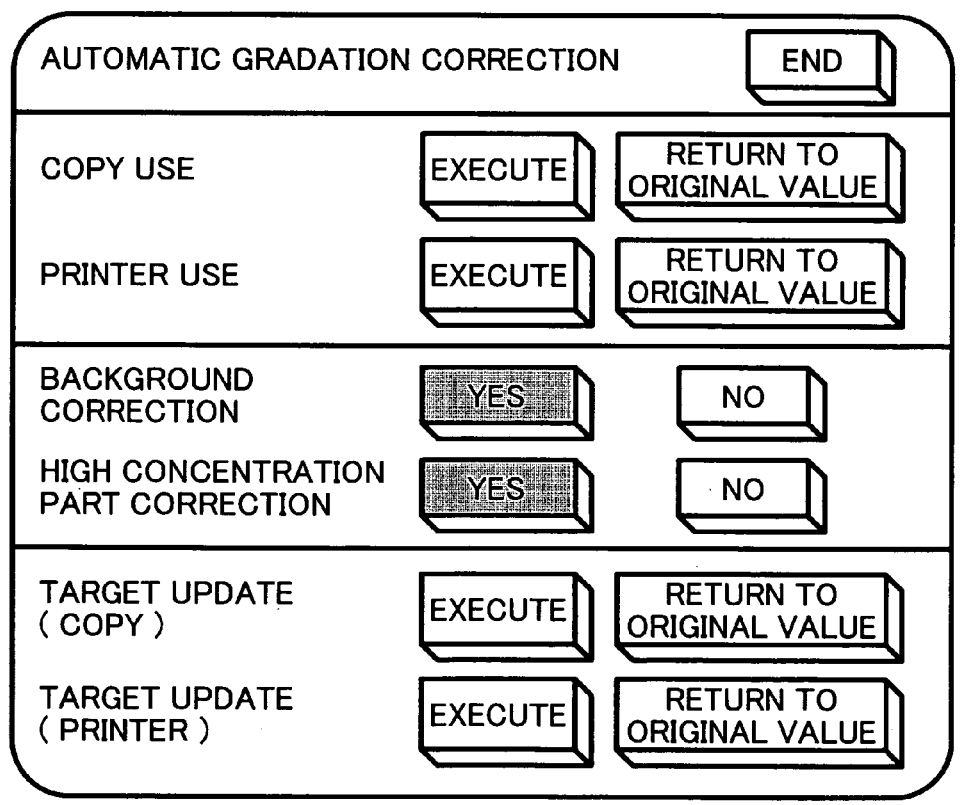
FIG. 44 is a schematic of a display showing an automatic gradation-adjustment screen.
Figure 45:
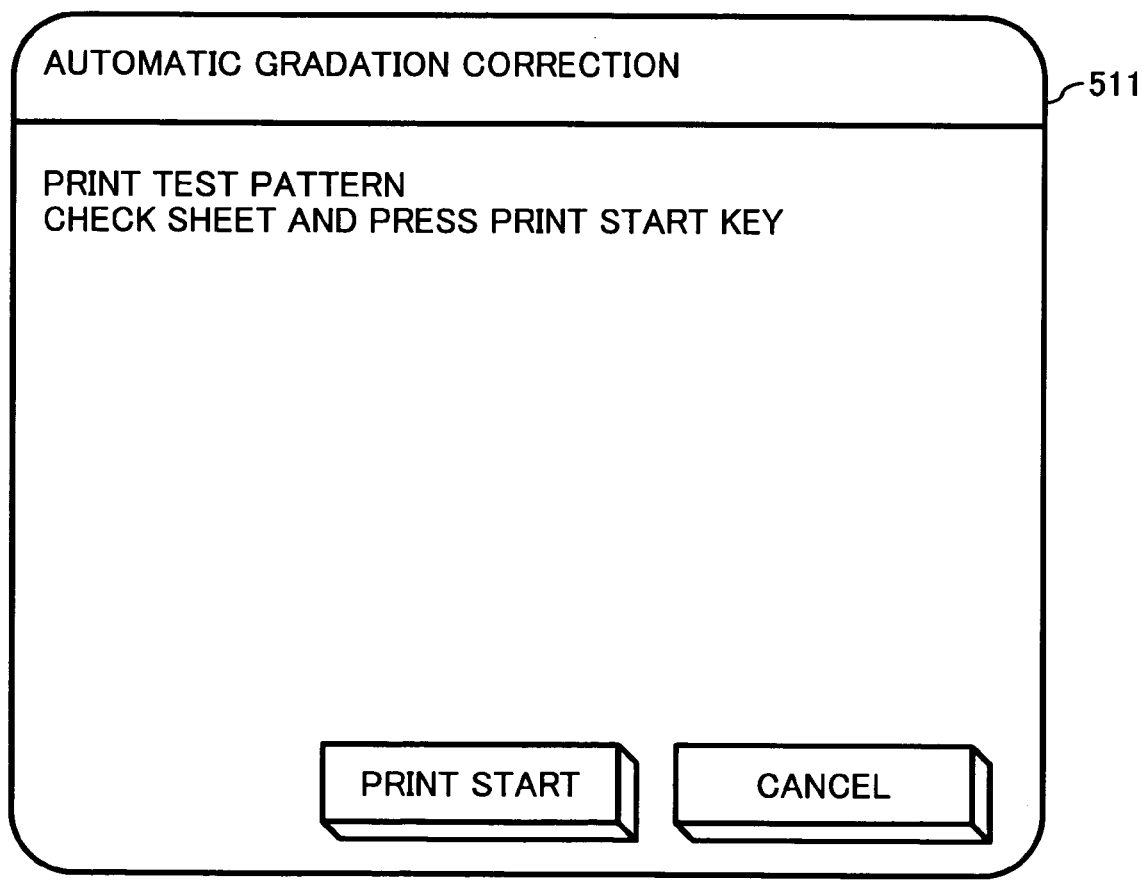
FIG. 45 is a schematic of a display showing an automatic-gradation-correction start screen.

When the ACC menu is called up in the liquid crystal screen 511 of the operation section 500 shown in FIG. 4, an automatic gradation adjustment screen shown in FIG. 44 is displayed. When [execution] of automatic gradation correction for copy use or for printer use is selected in this automatic gradation adjustment screen, an automatic gradation correction start screen shown in FIG. 45 is displayed on the liquid crystal screen 511. In this case, when "copy use" is selected in the automatic gradation adjustment screen of FIG. 44, a gradation correction table used for copy use is created and, when "printer use" is selected, a gradation correction table for printer use is created based on reference data.

In the automatic gradation adjustment screen in FIG. 44, a "return to original" key is displayed such that, when a result of performing image formation by the Y, M, C, and K gradation correction table after change is not desirable, it is possible to select the Y, M, C, and K gradation correction table before the processing.

When "automatic gradation correction setting" is selected, keys for the selection of "background correction", "high concentration part correction", "RGB ratio correction", "execution" or "non-execution" is displayed on in the automatic gradation adjustment screen of FIG. 44. In the "automatic gradation correction setting" menu, it is possible to select "automatic gradation correction setting" and "setting of detection of uneven light intensity". Note that these selections are not always required and "executed" may be always set.

The color copying apparatus 1 creates the scanner gamma conversion table for the respective R, G, and B reading components used in the copy from an achromatic patch as described above. On the other hand, the color copying apparatus 1 corrects the read values of the respective Y, M, C, and K gradation patterns obtained by reading the adjustment pattern output at the time of execution of ACC from the chromatic patch and the achromatic patch. Thus, the former processing uses the three conversion tables for R, G, and B while the latter processing uses the four conversion tables for Y, M; C, and K.

Figure 46:
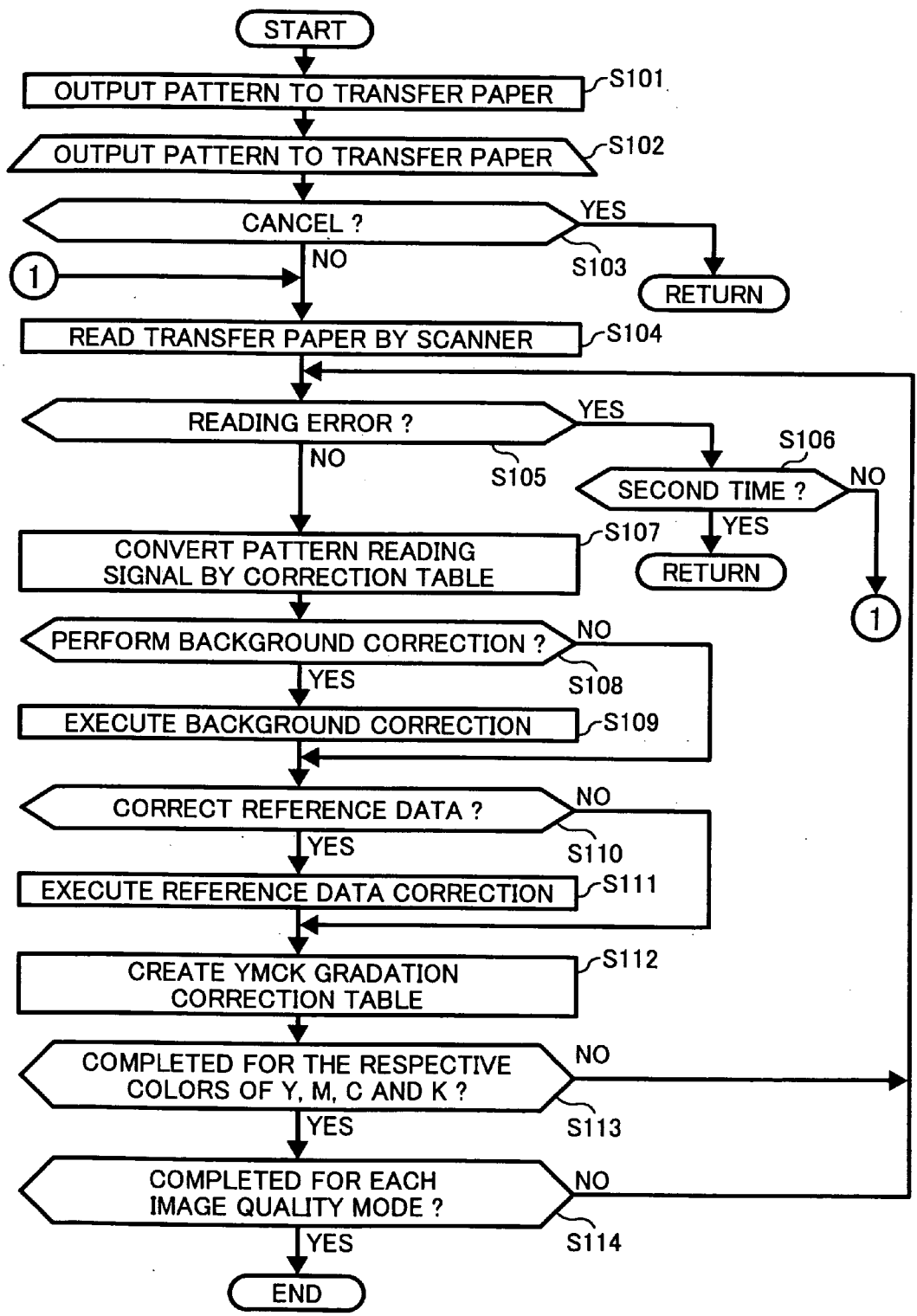
FIG. 46 is a flowchart of an ACC processing by the color copying apparatus shown in FIG. 2.

Operations of the ACC of the image concentration (gradation characteristic) are explained based on a flowchart shown in FIG. 46.

When "execution" of the automatic gradation correction for copy use or printer use is selected in the automatic gradation adjustment screen shown in FIG. 44, the automatic gradation correction start screen shown in FIG. 45 is displayed on the liquid crystal screen 511. When the "print start" key at the start of this automatic gradation correction is depressed, a plurality of concentration gradation patterns shown in FIG. 47 that correspond to the respective colors of Y, M, C, and K and respective image quality modes of characters and photographs are formed on the transfer paper (the transfer material) P (step S101).

This concentration gradation pattern is stored and set 00h, 10h, 20h, 30h, 40h, 50h, 60h, 70h, 90h, B0h, E0h, FFh The color copying apparatus 1 causes the development units 107K to 107C to develop latent images of the detection patterns of the photosensitive element drums 104K to 104C into visual images (step S303). The color copying apparatus 1 acquires a detection output VPi (i=1, 2, ..., np) of toner images on the photosensitive element drums 104K to 104C with the optical sensors 616K to 616C provided at the downstream in the rotation direction of the photosensitive element drums 104K to 104C (step S304).

The color copying apparatus 1 estimates a development characteristic based on this surface potential VSi of the photosensitive element drums 104K to 104C obtained by the potential sensor 617 and the detection output VPi of the toner image on the photosensitive element drums 104K to 104c obtained by the optical sensors 616K to 616C (step S305) and creates a gradation conversion table (step S306).

Figure 55:
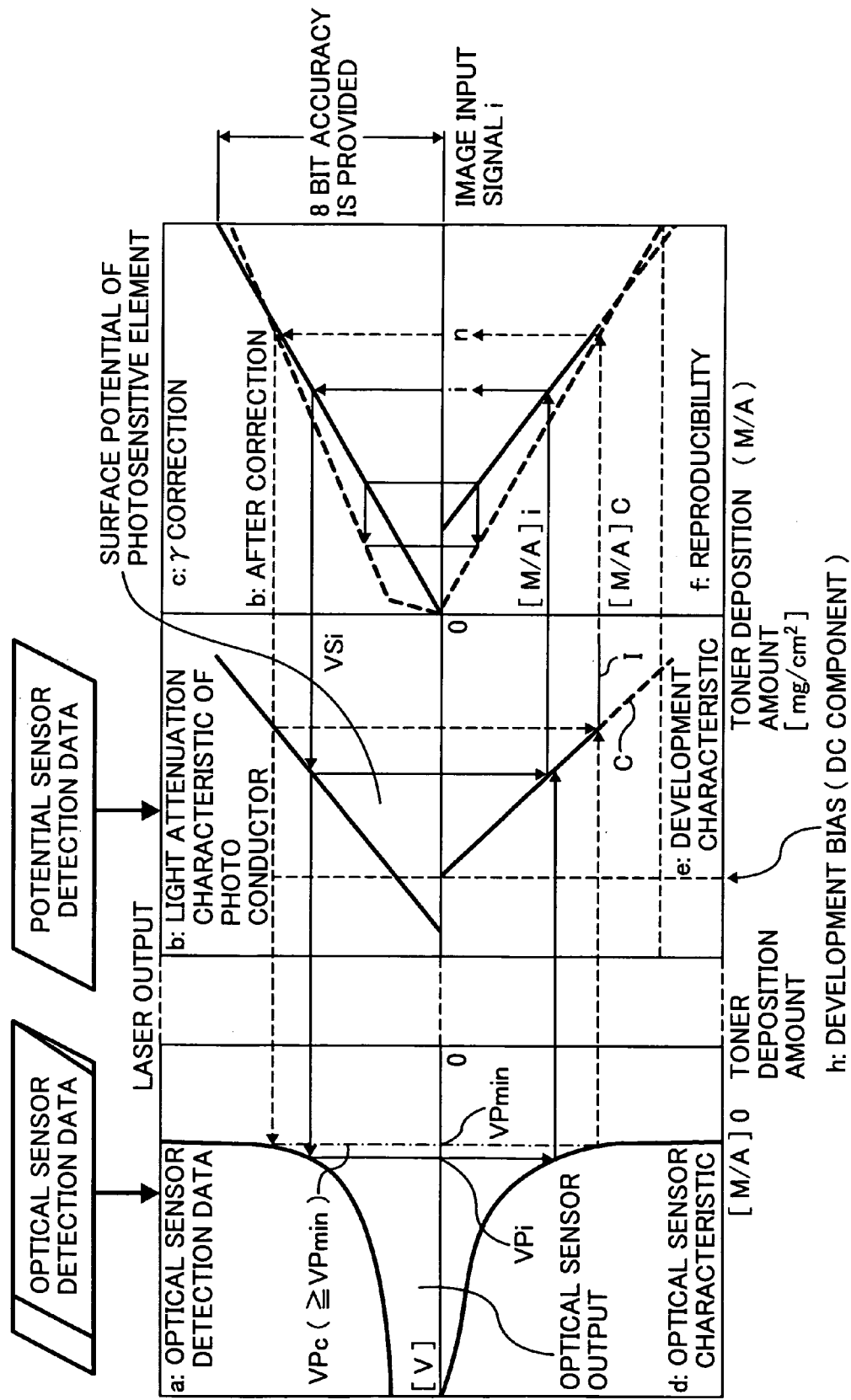
FIG. 55 is a schematic for illustrating a correction processing for an image signal in the ACC processing.

Thus, first, a method of correcting outputs of the optical sensors 616K to 616C and image signals is performed as shown in FIG. 55. In a graph (a) in FIG. 55, a vertical axis represents a laser output or an image output signal and a horizontal axis represents outputs of the optical sensors 616K to 616C. After the np concentration gradation pattern latent images are formed on the photosensitive in the ROM 716 of the IPU 612 in advance and is written with hexadecimal values of sixteen patterns of 00h, 11h, 22h, ..., EEh, and FFh. Although patches for 5 tones except a background section are displayed in FIG. 47, it is possible to select an arbitrary value out of 8-bit signals of 00h to FFh. The concentration gradation patterns include a character mode and a photograph mode. In the character mode, dither processing (e.g., pattern processing) is not performed and a pattern with 256 tones for one dot is formed. In the photograph mode, the dither processing (which will be described later) is performed.

Figure 48:
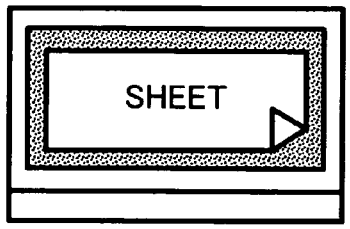
FIG. 48 is a schematic of a display showing a screen requesting a user to set the transfer paper on which a gradation pattern is output.

When the color copying apparatus 1 outputs a pattern to the transfer paper (transfer material) P, the liquid crystal screen 511 displays a message as shown in FIG. 48 to request a user to place the transfer paper (the transfer material) P with the concentration gradation pattern recorded and output thereon on the contact glass 3 serving as an original stand. When the transfer paper with the concentration gradation pattern formed thereon is placed on the contact glass 3 according to the instruction on this screen (step S102), it is checked whether "reading start" or "cancel" is selected on the screen in FIG. 48 (step S103). When "cancel" is selected, the processing is completed.

When "reading start" is selected at step S103, the color copying apparatus 1 causes the scanner section 300 to subject the transfer paper with the concentration gradation pattern formed thereon to main scanning and sub-scanning to read the RGB data of the Y, M, C, and K concentration patterns (step S104). In this case, the scanner section 300 reads data of a pattern part of the transfer paper with the concentration gradation pattern formed thereon and data of the background section of the transfer paper.

The color copying apparatus 1 judges whether the data of the pattern part of the transfer paper is correctly read (step S105). When the pattern part of the transfer paper is not correctly read, the color copying apparatus 1 checks whether the data is not correctly read for the second time (step S106). When the data is not correctly read for the first time, the color copying apparatus 1 causes the liquid crystal screen 511 to display the screen in FIG. 48. When the reading is instructed, the processing returns to step S104 to perform the processing as described above (steps S104 and S106). When the data is not correctly read for the second time at step S106, the processing is completed.

When the data of the pattern part of the transfer paper is correctly read at step S105, the color copying apparatus 1 converts and corrects the respective read values of the ACC patterns for the respective colors of Y, M, C, and K based on the ACC pattern read value correction table D[ii] (ii=0, 1, 2, ..., 255) (step S107) to determine, based on a result of the selection in the automatic gradation adjustment screen of FIG. 44, "execution" or "non-execution" of the background correction processing using the background data (step S108).

When "execution" of the background correction processing is selected at step S108, the color copying apparatus 1 applies the background data correction processing to the read data (step S109) and judges "execution" or "non-execution" of the correction of a high image concentration part of the reference data based on the selection result in the automatic gradation adjustment screen of FIG. 44 (step S110).

When "execution" of the correction of the high image concentration part of the reference data is selected at step S110, the color copying apparatus 1 applies the correction processing of the high image concentration part to the reference data (step S111) to create and select the YMCK gradation correction table (step S112). When the correction of the reference data is not performed at step S110, the color copying apparatus 1 creates and selects the YMCK gradation correction table without correcting the reference data (step S112).

When the color copying apparatus 1 creates and selects the YMCK gradation correction table, the color copying apparatus 1 checks whether the processing is performed for the respective colors of Y, M, C, and K (step S113) and, when the processing is not performed for the respective colors of Y, M, C, and K, returns to step S105 to execute the processing for the respective colors of Y, M, C, and K (steps S105 to S113).

When the processing for the respective colors of Y, M, C, and K is performed at step S113, the color copying apparatus 1 checks whether the processing is completed for the respective image quality modes of photographs and characters (step S114). When the processing is not completed, the color copying apparatus 1 returns to step S105 to perform the processing as described above (steps S105 to S114). When the processing for the respective image quality modes of photographs and characters is completed at step S114, the color copying apparatus 1 ends the processing.

Figure 49:
FIG. 49 is a schematic of a display showing a screen indicating that a reading of the set transfer paper is in process.

During the processing, the color copying apparatus 1 causes the liquid crystal screen 511 to display a screen indicating that the automatic gradation correction is being executed as shown in FIG. 49. When a result of the image formation according to the YMCK gradation correction table after the processing is not desirable, the automatic gradation adjustment screen in FIG. 44 displays the "return to an original state" key such that it is possible to select the YMCK gradation correction table before the processing.

The background correction processing is described. The background correction processing has two objectives. The first objective is to correct a white level of transfer paper used in the ACC. The reason why the background correction processing is performed is that, even when a single image is formed by a single machine, a value read by the scanner section 300 is different depending on the white level of the transfer paper. When the correction is not performed, there are disadvantages, for example, the white level is low. In addition, when a recycled paper or the like is used for the ACC, a yellow gradation correction table for the recycled paper is created. Thus, correction is performed to reduce the yellow component because the recycled paper generally includes a large quantity of yellow component. However, when copying is performed using, for example, art paper having a high white level, since an image has less yellow component, desirable color reproducibility may not be obtained.

Another reason for performing the background correction processing is that, when transfer paper (paper thickness) used for the ACC is thin, for example, a pressure plate for pressing the transfer paper is seen through the paper and is read by the scanner section 300. For example, when the ADF 400 is attached instead of the pressure plate, the belt 402 is used to convey the original G. However, this conveyor belt 402 has a low white level due to its rubber-base material and has a slightly gray color. Thus, an image signal is read as an image signal that is entirely high concentration in appearance. The belt 402 is created to be thinner accordingly when the YMCK gradation correction table is created. However, when transfer paper having large thickness and low translucency is used for the ACC, an image having entirely low concentration is reproduced. Therefore, a desirable image is not always obtained.

In order to prevent the defect as described above, a reading image signal of a pattern part is corrected based on a reading image signal of a paper background section and an image signal of the paper background section.

However, there are also advantages when the correction is not performed. When transfer paper including a large quantity of yellow component (e.g., recycled paper) is always used, color reproducibility is better with respect to a color containing a yellow component. In addition, when only transfer paper having small thickness is used, a gradation correction table is created to be suitable for the thin paper.

Thus, in the color copying apparatus 1, with the operation of the key of the operation section 500, it is possible to turn ON or OFF the correction of the background section deepening on a status of use of the color copying apparatus 1, preference of the user, or the like.

Operations and processing of the automatic gradation correction are described. Read Value obtained by reading, with the scanner section 300, a gradation pattern (see FIG. 47) formed on transfer paper including writing values LD [i] (i=0, 1, ..., 9) are set to be $v[t][i]==(r[t][i],g[t][i],t[b][i])$ (t=Y,M, C,or,K,i=0, 1, ..., 9) in a vector format.

Note that, instead of (r, g, b), the read values also may be represented by brightness, saturation, hue angle (L*, c*, h*), or brightness, redness, blueness (L*, a*, b*), and the like.

Read values of white stored in the ROM 716 or the RAM 717 is advance are set to be (r[W], g[W], b[W]).

A method of generating a gradation conversion table (LUT) in the image processing printer gamma conversion circuit 713 at the time of execution of the ACC is described.

In the read values of the gradation pattern v[t][i]=(r[t][i], g[t][i], b[t][i]), image signals of the respective complementary colors of Y, M, and C toners are b[t][i], g[t][i], and r[t][i]. Thus, only image signals of the respective complementary colors are used. For simplicity of explanation, the read values are represented using a[t][i] (i=0, 1, 2, ..., 9; t=C, M, Y, or, K). Processing is simple when a gradation conversion table is created.

Note that black toner provides a sufficient accuracy when any one of the R, G, and B image signals is used. A G (green) component is used here.

Reference data is given by a combination of a read value v0[t][i] of the scanner section 300 v0[t][i]=(r0[t][i], g0[t][i], b0[t][i]) and laser writing values LD[i](i=1, 2, ..., m) corresponding thereto. Similarly, only the Y, M, and C complementary color image signals are used to represent the data as, for simple illustration, A[t][n[i]](0≦n[i]≦255; i=1, 2, ..., m; t=Y, M, C, or, K). "m" is the number of reference data.

A YMCK gradation conversion table is obtained by comparing the a[LD] with reference data A[n] stored in the ROM 716.

Here, "n" is an input value to the YMCK gradation conversion table and the reference data A[n] is a target value of the reading image signal obtained by reading, with the scanner section 300, a YMC toner pattern output with the laser writing value LD[i] after the input value n is subjected to the YMCK gradation conversion. The reference data consists of two values of the reference value A[n] for which the correction is performed depending on the image concentration that can be output by the printer and the reference value A[n] for which the correction is not performed. The color copying apparatus 1 determines whether the correction is performed based on data for determination stored in the ROM 716 or the RAM 717 is advance.

The color copying apparatus 1 calculates LD corresponding to A[n] based on a[LD] to obtain a laser output value LD[n] corresponding to an input value n to the YMCK gradation conversion table.

By calculating this laser output value LD[n] with respect to the input value i=0, 1, ..., 255 (in the case of 8-bit signal), it is possible to obtain a gradation conversion table.

Instead of applying the processing to all values corresponding to the input values n=00h, 01h, ..., FFh (hexadecimal digit) to the YMCK gradation conversion table, discontinuous values such as ni=0, 11h, 22h, ..., FFh is subjected to the processing and points other than the values are subjected to an interpolation by the spline function or the like or the closest table passing the combination of (0, LD[0]), (11h, LD[11h]), (22h, LD[22h]), ..., (FFh, LD[FFh]) calculated in the processing is selected out of the YMCK γ correction tables stored in the ROM 716 in advance.

The above processing is explained with reference to FIG. 50. In a first quadrant (a) in FIG. 50, a horizontal axis represents an input value n to the YMCK gradation conversion table while a vertical axis represents a read value (after the processing) by the scanner section 300 that represents the reference data A[i]. The read values (after the processing) by the scanner section 300 are values obtained by subjecting values obtained by reading gradation patterns with the scanner section 300 to the RGB gamma conversion (not performed here), averaging processing for read data at a few positions in the gradation pattern, and addition processing. In order to improve calculation accuracy, 12-bit data signal is used for the processing.

Figure 50:
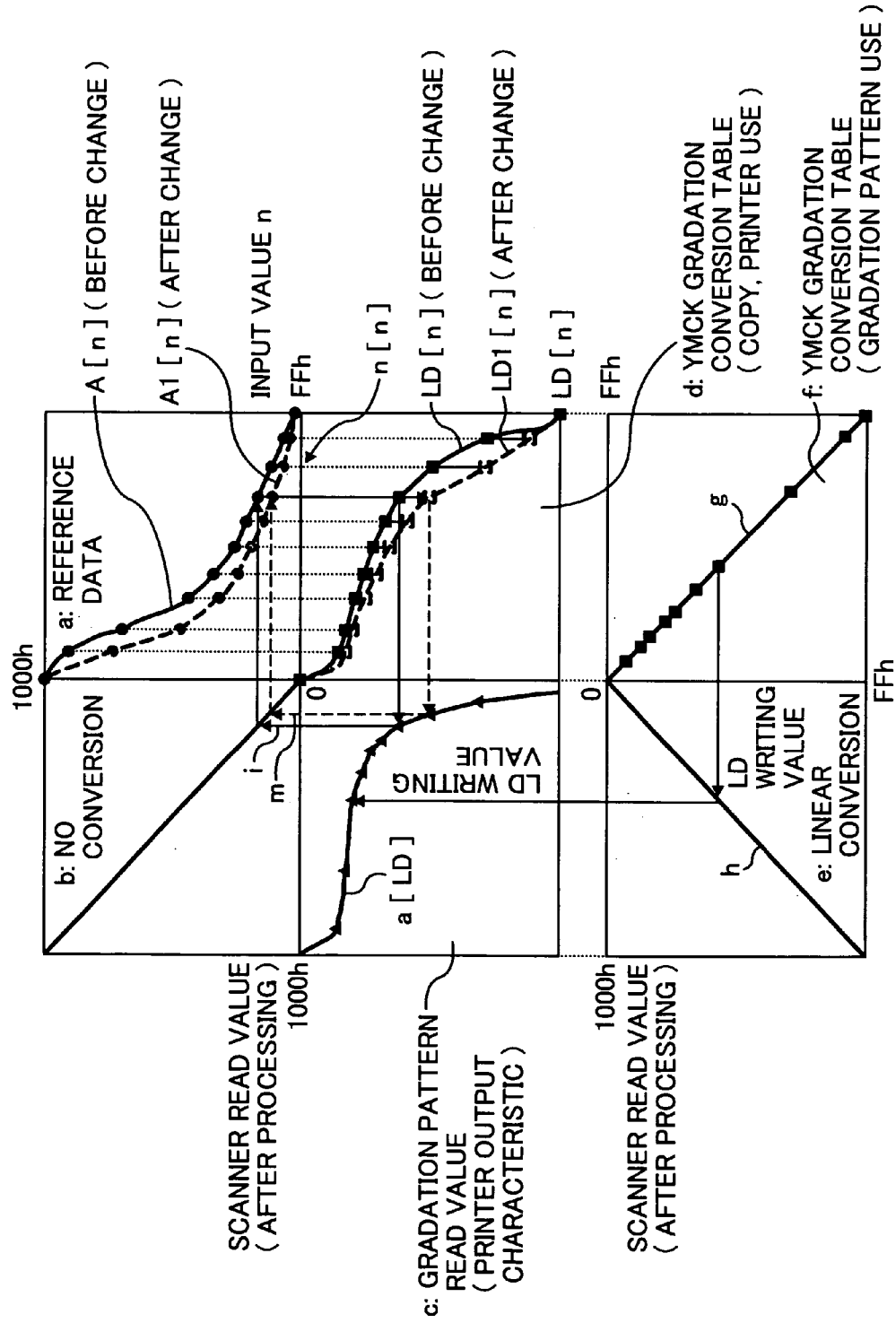
FIG. 50 is a quaternary chart for illustrating a calculation method in the ACC processing.

In FIG. 50, both of a horizontal axis and a vertical axis of a second quadrant (b) represent read values (after processing) of the scanner section 300.

In FIG. 50, a vertical axis of a third quadrant (c) represents a laser light (LD) writing value. Data a[LD], which is a writing value of the laser light, represents a characteristic of the printer section 100. Laser light (LD) writing values of a pattern actually formed are sixteen points of 00h (background), 11h, 22h, ..., EEh, FFh consisting of discontinuous values. However, spaces between detection points are interpolated to be treated as a continuous graph.

In FIG. 50, a graph (d) of a fourth quadrant is a YMCK gradation conversion table LD[i] and is provided for the purpose of obtaining this YMCK gradation conversion table.

In a graph (f), a vertical axis and a horizontal axis are the same as the vertical axis and the horizontal axis of the graph (d). When a gradation pattern for detection is formed, a YMCK gradation conversion table (g) shown in the graph (f) is used.

A horizontal axis of the graph (e) is the same as the horizontal axis of the third quadrant (c) and represents linear conversion for convenience representing a relation between a laser light (LD) writing value at the time when a gradation pattern is created and a read value (after processing) of a gradation pattern by the scanner section 300.

In FIG. 50, a reference data A[n] is obtained with respect to the input value n and a laser light (LD) output LD[n] to obtain the A[n] is found along an arrow (1) in FIG. 50 using the gradation pattern read value a[LD].

Figure 51:
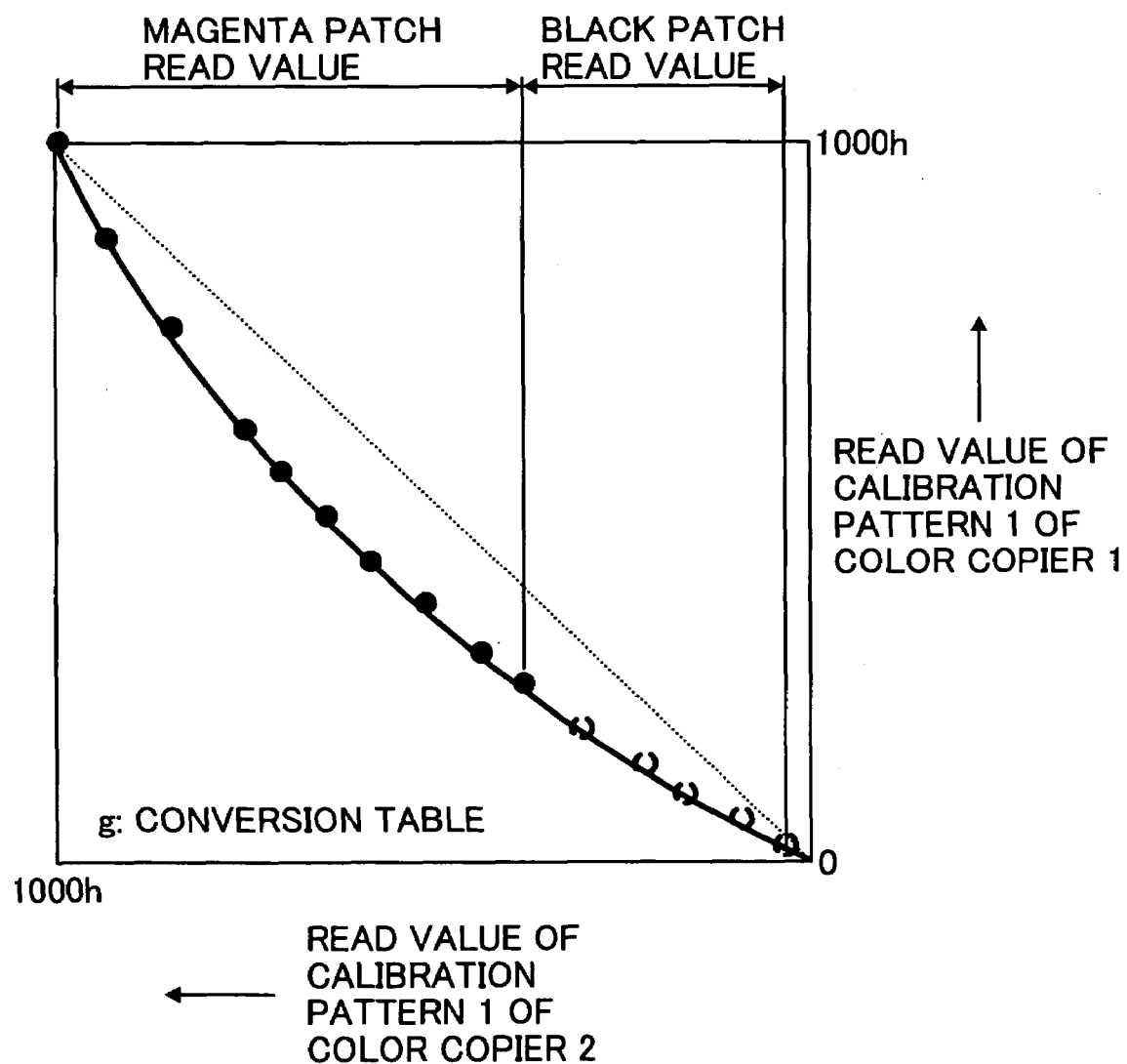
FIG. 51 is a schematic for illustrating creation of a green conversion table.

FIG. 51 illustrates an example of a Green data conversion table. A part having a read value with a large quantity of reflected light from a 1000H-side original (light part) uses a read value of a Magenta calibration pattern 1 while a part having a small amount of reflected light from an OH-side original (dark part) uses a Black read value for the generation.

Figure 52:
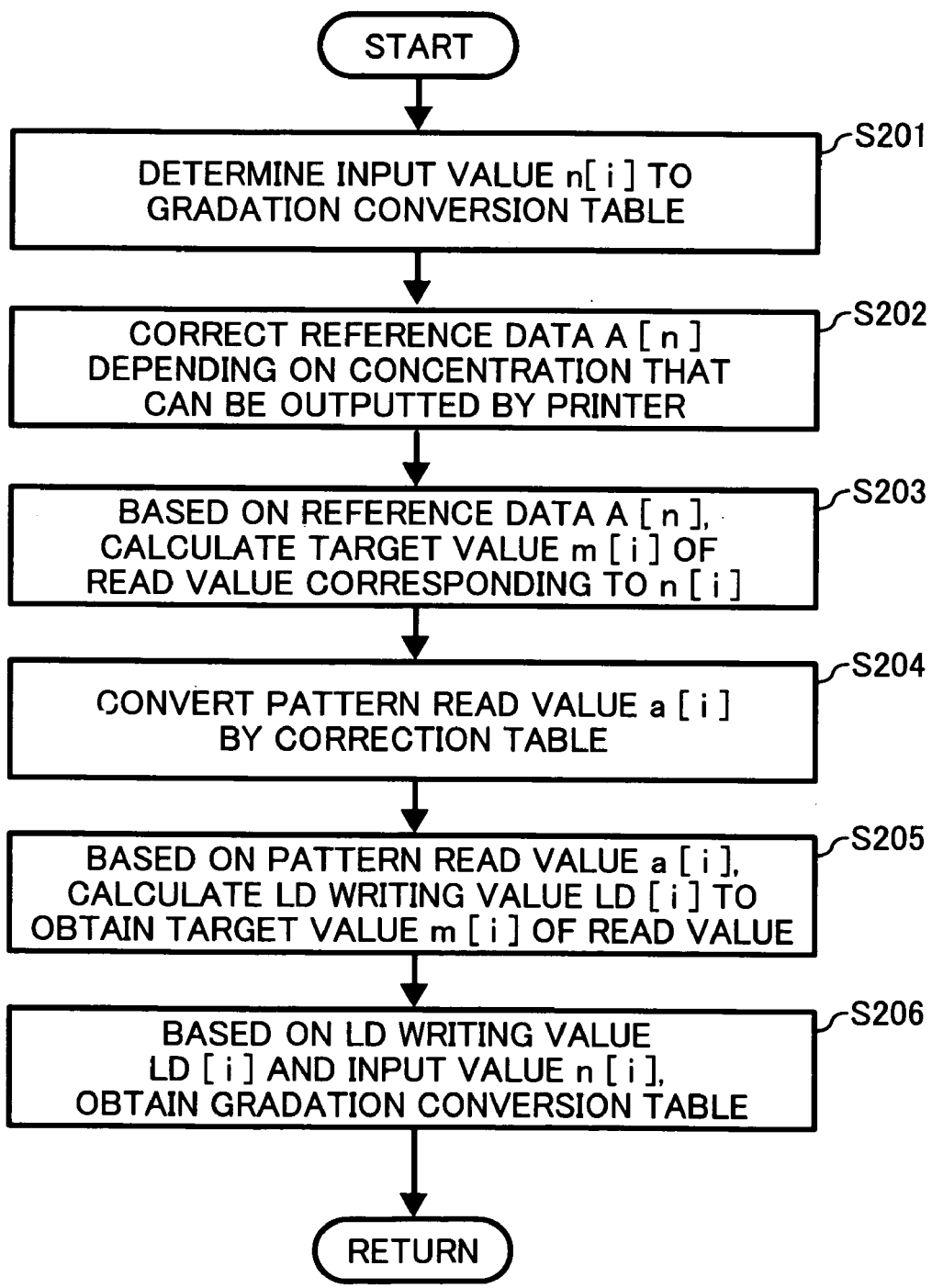
FIG. 52 is a flowchart of a gradation-conversion-table creation processing in the ACC.

The ACC calculation procedure is explained with reference to a flowchart in FIG. 52. In FIG. 52, first, ACC gradation conversion table creation processing causes the color copying apparatus 1 to determine an input value (e.g., n[i]=11(h)xi (i=0, 1, ..., imax=15)) required to obtain a YMCK 7 correction table (a gradation conversion table) (step S201).

Compared with the graph at the time when the RGB gamma conversion is performed, the same printer characteristic graph is obtained but an RGB gamma conversion table of a second quadrant has a different characteristic. Therefore, reference data of a first quadrant must be changed. However, a characteristic of the YMCK gradation conversion table LD[h], which is a final result, is the same.

As described above, the reference data is changed depending on whether the processing by the RGB gamma conversion table is performed. The example of the RGB gamma conversion table used in this embodiment is described above.

The color copying apparatus 1 corrects the reference data A[n] according to the image concentration that can be output by the printer section 100 (step S202).

A laser light writing value for obtaining maximum image concentration, which can be created by the printer section 100, is set as FFh (hexadecimal indication) and a read value m[FFh] of a gradation pattern at this point is set as mmax. Reference data from a low image concentration side to an intermediate image concentration side for which correction is not performed is set as A[i](i=0, 1, ..., i1), reference data on a high image concentration side for which correction is not performed is set as A[i](i=i2+1, imax−1)(i1≦i2, i2≦imax−1), and reference data for which correction is performed is set as A[i](i=i1+1, ..., i2).

In the following explanation, assuming an image signal proportional to an original reflectivity for which the RGB gamma conversion is not performed, a specific calculation method is explained. Among reference data for which correction is not performed, reference data A[i2+1] of a high image concentration part that has lowest image concentration and a reference data A[i1] of a low image concentration part that has lowest image concentration are used to calculate the difference Δref of the data with the following Equation 46.

$$\Delta ref = A[i1] - A[i2+1] \quad (46)$$

where in the case of reflectivity linear or brightness linear data for which the RGB gamma conversion serving as inversion processing is not performed, Δref>0.

On the other hand, based on a read value mmax of a gradation pattern that can be created by the printer section 100, for which maximum image concentration is obtained, a difference Δdet is similarly calculated by the following Equation 47.

$$\Delta det = A[i1] - mmax \quad (47)$$

Reference data A[i](i=i1+1, ..., i2) subjected to the correction of the high concentration part is calculated by the following Equation 48.

$$A[i] = A[i1] + (A[i] - A[i1]) \times (\Delta det/\Delta ref) \quad (48)$$

where i=i1+1, i1+2, ..., i2−1, i2.

The color copying apparatus 1 calculates a reading image signal m[i] of the scanner section 300 corresponding to n[i] based on the reference data A[n] (step S203).

Note that, to calculate this reading image signal m[i], actually, reference data A[n[j]] corresponding to discontinuous n[j] (0≦n[j]≦255, j=0, 1, ..., jmax, n[j]≦n[k] for j≦k) is calculated as follows.

$$j(0 \leq j \leq jmax) \text{ with } n[j] \leq n[i] < n[j+1]$$

Note that, in the case of a 8-bit image signal, calculation is simplified if reference data is calculated as n[0]=0, n[jmax]=255, n[jmax+1], A[jmax+1]=A[jmax].

Accuracy of the γ correction table obtained finally is higher when an interval of reference data n[j] is made narrow as much as possible.

The color copying apparatus 1 corrects the ACC pattern read value a[LD] to the writing value LD with the correction table D[ii](ii=0, 1, 2, ..., 255) indicated as "b" or "b" in FIG. 42 as follow (step S204).

$$a1[LD] = D[a[LD]]$$

a1[LD] is represented as a[LD] below.

Based on "j" calculated in this way, m[i] is calculated by the following Equation 49.

$$m[i] = A[j] + (A[j+1] - A[j]) \ast (n[i] - n[j])/(n[j+1] - n[j]) \quad (49)$$

Note that, although interpolation is performed by a primary expression in Equation 48, the interpolation may be performed by a higher order function, a spline function, or the like. In this case, m[i] is given by the following $$m[i] = f(n[i]) \quad (50)$$

Where $$f(x) = \sum_{i=0}^{k} bix^i$$

in the case of a k-th order function.

When the color copying apparatus 1 calculates m[i], the color copying apparatus 1 calculates a writing value LD[i] of a laser beam (LD) for obtaining m[i] in the same procedure (step S205). When image signal data not subjected to RGB gamma conversion is processed, a[LD] becomes smaller as a value of the laser light (LD) increases as described below.

For LD[k]<LD[k+1], a[LD[k]]≧a[LD[k+1]]

Values during the pattern formation are ten values of LD[k]= 00h, 11h, 22h, ..., 66h, 88h, AAh, FFh, (k=0, 1, ..., 9). This is because, with image concentration with a small toner deposition amount, since a change in a read value of the scanner section 300 with respect to the toner deposition amount is large, an interval of a writing value LD[k] of a pattern is set dense. With image concentration with a larger toner deposition amount, since a change in a read value of the scanner section 300 with respect to a toner deposition amount is small, an interval is increased for reading.

Consequently, there are advantages compared with the time when the number of patterns is increased in such a manner as LD[k]=00h, 11h, 22h, ..., EEh, FFh (total of sixteen points). For example, toner consumption is controlled, a change with respect to an LD writing value is small in a high image concentration area, and a reduced interval between LD writing values is not always effective for an improved accuracy because of an influence of uneven potential on the photosensitive element drums 104K to 104C, uneven deposition of toner, uneven fixing, or uneven potential. Thus, a pattern is formed with the LD writing value as described above.

Then, LD[i] is set as follows with respect to LD[k] for which a[LD[k]]≧m[i]>a[LD[k+l]] is obtained.

$$LD[i]=LD[k]+(LD[k+1]-LD[k])*(m[i]-a[LD[k]])/(a[LD[k+1]]-a[LD[k]])$$

When 0≦k≦kmax(kmax>0), if a[LD[kmax]]>m[i], LD[i] is estimated by performing extrapolation with a primary expression (when the target value calculated based on the reference data has a high image concentration) in the manner describe below.

$$LD[i]=LD[k]+(LD[kmax]-LD[kmax-1])*(m[i]-a[LD[kmax-1]])/(a[LD[kmax]]-a[LD[kmax-1]])$$

Consequently, it is possible to obtain a set of an input value n[i] to the YMCK γ correction table and an output value LD[i] (n[i], LD[i]) (i=0, 1, . . . , 15).

Note that, other than the extrapolation with a primary expression described above, extrapolation may be performed by a method using logarithm or the like.

Based on the calculated (n[i], LD[I]) (i=0, 1, . . . , 15), the spline function or the like is used to perform an interpolation or a γ correction table stored in the ROM 716 is selected to obtain a gradation conversion table (step S206).

Figure 53:
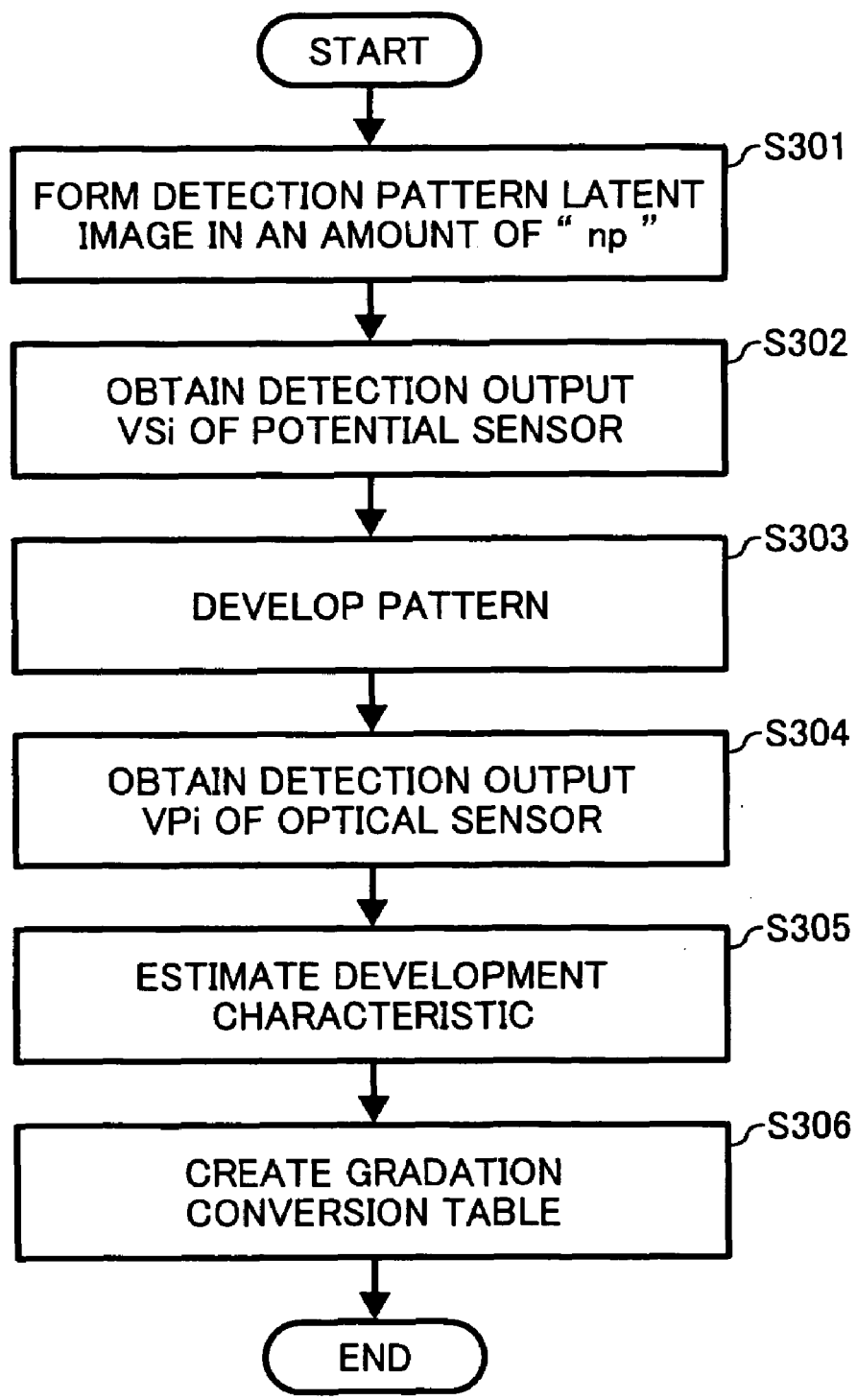
FIG. 53 is a flowchart of a development-characteristic detection processing.

The color copying apparatus 1 detects, to prevent background pollution ("fog") and to secure concentration, a development characteristic (a toner deposition amount characteristic with respect to development potential) as shown in FIG. 53.

As shown in FIG. 53, the color copying apparatus 1 forms np detection pattern (a concentration gradation pattern) latent images on the photosensitive element drums 104K to 104C (step S301) and acquires a detection output of a potential sensor (step S302).

Figure 54:
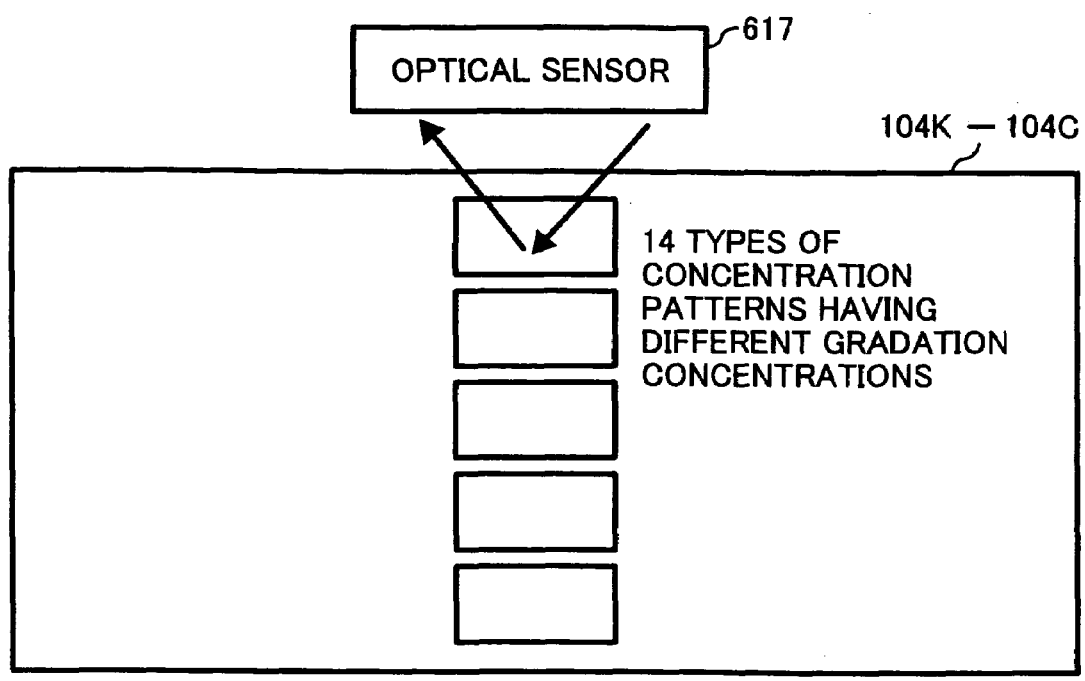
FIG. 54 is a schematic of a detection pattern formed on a photosensitive element drum by development characteristic detection processing and a detection status by an optical sensor.

As shown in FIG. 54, the color copying apparatus 1 forms np (e.g., np=12) detection patterns (concentration gradation patterns) on the photosensitive element drums 104K to 104C. The color copying apparatus 1 reads a surface potential Vsi (i=1, 2, . . . , np) of the photosensitive element drums 104K to 104C with a potential sensor 617 that detects a surface potential. A laser output used for the formation of detection patterns has, for example, image signal values (hexadecimal indication) described below. element drums 104K to 104C, the latent images are developed and an amount of reflected light of the toner images is detected by the optical sensors 616K to 616C to obtain the graph.

In a graph (b) in FIG. 55, a vertical axis represents laser outputs as in the case of the graph (a) and a horizontal axis represents surface potentials of the photosensitive element drums 104K to 104C to represent light attenuation characteristics of the photosensitive element drums 104K to 104C. As in the case of the graph (a), this graph (b) is obtained by measuring, with the potential sensor 617, surface potentials when the np concentration gradation pattern latent images are formed on the photosensitive element drums 104K to 104C.

A graph (c) in FIG. 55 represents a gradation conversion table used for the image formation by the printer section 100. A horizontal axis represents an image input signal (e.g., an amount proportional to concentration of an original image) and a vertical axis represents an image signal (an image output signal) after a laser output of an image input signal is converted according to the gradation conversion table. The image input signal has a 8-bit (256 values) resolution and a laser writing light amount also has the 8 (to 10) bit resolution between a minimum value and a maximum value of the laser. The graph (a) in FIG. 55 represents a relation between a laser output used for the detection and an image input signal.

In a graph in FIG. 55, a vertical axis represents toner deposition amounts on the photosensitive element drums 104K to 104C while a horizontal axis represents outputs of the optical sensors 616K to 616C to represent output characteristics of the optical sensors 616K to 616C. The output characteristics of the optical sensors 616K to 616C in the graph (d) are different depending on a type of the optical sensors 616K to 616C to be used, an attachment angle, a distance from the photosensitive element drums 104K to 104C, and the like. However, the output characteristics of the optical sensors 616K to 616C are known in advance and are almost fixed.

In a graph (e) of FIG. 55, a vertical axis represents toner deposition amounts while a horizontal axis represents surface potentials of the photosensitive element drums 104K to 104C to represent a relation between surface potentials of the photosensitive element drums 104K to 104C and deposition amounts of toner on the photosensitive element drums 104K to 104C (i.e., development characteristics). In the graph (e) in FIG. 55, "h" represents a DC component of a development bias.

A graph (f) in FIG. 55 represents a relation between an image input signal and an amount of toner deposited on the photosensitive element drums 104K to 104C.

Using the relation in the graph (d) in FIG. 55, an output VPi of the optical sensors 616K to 616C is converted into toner deposition amounts on the photosensitive element drums 104K to 104C (M/A)i[mg/cm2](i=1, 2, . . . , np). For example, reflected light of toner images formed on the photosensitive element drums 104K to 104C is detected by the optical sensors 616K to 616C and a result of the detection is sent as a detection signal to the CPU 715. The CPU 715 calculates, based on the following Equation 51, a deposition amount m1 [g/cm2] per a unit area of toner deposited on a reference pattern based on VSP and VSG as an optical sensor output and a background section output based on a toner deposition amount in a reference pattern part, respectively.

$$m1=-\ln(VSP/VSG)/\beta \qquad (51)$$

where β is a constant determined by the optical sensors 616K to 616C and toner and, in the case of black toner, β=−6.0×10³ [cm2/g]. Note that outputs are converted in the same manner for yellow, cyan, and magenta.

Although a deposition amount per a unit area m1 [g/cm2] of toner deposited to a reference pattern is calculated in the above explanation, outputs may be converted to calculate the deposition amount with a lookup table created in advance.

As described above, a relation between the surface potential VSi on the photosensitive element drums 104K to 104C and the toner deposition amount (M/A)i on the photosensitive element drum 104K to 104C is obtained and a development characteristic j in the graph (e) of FIG. 55 is obtained.

However, as shown in a graph (d) of FIG. 55, outputs of the optical sensors 616K to 616C indicate a fixed value Vpmin in the case of a toner deposition amount ((M/A)≧(M/A)C) higher than a certain toner deposition amount (M/A)C. On the other hand, with respect to an image signal equal to or higher than an "n" image signal in the graph (c) in FIG. 55, surface potentials on the photosensitive element drums 104K to 104C actually decrease as shown in the graph (b). Regardless of a change in the toner deposition amount, a toner deposition amount (M/A) on the photosensitive element drums 104K to 104C always takes a fixed value (M/A)C. Thus, in the graph (e), a development characteristic obtained based on the detection result is as indicated by "j" even when an actual development characteristic is as indicated by the graph c. This causes a difference between the actual value C and the detected value j.

In order to compensate for the difference between the actual development characteristic and the development characteristic calculated based on the detection value, correction described below is performed.

When the detection value VPi of the optical sensors 616K to 616C to the image signal i is equal to or higher than the predetermined value VPc, the detection value VPi is converted into a toner deposition amount on the photosensitive element drums 104K to 104C or (M/A)I nearly proportional to the toner deposition amount. Based on these values, a relational expression of the output value VSi of the potential sensor 617 and the (M/A)I are calculated, for example, as indicated by the following Equation 52 using a primary expression $$(M/A)i = a \times VSi + b \quad (52)$$

where VPi≧vPc.

Alternatively, a DC component of a development bias is assumed to be Vdc to obtain a relational expression as indicated by the following Equation 53.

$$(M/A)i = a \times (VSi - Vdc) + b \quad (53)$$

where VPi≧VPc.

"a" and "b" are coefficients determined by a method such as a least-squares method based on the values of VSi and (M/A)I.

Assuming that a toner deposition amount on the photosensitive element drums 104K to 104C at the time when output values of the optical sensors 616K to 616C are VPc is (M/A)C, a range of the deposition amount satisfying (M/A)i≦(M/A)C is the same. This may increase a deviation because of a linear relation with the surface potential. In order to prevent such a case, the coefficients "a" and "b" of the Equation 52 are determined with respect to the detection result of the toner deposition amount on the photosensitive element drums 104K to 104C that satisfies (M/A)min≦(M/A)≦(M/A)C.

Although the toner deposition amount is used in the above explanation, a detected output of the optical sensors 616K to 616C corresponding to (M/A)min may be assumed as VPmax to determine the coefficients "a" and "b" of Equation (14) based on a toner deposition area the toner deposition area satisfying the following Equation 54.

$$VPc \leq VP \leq VPmax \quad (54)$$

As described above, a gradation conversion table determined for the image processing printer gamma conversion circuit 713 for a gradation pattern reading is generated by the following procedure. First, among image signals obtained by reading, with the scanner section 300, a plurality of different colors of patches of the linkage color correction chart HC with respect to an image signal having one common component, read patches are used to calculate different predetermined coefficients "a" and "b". A table is generated according to an image signal calculated by the calculation. With this table, it is possible to correct a difference between a characteristic of a spectral reflection factor of printing ink of the linkage color correction chart HC and a characteristic of a spectral reflection factor of toner of the printer section 100 that records and outputs a gradation pattern to create a further superior gradation conversion table for the ACC. Therefore, it is possible to further improve an image quality.

As described above, according to this embodiment, based on the read values in the linkage color correction chart HC that consists of a plurality of achromatic patches and a plurality of chromatic patches having different concentrations and reference values in the linkage color correction chart HC, a masking coefficient according to each hue area is calculated and an image signal after the gradation conversion of the input image signal from the scanner section 300 is corrected according to the masking coefficient. Consequently, at the execution of the linkage output function, it is possible to reduce deterioration with time and use of a scanner optical system, a machine difference of a scanner due to fluctuation in spectral transmission rate and spectral sensitivity among machines (e.g., CCD, infrared-ray cut filter), improve the printer adjustment accuracy, and reduce fluctuation in adjustment.

Moreover, it is possible to highly accurately correct, even when concentration or tint in the linkage color correction chart HC fluctuate in the market, the fluctuation by using a deviation amount between a read value and a reference value without using an absolute value of a read value.

Furthermore, according to this embodiment, a masking coefficient according to each hue area for correcting an image signal after gradation conversion of an input image signal from the scanner section 300 is calculated by reading, with the scanner section 300, the linkage color correction chart HC consisting of a plurality of achromatic patches and a plurality of chromatic patches having different concentrations to compare the linkage color correction chart HC with a reference value set in advance of the linkage color correction chart HC. Consequently, it is possible to reduce, at the execution of the linkage output function, deterioration with time and use of a scanner optical system, reduce the a machine difference of a scanner due to fluctuation in spectral transmission rate and spectral sensitivity among machines (e.g., CCD, infrared-ray cut filter), improve the printer adjustment accuracy, and reduce fluctuation in adjustment.

A second embodiment of the present invention is explained with reference to FIGS. 56 to 58. Note that components same as those in the first embodiment are denoted by the same reference numerals and explanations of the components are omitted.

Figure 56A:
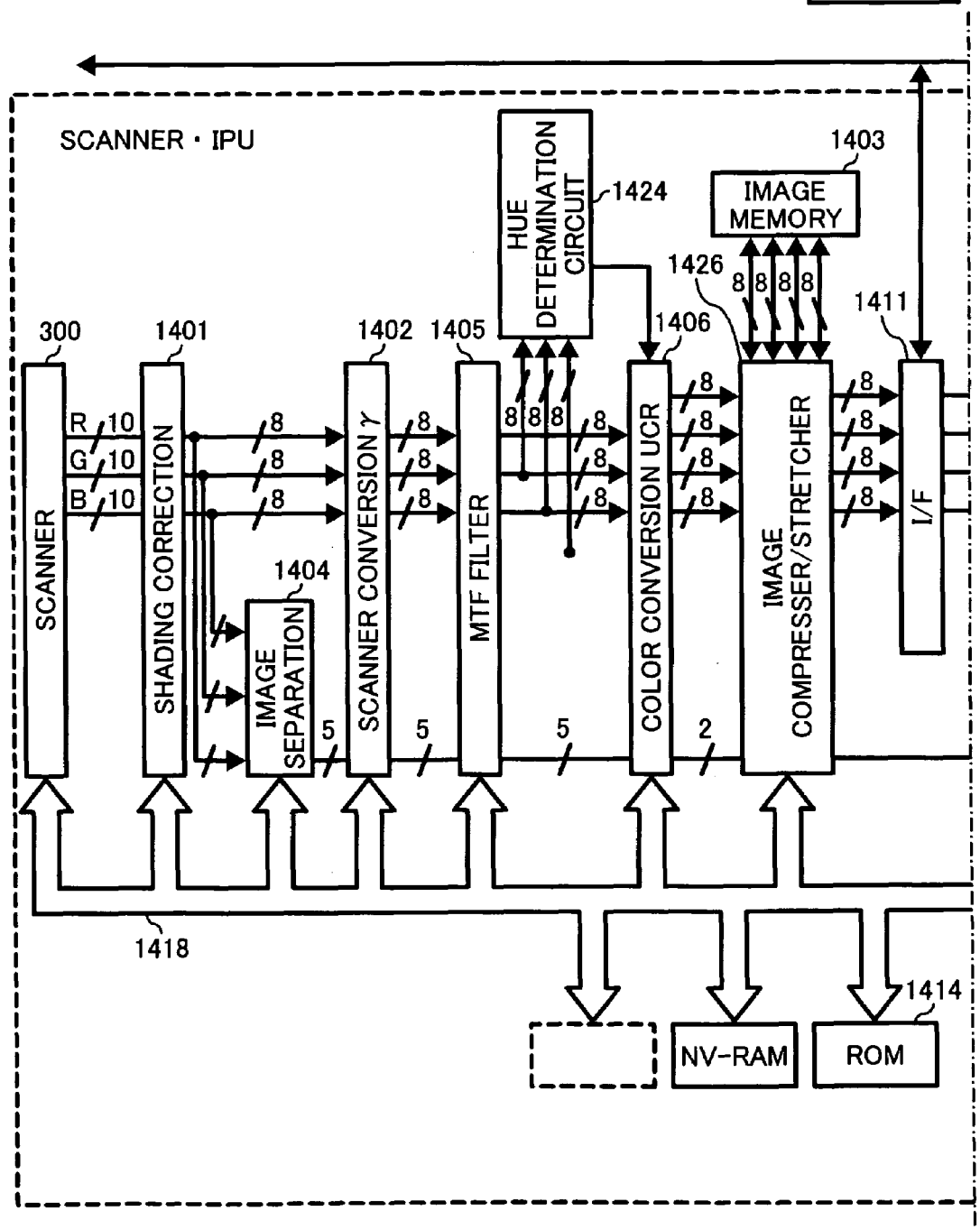
FIG. 56 is a circuit block diagram of an IPU and a printer section of a color copying apparatus according to a second embodiment of the present invention.
Figure 56B:
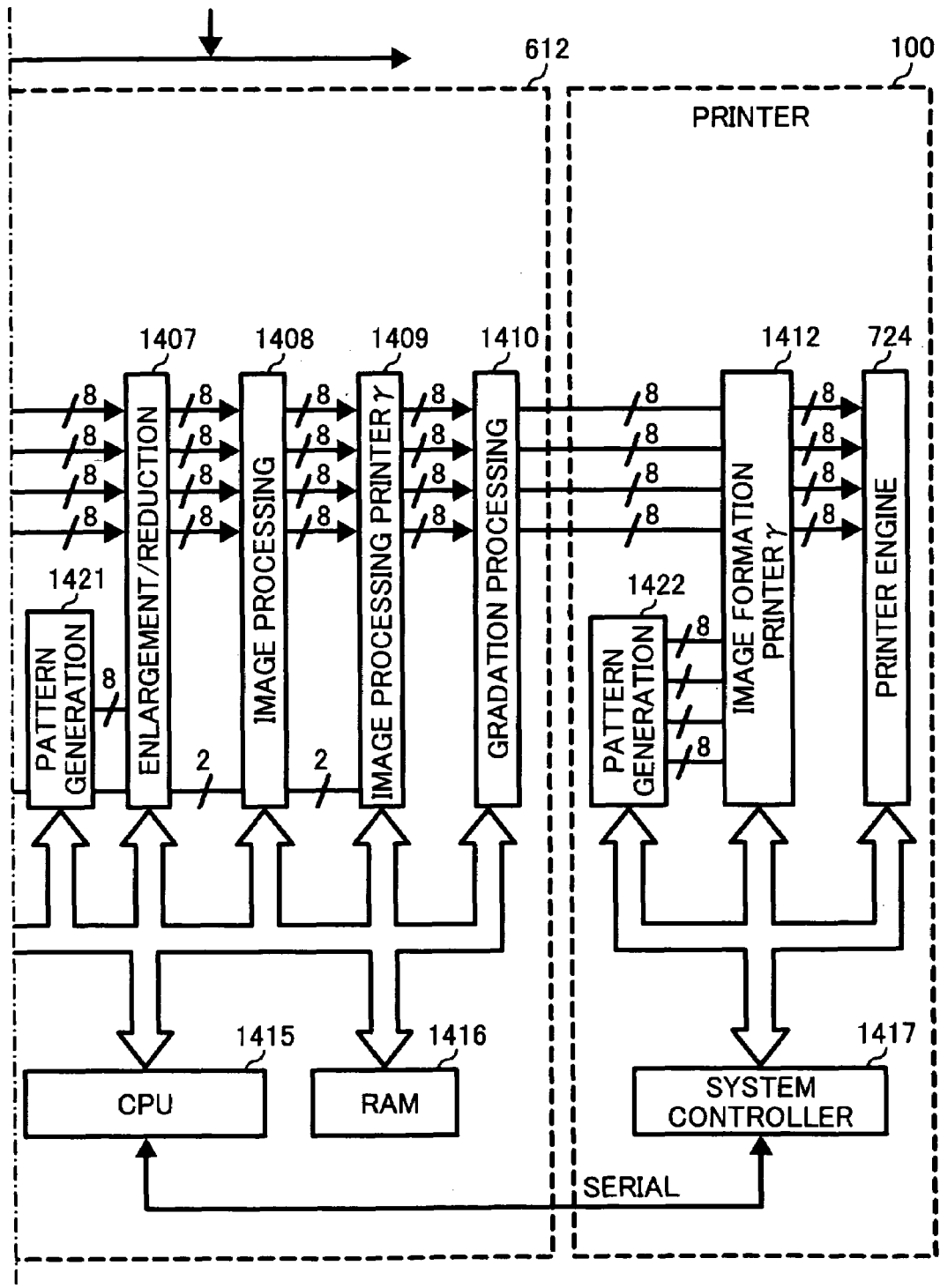

FIG. 56 is a circuit block diagram of the IPU 612 and the printer section 100 in the color copying apparatus 1 according to this embodiment. In FIG. 56, reference numeral 300 denotes a scanner; 1401, a shading correction circuit; 1402, a scanner gamma conversion circuit; 1403, an image memory;

1404, an image separation circuit; 1405, a MTF filter; 1406, a color conversion UCR processing circuit; 1407, an enlargement/reduction circuit; 1408, image processing (create) circuit; 1409, an image processing printer gamma conversion circuit; 1410, a gradation processing circuit; 1411, an interface I/F selector; 1412, an image formation section printer γ (hereinafter referred to as PROCON γ) conversion circuit; 724, a printer engine; 1414, a ROM; 1415, a CPU; 1416, a RAM; 1417, a system controller; and 1421 and 1422, pattern generation circuits.

With reference to FIG. 56, operations of the IPU 612 are described. An original to be copied is subjected to color separation by the color scanner 300 to be separated into R, G, and B and is read with a 10-bit signal as an example. The read image signal is corrected by the shading correction circuit 1401 such that unevenness in the main scanning direction is corrected and is output with an 8-bit signal.

The scanner gamma conversion circuit 1402 converts a reading signal from the scanner 300 from reflectivity data to brightness data. The image memory 1403 stores the image signal after the scanner gamma conversion. The image separation circuit 1404 determines a character part and a photograph part and determines a chromatic part and an achromatic part.

The MTF filter 1405 performs edge enhancement processing corresponding to an edge level of an image signal (adaptation edge enhancement processing) in addition to processing for changing a frequency characteristic of an image signal such as edge enhancement or smoothing for providing a sharp image or a soft image suitable for the preference of a user. For example, the MTF filter 1405 applies so-called adaptation edge enhancement to the respective R, G, and B signals in which a character edge is subjected to an edge enhancement and a halftone dot image is subjected to an edge enhancement. Details of the MTF filter 1405 are the same as those of the MTF filter 707 explained in the first embodiment with reference to FIG. 7. Thus, the details are not further explained.

An embodiment corresponding to a first aspect of the present invention is explained. In the present invention, to correct a difference of spectral characteristics for respective CCDs, a linear masking coefficient is calculated as a new linear masking coefficient based on a read value of the scanner data calibration standard chart shown in FIG. 26. A method for the calculation is explained below.

A value obtained by reading a point on a boundary surface not existing on an achromatic axis with a scanner CCD indicating, for example, a standard spectral characteristic is set as (Ri, Gi, Bi) (i=hue 1 to 4). When this point is read by another scanner, because of fluctuation in the spectral characteristics of the scanner CCDs, this point is read as (Ri', Gi', Bi') (i=hues 1 to 4) different from (Ri,Gi,Bi)(i=hues 1 to 4). As a result, recording values of the development sections C, M, Y, and K are calculated as (Ci', Mi', Yi', Ki') (i=hues 1 to 4). It is possible to represent Equation 33 as indicated by the following Equation 55.

$$\begin{pmatrix} Y(1') & Y(2') & Y(3') & Y(4') \\ M(1') & M(2') & M(3') & M(4') \\ C(1') & C(2') & C(3') & C(4') \\ K(1') & K(2') & K(3') & K(4') \end{pmatrix} = \tag{55}$$

$$\begin{pmatrix} aYB(3'4') & aYG(3'4') & aYR(3'4') & aY(3'4') \\ aMB(3'4') & aMG(3'4') & aMR(3'4') & aM(3'4') \\ aCB(3'4') & aCG(3'4') & aCR(3'4') & aC(3'4') \\ aKB(3'4') & aKG(3'4') & aKR(3'4') & aK(3'4') \end{pmatrix}$$

$$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

Assuming that Equation 32 is equal to Equation 55 to make Y, M, C, and K outputs after linear masking processing identical, the following Equation is obtained.

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} = \tag{56}$$

$$\begin{pmatrix} aYB(3\ 4) & aYG(3\ 4) & aYR(3\ 4) & aY(3\ 4) \\ aMB(3\ 4) & aMG(3\ 4) & aMR(3\ 4) & aM(3\ 4) \\ aCB(3\ 4) & aCG(3\ 4) & aCR(3\ 4) & aC(3\ 4) \\ aKB(3\ 4) & aKG(3\ 4) & aKR(3\ 4) & aK(3\ 4) \end{pmatrix} \begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix} =$$

$$\begin{pmatrix} aYB(3'\ 4') & aYG(3'\ 4') & aYR(3'\ 4') & aY(3'\ 4') \\ aMB(3'\ 4') & aMG(3'\ 4') & aMR(3'\ 4') & aM(3'\ 4') \\ aCB(3'\ 4') & aCG(3'\ 4') & aCR(3'\ 4') & aC(3'\ 4') \\ aKB(3'\ 4') & aKG(3'\ 4') & aKR(3'\ 4') & aK(3'\ 4') \end{pmatrix} \begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

According to Equation 56, to calculate a linear masking coefficient aPS (hues 3' to 4') (P=Y, M, C, K; S=R, G, B) of the hue areas 3' and 4', both sides are multiplied by an inverse matrix $$\begin{matrix} B(1') & B(2') & B(3') & B(4') \\ G(1') & G(2') & G(3') & G(4') \\ R(1') & R(2') & R(3') & R(4') \\ 1 & 1 & 1 & 1 \end{matrix}$$

of $$\begin{matrix} B(1') & B(2') & B(3') & B(4') \\ G(1') & G(2') & G(3') & G(4') \\ R(1') & R(2') & R(3') & R(4') \\ 1 & 1 & 1 & 1 \end{matrix}^1$$

to obtain $$\begin{pmatrix} aYB(3'\ 4') & aYG(3'\ 4') & aYR(3'\ 4') & aY(3'\ 4') \\ aMB(3'\ 4') & aMG(3'\ 4') & aMR(3'\ 4') & aM(3'\ 4') \\ aCB(3'\ 4') & aCG(3'\ 4') & aCR(3'\ 4') & aC(3'\ 4') \\ aKB(3'\ 4') & aKG(3'\ 4') & aKR(3'\ 4') & aK(3'\ 4') \end{pmatrix} = \tag{57}$$

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

As a result, it is possible to calculate the linear masking coefficient aPS (hues 3' to 4') (P=Y, M, C, K; S=R, G, B) of the hue areas 3' and 4'. Similarly, it is possible to calculate the linear masking coefficient aPS (each hue) (P=Y, M, C, K; S=R, G, B) for other hues.

An embodiment corresponding to a second aspect of the present invention is explained. It is possible to improve color reproducibility of a copy by changing a printer vector P(i) (P=Y, M, C, K; i=each hue) of Equation 57 according to an original type of an original to be copied. The original type includes a print original for which ink is used as a color material, a printing paper photograph original using a YMC photosensitive layer as a color material, a copy original using toner as a color material, an ink jet original using an ink jet printer output as an original, a map original using special ink, and a color correction for a highlight pen identifying the highlight.

As the printer vector P(i)(P=Y, M, C, K; i=each hue) of the Equation 57, an aPS original type (hue) (P=Y, M, C, K; S=R,G,B, constant) corresponding to each image quality mode is calculated in association with each image quality mode selected by an operation section based on a corresponding P original type (i)(P=Y,M,C,K; i=each hue, original type=printing, printing paper photograph, copied original, map, ink jet, highlight pen for example). The aPS original type is set in a circuit (ASIC) and used at the time of copying.

$$\begin{pmatrix} aYB\text{ Original type}(3'-4') & aYG\text{ Original type}(3'-4') & aYR\text{ Original type}(3'-4') & aY\text{ Original type}(3'-4') \\ aMB\text{ Original type}(3'-4') & aMG\text{ Original type}(3'-4') & aMR\text{ Original type}(3'-4') & aM\text{ Original type}(3'-4') \\ aCB\text{ Original type}(3'-4') & aCG\text{ Original type}(3'-4') & aCR\text{ Original type}(3'-4') & aC\text{ Original type}(3'-4') \\ aCB\text{ Original type}(3'-4') & aCG\text{ Original type}(3'-4') & aCR\text{ Original type}(3'-4') & aC\text{ Original type}(3'-4') \end{pmatrix} = \tag{58}$$

-continued $$\begin{pmatrix} Y\ \text{Original type}(1) & Y\ \text{Original type}(2) & Y\ \text{Original type}(3) & Y\ \text{Original type}(4) \\ M\ \text{Original type}(1) & M\ \text{Original type}(2) & M\ \text{Original type}(3) & M\ \text{Original type}(4) \\ C\ \text{Original type}(1) & C\ \text{Original type}(2) & C\ \text{Original type}(3) & C\ \text{Original type}(4) \\ K\ \text{Original type}(1) & K\ \text{Original type}(2) & K\ \text{Original type}(3) & K\ \text{Original type}(4) \end{pmatrix} \begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}^{-1}$$

A method of calculating hue area determination reference parameter Fx' and a masking coefficient by reading the scanner data calibration chart shown in FIG. 26 is explained with reference to a flowchart of FIG. 57. FIG. 57 is a flowchart of correction by scanner data calibration of the present invention.

A scanner data calibration chart is read (S1001). For example, a scanner data calibration standard chart shown in FIG. 26 is placed on the original stand of the scanner 300 and read by the scanner 300.

A hue angle is calculated (S1002). Based on respective patch read values RGB data (Dr, Dg, Db)(=Ri, Gi, Bi (i=each patch number)) of the scanner data calibration chart, using Equations 13 to 29, parameters GR, GB, and Fx' for dividing RGB image data of read original for each tint are calculated.

A linear masking coefficient is calculated (S1003). Based on Equation 57 and read values Ri, Gi, Bi (i=each patch number) of respective patches, a linear masking coefficient for each hue is calculated.

The read value and the coefficient are stored (S1004).

The color conversion UCR processing circuit 1406 performs the calculation using the following Equation to perform a color correction processing.

$Y'=Y-\alpha^*\min(Y,M,C)$ $M'=M-\alpha^*\min(Y,M,C)$ $C'=C-\alpha^*\min(Y,M,C)$ $Bk=\alpha^*\min(Y,M,C)$ In the Equation, $\alpha$ is a coefficient for determining an amount of UCR. 100% UCR processing is performed when $\alpha=1$. A value of $\alpha$ may be a fixed value. For example, it is possible make an image in a highlight part smooth by setting $\alpha$ close to 1 in a high concentration part and setting $\alpha$ close to 0 in a highlight part (a low image concentration part).

The masking coefficients are different for each of fourteen hues consisting of twelve hues obtained by further evenly-dividing six hues of R, G, B, Y, M, and C, respectively, and black and white.

A hue determination circuit 1424 judges in which hue read image data is distinguished. Based on a result of the judgment, a color correction coefficient for each hue is selected.

The enlargement/reduction circuit 1407 performs vertical and horizontal enlargement/reduction. The image processing (create) circuit 1408 performs repeat processing or the like. The printer γ circuit 1409 corrects an image signal according to an image quality mode (e.g., a character, a photograph). The printer γ circuit 1409 can perform background skip or the like simultaneously. The printer γ correction circuit 1409 has a plurality of (ten as an example) gradation conversion tables that can be switched according to an area signal generated by the area processing circuit 1402. According to the gradation conversion tables, a gradation conversion table optimal for each original (e.g., a character, silver salt photograph (printing paper), a print original, ink jet, a highlight pen, a map, or a thermal transfer original) can be selected out of a plurality of image processing parameters. The gradation processing circuit 1410 performs dither processing. In the dither processing, it is possible to select dither processing of an arbitrary size ranging from 1×1 no-dithering processing to dither processing by m×n pixels (m and n are positive integers). It is possible to perform the dither processing using up to thirty-six pixels (an example). A size of a dither using all the thirty-six pixels includes 6 pixels in the main scanning direction×6 pixels in the sub-scanning direction (total thirty-six pixels) or 18 pixels in the main scanning direction×2 pixels in the sub-scanning direction (total thirty-six pixels).

Note that the dither processing in gradation processing circuit 1410 is the same as that in the gradation processing circuit 714 explained in the first embodiment. Thus, the dither processing is not further explained.

The interface I/F selector 1411 has a switching function for outputting image data read by the scanner section 300 for processing by an external image processing apparatus or the like or outputting the image data from the external host computer or image processing apparatus with the printer engine 724.

The image formation printer γ (process control γ) correction circuit 1412 converts an image signal from the interface 11411 according to a gradation conversion table to output a result of the conversion to a laser modulation circuit (described later). The image formation printer γ (process control γ) correction circuit 1412 is referred to as a second gradation processing circuit below.

The printer section includes the interface 1411, the image formation printer γ 1412, the printer engine 724, and the controller 1417. It is also possible to use a scanner and an IPU independently from each other. An image signal from a host computer is input to the interface 1411 via a printer controller and is subjected to gradation conversion by the image formation printer γ correction circuit 1412. Since image forming is performed by the printer engine 724, it is possible to use the printer section as a printer.

The image processing circuit as described above is controlled by the CPU 1415. The CPU 1415 is connected to the ROM 1414 and the RAM 1416 via the BUS 1418. The CPU 1415 is also connected to the system controller 1417 via the serial I/F such that a command from a not-shown operation section or the like is transmitted via the system controller 1417. Based on a transmitted image quality mode, concentration information, area information, and the like, respective parameters are set in the respective image processing circuits described above.

The pattern generation circuits 1421 and 1422 generate gradation patterns used in the image processing section and the image formation section, respectively.

Figure 58:
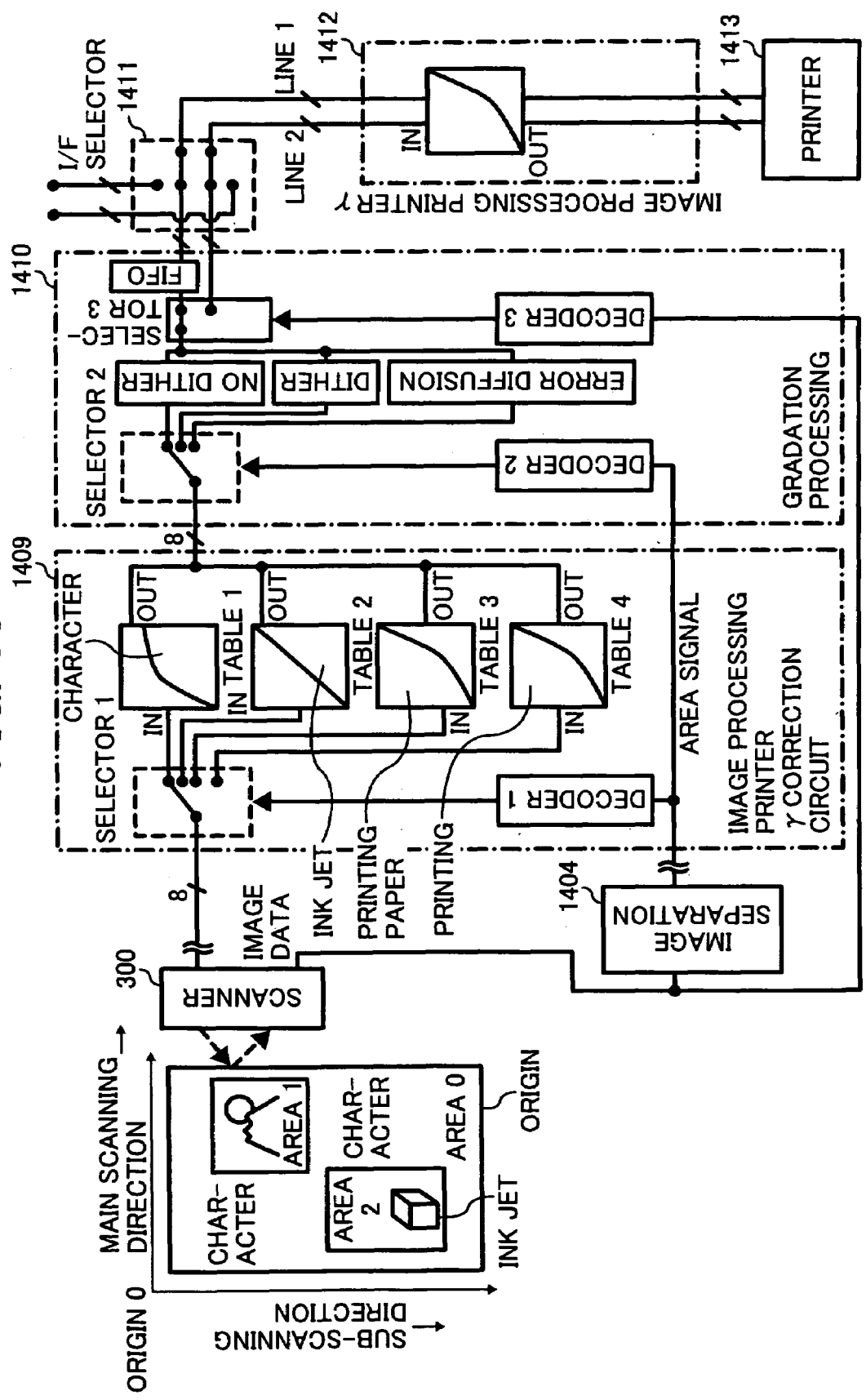
FIG. 58 is a schematic for illustrating an area processing by an image separation circuit shown in FIG. 56.

FIG. 58 is a diagram of a concept of area processing of the present invention. In FIG. 58, designated area information on an original is compared with reading position information at the time of image reading. An area signal is generated from the image separation circuit 1404. Based on the area signal, parameters used in the scanner gamma conversion circuit 1402, the MTF filter circuit 1405, the color conversion UCR circuit 1406, the image processing 1408, the image processing printer 7 correction circuit 1409, and the gradation processing circuit 1410 are changed. In FIG. 58, in particular, the image processing printer 7 correction circuit 1409 and the gradation processing circuit 1410 are shown.

In the image processing printer 7 correction circuit 1409, the area signal from the image separation circuit 1404 is decoded by the decoder 1 and the selector 1 selects a table from a plurality of gradation conversion tables such as a character and ink jet. In an example of an original in FIG. 58, a character area 0, a printing paper area 1, and an ink jet area 2 are present. In the example, the character gradation conversion table 1 is selected for the character area 0, the printing paper gradation conversion table 3 is selected for the printing paper area 1, and the ink jet gradation conversion table 2 is selected for the ink jet area 2.

The image signal subjected to the gradation conversion by the image processing printer γ correction circuit 1409 in FIG. 56 switches gradation processing to be used with the selector 2 based on a signal decoded again by the decoder 2 in association with an area signal in the gradation processing circuit 1410. As usable gradation processing, processing not using a dither, processing using a dither, error diffusion processing, and the like are performed. The error diffusion processing is applied to an ink jet original.

For the image signal after the gradation processing, a line 1 or a line 2 is selected by the decoder 3. The line 1 or the line 2 is switched for each different pixel in the sub-scanning direction. Data of the line 1 is temporarily stored in a First In First Out (FIFO) memory positioned downstream the selector 3 and the data of the line 1 and the line 2 is output. Consequently, it is possible to reduce a pixel frequency to ½ and input the image signal to the I/F selector 1411.

Note that the scanner calibration execution procedure and the like are described in the first embodiment with reference to FIGS. 27 to 55. Thus, explanations of the execution procedure and the like are omitted.

According to the embodiments described above, it is possible to reduce difference appearing in images output by different units of apparatuses.

According to the embodiments described above, it is possible to reduce fluctuation in color reproducibility related to a type of an original document in each machine.

According to the embodiments described above, it is possible to use an original read value.

According to the embodiments described above, even when concentrations or colors in a calibration reference chart fluctuate in the market, it is possible to accurately correct the fluctuation.

According to the embodiments described above, it is possible to improve color reproducibility.

According to the embodiments described above, it is possible to reduce a difference of color reproducibility and gradation reproducibility among machines.

According to the embodiments described above, it is possible to, when a chart other than the calibration reference chart is read by mistake, prevent correction from being executed.

According to the embodiments described above, it is possible to prevent decline in the color reproducibility due to an excessive correction amount.

According to the embodiments described above, it is possible to select a reference value according to a cause of fluctuation in differences among scanners.

According to the embodiments described above, it is possible to select a present value according to a cause of fluctuation in differences among scanners.

According to the embodiments described above, it is possible to reduce an influence by flare light.

According to the embodiments described above, it is possible to obtain an accurate read value of an image reading unit.

According to the embodiments described above, it is possible to make it easy to use ACC pattern reading control software to create an application program.

According to the embodiments described above, there is an effect that, it is possible to perform accurate calibration for an image reading unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
a color correcting unit including
a scanning unit configured to optically scan an original document to read an image, and to output an image signal;
a first converting unit configured to perform a gradation conversion on the image signal;
a hue-area detecting unit configured to detect, among a plurality of hue areas having a plane provided in parallel with a brightness axis in a color space as a boundary, a hue area including a signal color represented by a color image signal; and
a correction unit configured to correct the signal color according to the hue area;
a reference-data storing unit configured to store reference data corresponding to a patch in a reference chart including a plurality of achromatic patches having different gradation levels and a plurality of different chromatic patches, the reference chart obtained by reading an image by the scanning unit; and
a parameter generating unit configured to generate, based on the reference data, a hue division parameter to be set in the hue-area detecting unit and a color correction parameter to be set in the correction unit.

2. The image forming apparatus according to claim 1, wherein the hue division parameter and the color correction parameter are determined depending on a type of the original document.

3. The image forming apparatus according to claim 1, further comprising:
a reference-value storing unit configured to store a present value obtained by reading the reference chart and a previous value before reading the reference chart; and
a previous-value reading unit configured to read out the previous value from the reference-value storing unit.

4. An image forming apparatus, comprising:
means for optically scanning an original document to read an image, and to output an image signal;
means for performing a gradation conversion on the image signal;
means for detecting, among a plurality of hue areas having a plane provided in parallel with a brightness axis in a color space as a boundary, a hue area including a signal color represented by a color image signal;
means for correcting the signal color according to the hue area;

means for storing reference data corresponding to a patch in a reference chart including a plurality of achromatic patches having different gradation levels and a plurality of different chromatic patches, the reference chart obtained by reading an image by means for scanning; and means for generating, based on the reference data, a hue division parameter to be used in means for detecting the hue-area and a color correction parameter to be used in means for correcting the signal color.

5. An image forming apparatus that has a function of outputting an image read by the image forming apparatus from another image forming apparatus, the image forming apparatus comprising:

a reading unit configured to read an image, and to output an image signal;

a converting unit configured to perform a gradation conversion on the image signal;

a chart reading unit configured read a calibration reference chart that includes a plurality of chromatic patches having different hue areas that have a plane provided in parallel with a brightness axis in a color space as a boundary, and a plurality of achromatic patches having different concentrations;

a reference-value storing unit configured store a reference value corresponding to each of the chromatic patches;

a first correcting unit configured to correct R, G, and B signals corresponding to each of the hue areas based on the reference value and a read value of the chromatic patches obtained by reading the calibration reference chart;

a masking-coefficient calculating unit configured to calculate a masking coefficient corresponding to each of the hue areas from corrected R, G, and B signals and C, M, Y, and K signals corresponding to each of the hue areas; and a second correcting unit configured to correct the image signal on which the gradation conversion has been performed, based on the masking coefficient.

6. The image forming apparatus according to claim 5, wherein the image forming apparatus is configured to convert the read value of the chromatic patch using a scanner gamma conversion table for correcting a difference in performance of the reading unit among the image forming apparatuses.

7. The image forming apparatus according to claim 5, wherein the image forming apparatus is configured to create the scanner gamma conversion table based on the read value of the achromatic patch.

8. The image forming apparatus according to claim 5, wherein the image forming apparatus is configured control, when the read value of the chromatic patch is out of a predetermined range with respect to the reference value in the reference-value storing unit, the first correcting unit and the masking-coefficient calculating unit not to perform correction based on the read value of the chromatic patch and calculation based on the read value of the chromatic patch respectively.

9. The image forming apparatus according to claim 5, further comprising:

a correction-coefficient setting unit configured to set a correction coefficient to determine an amount of correction performed on the R, G, and B signals by the first correcting unit.

10. The image forming apparatus according to claim 5, wherein the reference value is any one of a design value and the read value of the chromatic patch read in advance, and the image forming apparatus further comprises a reference-value selecting unit configured to select one of the design value and the read value.

11. The image forming apparatus according to claim 5, wherein the present value is replaceable with a factory-setting value that is a standard read value of the calibration reference chart, and the image forming apparatus further comprises a present-value selecting unit configured to select either one of the factory-setting value and the read value that has been read in advance.

12. An image forming apparatus that has a function of outputting an image read by the image forming apparatus from another image forming apparatus, the image forming apparatus comprising:

means for reading an image to output an image signal;

means for performing gradation conversion on the image signal;

means for reading a calibration reference chart that includes a plurality of chromatic patches having different hue areas that have a plane provided in parallel with a brightness axis in a color space as a boundary, and a plurality of achromatic patches having different concentrations;

means for storing a reference value corresponding to each of the chromatic patches;

means for correcting R, G, and B signals corresponding to each of the hue areas based on the reference value and a read value of the chromatic patches obtained by reading the calibration reference chart;

means for calculating a masking coefficient corresponding to each of the hue areas from corrected R, G, and B signals and C, M, Y, and K signals corresponding to each of the hue areas; and means for correcting the image signal on which the gradation conversion has been performed, based on the masking coefficient.

13. An image forming method, comprising:

optically scanning an original document to read an image;

outputting an image signal;

performing a gradation conversion on the image signal;

detecting, among a plurality of hue areas having a plane provided in parallel with a brightness axis in a color space as a boundary, a hue area including a signal color represented by a color image signal; and correcting the signal color according to the hue area;

storing reference data corresponding to a patch in a reference chart including a plurality of achromatic patches having different gradation levels and a plurality of different chromatic patches, the reference chart obtained by reading an image; and generating, based on the reference data, a hue division parameter to be used at detecting the hue-area and a color correction parameter to be used at correcting the signal color.

14. An image forming method for forming an image in an image forming apparatus that has a function of outputting an image read by the image forming apparatus from another image forming apparatus, the method comprising:

reading an image;

outputting an image signal;

reading a calibration reference chart that includes a plurality of chromatic patches having different hue areas that have a plane provided in parallel with a brightness axis in a color space as a boundary, and a plurality of achromatic patches having different concentrations;

storing a reference value corresponding to each of the chromatic patches;

correcting R, G, and B signals corresponding to each of the hue areas, based on the reference value and a read value of the chromatic patches obtained by reading the calibration reference chart;

calculating a masking coefficient corresponding to each of the hue areas from corrected R, G, and B signals and C, M, Y, and K signals corresponding to each of the hue areas; and correcting the image signal on which the gradation conversion has been performed, based on the masking coefficient.

* * * * *